(12) United States Patent
Rueckner

(10) Patent No.: US 10,567,641 B1
(45) Date of Patent: Feb. 18, 2020

(54) GAZE-DIRECTED PHOTOGRAPHY

(71) Applicant: Devon Rueckner, San Diego, CA (US)

(72) Inventor: Devon Rueckner, San Diego, CA (US)

( * ) Notice: Subject to any disclaimer, the term of this patent is extended or adjusted under 35 U.S.C. 154(b) by 286 days.

(21) Appl. No.: 14/997,350

(22) Filed: Jan. 15, 2016

Related U.S. Application Data

(60) Provisional application No. 62/105,143, filed on Jan. 19, 2015.

(51) Int. Cl.
*H04N 5/00* (2011.01)
*H04N 5/232* (2006.01)
*H04N 5/225* (2006.01)

(52) U.S. Cl.
CPC ....... *H04N 5/23219* (2013.01); *H04N 5/2256* (2013.01); *H04N 5/23212* (2013.01); *H04N 5/23216* (2013.01)

(58) Field of Classification Search
CPC ............. H04N 5/23219; H04N 5/2256; H04N 5/23212; H04N 5/23216
See application file for complete search history.

(56) References Cited

U.S. PATENT DOCUMENTS

| | | | |
|---|---|---|---|
| 5,155,516 A | 10/1992 | Shindo | |
| 5,765,045 A | 6/1998 | Takagi et al. | |
| 6,307,526 B1* | 10/2001 | Mann | G02B 27/017 345/7 |
| 6,478,425 B2 | 11/2002 | Trajkovic et al. | |
| 7,046,924 B2 | 5/2006 | Miller et al. | |
| 8,885,882 B1* | 11/2014 | Yin | G06F 3/00 382/103 |
| 8,941,561 B1 | 1/2015 | Starner | |
| 9,001,030 B2 | 4/2015 | Raffle et al. | |
| 2003/0169213 A1* | 9/2003 | Spero | G02B 5/20 345/7 |
| 2008/0036902 A1 | 2/2008 | Tanaka | |
| 2010/0123782 A1 | 5/2010 | Yata | |
| 2010/0322479 A1* | 12/2010 | Cleveland | G06F 3/012 382/103 |
| 2011/0063403 A1* | 3/2011 | Zhang | G06K 9/00261 348/14.1 |
| 2011/0111384 A1 | 5/2011 | Dietrich et al. | |
| 2012/0019703 A1* | 1/2012 | Thorn | G06T 5/002 348/333.03 |
| 2012/0172085 A1 | 7/2012 | Vuppu et al. | |
| 2012/0200689 A1 | 8/2012 | Friedman et al. | |
| 2013/0009993 A1 | 1/2013 | Horseman | |

(Continued)

OTHER PUBLICATIONS

Wagner, Philipp. et al., "A Pivotable Head Mounted Camera System that is Aligned by Three-Dimensional Eye Movements," Proceedings of the 2006 Symposium on Eye Tracking Research & Applications. New York: ACM Press, Mar. 27-29, 2006, pp. 117-124.

*Primary Examiner* — Zhihan Zhou
(74) *Attorney, Agent, or Firm* — Carr & Ferrell LLP

(57) ABSTRACT

Systems and methods for gaze-directed photography with a camera having a field of view are provided herein. In some embodiments, a method includes receiving an input trigger from a user, determining a target object of a gaze of the user, mapping the target object to the field of view of the camera, tracking the target object after the user averts their gaze, adjusting at least one camera parameter based on the tracking and capturing one or more images containing the target object.

22 Claims, 40 Drawing Sheets

(56) References Cited

U.S. PATENT DOCUMENTS

| | | | |
|---|---|---|---|
| 2013/0178287 A1* | 7/2013 | Yahav | G02B 27/01 |
| | | | 463/32 |
| 2013/0214998 A1 | 8/2013 | Andes et al. | |
| 2013/0222638 A1 | 8/2013 | Wheeler et al. | |
| 2013/0258089 A1 | 10/2013 | Lyons et al. | |
| 2013/0258122 A1 | 10/2013 | Keane et al. | |
| 2014/0085452 A1* | 3/2014 | Nistico | A61B 3/0008 |
| | | | 348/78 |
| 2014/0160250 A1* | 6/2014 | Pomerantz | H04N 5/23229 |
| | | | 348/47 |
| 2014/0320674 A1 | 10/2014 | Kuang | |
| 2015/0091780 A1* | 4/2015 | Lyren | G02B 27/017 |
| | | | 345/8 |
| 2015/0125078 A1 | 5/2015 | Kitagawa | |
| 2015/0147000 A1 | 5/2015 | Salvador Marcos et al. | |
| 2015/0220157 A1 | 8/2015 | Marggraff et al. | |
| 2015/0241755 A1* | 8/2015 | Cleveland | G03B 9/02 |
| | | | 396/199 |
| 2015/0242993 A1 | 8/2015 | Raman | |
| 2016/0049108 A1 | 2/2016 | Yajima et al. | |
| 2016/0203639 A1* | 7/2016 | Bostick | G06T 7/20 |
| | | | 345/619 |
| 2017/0039774 A1 | 2/2017 | Estable | |
| 2017/0318235 A1* | 11/2017 | Schneider | G02B 27/2228 |

\* cited by examiner

GAZE-DIRECTED PHOTOGRAPHY

1 CROSS REFERENCE TO RELATED APPLICATIONS

This application claims the priority benefit of U.S. Provisional Application Ser. No. 62/105,143, filed on Jan. 19, 2015, entitled "Gaze-Directed Photography," which is hereby incorporated by reference herein in its entirety, including all references cited therein.

2 TECHNICAL FIELD

The present technology relates to human control of cameras. Various embodiments of the present disclosure can be used separately or together to improve the way that people can take photographs and videos. The present disclosure draws from a number of technical fields, including: mobile gaze tracking; photo composition and cinematography; object tracking and scene segmentation; digital camera technology; computer vision; computational photography; mobile augmented reality (AR); and 3D localization, mapping, and modeling.

3 BACKGROUND

Photography is a remarkable art: it is nearly two centuries old, yet it has enjoyed a fast pace of evolution throughout its history. Early camera systems required a practical knowledge of everything from optics to chemistry, while today beautiful photos are within the grasp of anyone holding a modern smartphone. That said, professional photographers will always need to have a deep intuitive understanding of the behaviors of light and the mechanism of their tools.

Photography technology has evolved in part because of general hardware improvements. Advances in miniaturization, sensors, processor speeds, memory, and fabrication techniques have progressively pushed down costs, improved image quality, improved performance, and introduced new camera form factors. Software-based improvements have also had a huge impact on photography technology. For example: focus based on touchscreens, stitching of multiple photos into panoramic views, presets for a wide range of aesthetic filter styles, motion compensation, and drone photography are all dependent on sophisticated software. Finally, improvements in camera user interfaces and automation have made photography progressively easier for both amateurs and professionals. Automation has reduced the number of parameters a user needs to control by choosing reasonable default behaviors. Viewfinders have evolved from tiny optical windows to a large live-view LCD display screens. Sophisticated auto-focus and object detection algorithms help capture imagery more reliably.

While photography technology has improved over time, it can still be difficult to capture quality images while the user is on the move, operating solo, or while events are happening quickly. Embodiments of the present disclosure address these problems.

4 SUMMARY

The present disclosure proceeds upon the desirability of providing a camera control system that supports gaze tracking. The control provides automation and user-interfaces to give people compositional control over their photos and videos with their eyes rather than a traditional viewfinder and user interfaces. In accordance with exemplary embodiments of the present disclosure, the gaze-directed photography system can comprise one or more of the following components: a mechanism that tracks the user's gaze target; a mechanism to display information about camera state to the user; one or more high definition cameras whose orientation and location is optionally monitored and controlled; a mechanism for the user to indicate when they are looking at a point or region of interest, or a control system to automatically infer that this is occurring; and systems for monitoring and tracking regions of interest over time.

The combination of these components can be used to select, optimize for, and record regions of interest using the high-definition cameras. In particular, the control system can leverage gaze-tracking information to adjust parameters such as the field of view, focus, depth of field, and brightness. These adjustments can occur either while the images are being recorded, after, or both. Gaze-directed photography empowers a person to intentionally compose shots with greatly reduced manual camera interaction. This has many advantages, including: cameras can be controlled more quickly, allowing transient events to be captured; cameras can be controlled without touching them, which helps prevent bumps and allows gimbal-stabilized and remote cameras to be operated; cameras can be operated by a user whose hands are otherwise occupied or disabled.

Additional objects and advantages will be apparent from the descriptions and accompanying figures in this document.

5 BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the present disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

6 DETAILED DESCRIPTION

6.1 Overview

Figure 1A:
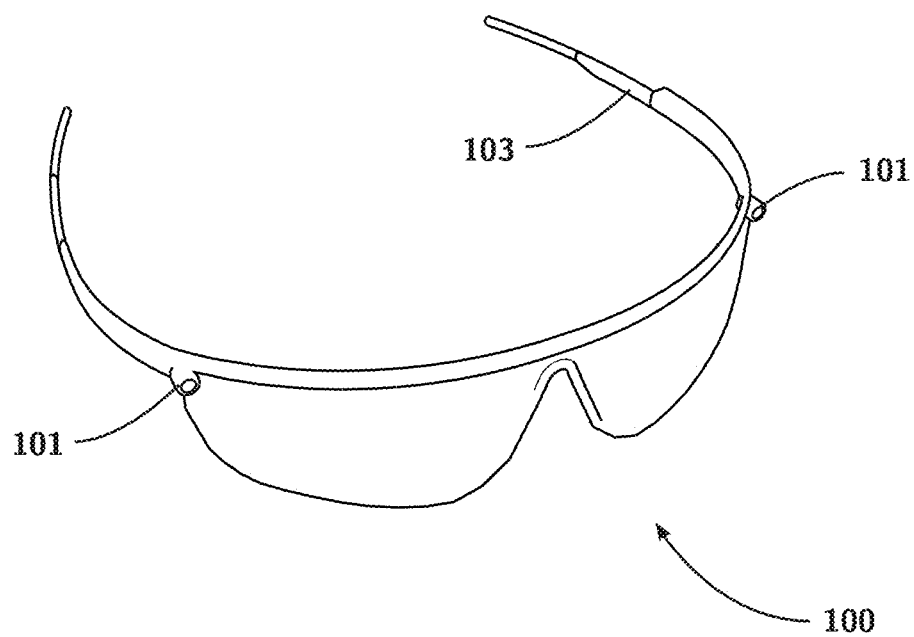
FIG. 1A shows a front perspective view of a pair eye tracking glasses intended for active users in accordance with an exemplary embodiment of the present disclosure.

A primary tenet of gaze-directed photography is that, ideally, a person would be able to remain completely attentive to the world around them and simultaneously compose evocative photographs and videos of what they see. Photos and videos are meant to share experiences, but the very act of photography detracts from the photographer's ability to engage with those experiences. Whether a person is biking in the mountains, watching a street performer, responding to a house fire, photographing a wedding, or filming a documentary, manipulating a camera (also referred to herein as an image-capturing camera) distracts from the moment at hand. People should not be forced to trade their engagement and presence in the world for the ability to record excellent photographs and videos.

While viewfinders and live-view displays have been the de facto compositional tool in photography for the last century, they are less than optimal. Imagine that someone is holding a traditional camera and decides to take a photo. We can estimate that it takes roughly 200 ms for their eyes to move down to the viewfinder, 400 ms to fixate on the display, another 500 ms to mentally process it. The same process is repeated on the way back, and there will be some delay in the middle to aim, zoom, and focus the camera. From this we can estimate that taking a single photo might require 2-5 seconds of interaction. While this might not sound like much, usability studies of human-computer interaction show delays as small as 150 ms are perceived, and anything above a second causes a drop in productivity. Furthermore, splitting attention between two tasks degrades a persons' performance in both of them. Inefficiency is a "problem" many people do not realize they have, though most professional photographers know the value of speed in their tools and work.

Some contemporary cameras have sophisticated object and pattern recognition features that find likely points of interest in a scene and automatically adjust focus and brightness to optimize for one or more of those points. In scenes with disparate levels of depth or light, a camera might have to make a random guess as to the point of interest. Some modern viewfinders allow the user to select a target object using a touchscreen. This is a helpful function for allowing the user to control the camera, but it can be a distracting and cumbersome user experience because the camera must be kept aimed properly while the user is also manipulating the touchscreen and trying to keep the camera stable. Alternatively, many photographers use a "focus recompose" technique, with the camera set up to auto-focus on the center of the frame with the shutter pressed half-way. This technique takes manual dexterity, and does not always retain focus after the camera is reframed. In digital cinema, properly focusing the camera is such a complex and critical task that a second operator (a First Assistant Camera) is often used to pull focus.

Viewfinders, live-view displays, and cameras have steadily improved, and now include features like focus-peaking, histograms, object tracking, and other useful features. Many professional still photographers now use some form of auto-focus in their work, though technology trade-offs still exist, and auto-focus is still uncommon for professional videographers. Viewfinders and live-view displays will always be inferior in reproduction quality to the pure human eye, but are important for helping the photographer understand and control the images that their camera is recording and for previewing images and video that have been recorded.

Perhaps one day we will be able to plug flash memory directly into our visual cortices and save snippets of beautifully composed and color-graded photos and video. Until then, we need to make the user experience of a camera as efficient and responsive as possible, and demand the minimal time and attention necessary to achieve a desired result. Efficiency is one of the primary characteristics that can make a system more usable.

Making interactions with cameras more efficient is a step towards the ideal of making the camera "disappear" from the user's attention altogether and simplify user's conceptual model of what photography entails. In particular, the user of a gaze-directed camera needs to process much less information from the camera compared to the user of a manually controlled camera. This is a major advantage in the user experience because of the reduced cognitive overhead.

The goal of gaze-directed photography is not so much to take a picture of what the user is currently looking at, but rather of the scene the user is interested in photographing. Making this distinction between incidental eye movements and intended photographs is the key to using gaze as a camera control mechanism, and what permits a traditional viewfinder or live-view display to be augmented or supplanted by the present disclosure.

Gaze tracking systems are often used for learning about human behaviors such as hand-eye coordination and attention to marketing. Gaze tracking can also be used for controlling and interacting with computers. For example, it may be used as a computer input device for physically challenged individuals, or as a control in virtual-reality video games. One common type of eye tracking technology is "mobile gaze estimation", where head and eye movements are used to determine a person's point of regard in the world as a person moves around freely. Often, mobile gaze-tracking systems are head-mounted, reflect infrared light off the eye, and use cameras and software to track eye movements over time. The systems can utilize pupil and iris parameters such center, shape, and angle. They can also utilize other features such as reflections and glints off the eye. Some utilize the electrical signals from oculomotor control of the eye. Many systems often have one or more world-facing cameras; this allows information derived from the eye image to be mapped to a gaze target in the world image. Other systems are not head-mounted, and use cameras and sensors further from the face.

One common user-experience issue with using gaze as an input mechanism is that human eye movements are only partly the result of conscious action. In the course of looking at a scene or object, a user's eyes are making many small-scale movements (saccades) that do not necessarily reflect attention or intention. Furthermore, even if humans were under complete control of their eye movements, they still need their eyes for observing the world, and cannot afford to handicap their use. Overloading eye movements as a user input signal—e.g. as a way to "click" a mouse button—leads to what is sometimes called the "Midas touch problem" where actions are inadvertently taken simply because a target was looked at.

Leveraging gaze dwell time is the most common solution to the Midas touch problem. However, using dwell time has the distinct usability disadvantage of triggering both false positives (the system is triggered inadvertently whenever the user's eyes linger) and false negatives (actions are missed because the user is in a hurry and does not have time to dwell on a target). Another strategy has the user line up their eye gaze with a physical head-mounted target to trigger an action. However, this strategy requires the user to move both their head and eyes in order to compose a shot, resulting in awkward and unnatural body and eye movements. However, it is to be understood that even with their disadvantages, each method can be used, as a whole or at least in part, with other embodiments of the present disclosure to improve gaze-directed photography.

The present disclosure addresses the Midas touch problem by introducing a secondary user input that is substantially independent of gaze location and head position. This input could take a number of forms depending on the application: a wireless button on a finger ring, a shutter button on a hand-held camera, a voice command, or some sort of gesture like an intentional blink, a double-blink, an eyebrow raise, or an ear twitch could all be used. It could even be some sort of intentionally generated brain or nerve signal detected using electroencephalography (EEG) or electromyography (EMG). Regardless of the input method, the point is that the user helps the system distinguish between irrelevant and intentionally chosen gaze targets. A secondary input can supplement gaze direction by communicating to our camera system that the user's current point of regard should be the target of the photo or video.

In accordance with an exemplary aspect of the present disclosure, in addition to or instead of using a secondary input, a system can be trained to watch for anomalous or interesting patterns and use this as a control mechanism. The system could then optimistically take pictures, capturing images without any secondary input. Automatic behavior could also be used alongside manual input, opportunistically capturing "recommended" imagery that the user may find interesting even if they did not specifically request them. These patterns could incorporate a variety of features including physiological metrics (e.g. eye movements, heart rate), image analysis (e.g. feature detection), sensor data (e.g. motion data, audio levels, GPS), and external information such as triggers from the Internet.

Additionally, note that a secondary input would be useful independent of gaze control, as a form of annotation. One common double-edged-sword with modern high-capacity video cameras is that they tend to record far more video than ultimately desired. This typically requires extensive effort for a user to go back and find key moments. However it is not feasible to simply turn the video off to avoid this problem, because then unexpected shots would be missed. A secondary input would allow a user to flag a time in the video for later retrieval and leave the recording running.

Using a secondary input as described herein allows the user to perform "target selection", where the user specifies a target of interest to the camera and then lets software follow that target. This enables the camera to track the target even when the user is looking elsewhere, further minimizing the Midas touch problem. Gaze-reinforced object selection would also enable automatic video tracking: a camera, view, or focal point would be programmed to track some object, and that tracking is periodically reinforced and updated by input from the user. The user is free to look away because the camera does not track their gaze directly; it tracks an object of interest based on occasional gaze-directed input from the user. Another use case would allow videographers to select and track multiple objects and then rack the focus between them. Racking focus in digital cinema is typically difficult and often requires a dedicated operator.

In accordance with an exemplary aspect of the present disclosure, gaze target tracking can be augmented or refined by incorporating additional information. For example, the system could use face-detection to look for faces or eyes, which are often the primary subject of photos and video. The gaze tracker may identify a gaze target very close to someone's face within a margin of error; in this case the system might reasonably choose the face as the actual target.

Tracking the distance away that the user has focused their eyes (gaze depth) is rarely used in gaze-based control mechanisms. Measuring gaze depth can be achieved by methods including phakometry (measuring distortion of the eye's crystalline lens), measuring eye convergence, mapping of gaze rays from the pupil to a 3D model of the world, or some combination thereof.

Gaze depth information—both derived from physiological data and from other sources such as rangefinders and 3D world models—can be used to help the auto-focus camera system find its target faster. Many focus systems need to scan over a range of focal depths to find the optimal point, and knowing the depth a priori can give these systems a better starting point or a smaller range to search over. The system can seed the auto-focus search with an approximate depth first, and then search over the smaller range for the object that the user has focused their eyes on. Depth information can also help contrast-based focus system choose a focal plane when photographing low-contrast or low-light subjects.

Additionally, gaze depth would help the camera choose among multiple plausible points of interest. This is particularly helpful in situations where two features in the world are located close to each other angularly, but far apart in depth—e.g. a close-up of a flower in front of a mountain scene. Photographers commonly encounter this situation when achieving a bokeh (blurred background or foreground) effect using a shallow depth of field. Touch-screen, center-weighted, and most other existing auto-focus mechanisms suffer when objects are angularly close to each other but far apart in depth because selection becomes ambiguous. Incorporating gaze depth information resolves the ambiguity.

No existing gaze control system supports effective composition and framing of images. Some systems exist that will center a camera on the gaze target, but centering the subject of a shot rarely results in the most visually appealing composition. Instead of simply centering photos on a gaze target, the user can briefly "scan" a scene with their eyes or briefly fixate on a few targets of interest to roughly define framing. This could occur while the user is interacting with the secondary input—e.g. holding down a button halfway, similar to how many cameras allow the user to set focus before snapping a picture. It could also occur automatically, by tracking the user's gaze targets over a time window and optionally weighing more recent targets higher. Tracking gaze data over a small period of time allows a user to intentionally compose their images without a viewfinder. Alternatively, composition and framing can be achieved by manually aiming the camera while using gaze for other controls. The camera could be aimed with the hands, a joystick, or other input mechanism such as motion detection of the head.

Additionally, information from inertial motion sensors such as gyroscopes and accelerometers can be incorporated into the compositional decisions. Typically, users want their pictures level with the horizon and this additional sensor data would help compensate for camera rotation. Movement data can also be used for image and camera stabilization and to minimize motion blur.

Gaze-directed photography could also be combined with automated compositional techniques for photos and video. For example, it is possible codify various compositional principles such as the "rule of thirds", color harmony, visual balance, and object amputation avoidance into the system. It is also possible to train machine-learning algorithms such as neural networks to emulate human perception of "well-composed" images, and these algorithms can recommend optimal framing from a constrained range of options. These aesthetic heuristics can be used to refine the final crop boundaries.

Most systems that aim a camera use mechanical actuators such as servo and stepper motors. This can be bulky and somewhat slow. A more robust and economical solution is to capture and save high-resolution image information from a wide field of view, map this to the user's gaze, and crop down to a smaller area of interest. The image information could be captured using a single camera with a wide-angle lens, or captured using multiple cameras with adjacent or overlapping fields of view. Modern computational cameras such as light field cameras are even able to set the focal plane after-the-fact rather than mechanically adjusting optics, and gaze-location can be used with a light field camera to choose this focal plane. Given the captured image data, the compositional techniques described above can be applied in post-processing using a "virtual camera" which has the available image data at its disposal. This technique has a number of advantages over physically moving a camera or lens elements.

First, the system for transforming gaze data, motion sensor data, and aesthetic heuristics into camera movements might be computationally expensive. By postponing the processing until a later stage, the mobile device simply needs to record data rather than perform real-time processing of it. This allows the mobile device to use less energy while on battery power, and postpone the heavy processing until a later point when more energy and processing power is available.

Second, capturing extra image data rather than physically moving a camera gives photographers more flexibility after-the-fact. They may compose a shot in real-time that inadvertently left out a region of interest, and later on still be able to adjust the framing by widening the field of view in a computer user interface. Or, they may simply want to make fine adjustments to the final output of the automated composition process.

Third, there are many possible ways to take light data and map it to a flat photo or video. A physical lens imposes a projection with a particular set of distortions that affects different parts of the image. However, with a virtual camera the projection occurs in software, and it is possible to choose from multiple projections to choose the one that is most aesthetically pleasing for the image.

Finally, avoiding physically moving parts makes the camera system more stable, cheaper, and less likely to break. This is particularly important because many usage scenarios demand a tough system.

While aiming a virtual camera is often a better design than physically moving a camera, there are also some advantages to physically moving a camera. For example, large lenses and sensors can be heavy and expensive, so mounting a single large camera on a gimbal might be cheaper or achieve better image quality than using a multi-lens panoramic setup and cropping the image data. Gimbal-mounted cameras are commonly used for image stabilization and remote control.

In accordance with an exemplary embodiment of the present disclosure, a hybrid system can incorporate both physical and virtual lens movements to achieve specific goals. For example, multiple cameras could be synchronously set to the same focal distance and aperture at the time of capture to achieve a consistent focal distance and depth of field in a panoramic setup, and the "virtual camera" could still be aimed and zoomed at the resulting stitched images. Also, single-lens cameras could be set to shoot a bit wider than desired, and then auto-crop based on gaze direction. Many of the innovations and techniques in the present disclosure are effective with both physically- and virtually-aimed cameras.

Most contemporary helmet-worn cameras use a single lens and sensor in a single enclosure for all the electronics, which is then mounted to a helmet. Multi-sensor panoramic cameras exist, but tend to similarly consolidate all components into a single enclosure. These cameras tend to stick out from the helmet, which increases camera shake, puts torque and stress on the mount, and looks rather silly.

A better solution is to attach the cameras and a battery around the head. This allows the weight of the electronics to be equally distributed and gives them a lower center of mass and a smaller profile (keeping them closer to the head.) The cameras may be attached to a strap, loop, or band and worn directly on the head or over a helmet. The cameras could also be incorporated directly into a fabric hat or a rigid helmet. Alternatively, the cameras could be placed at arbitrary locations along the surface of a helmet using for example double-stick tape, such that all desired directions are covered by at least one camera's field of view.

Given images and video taken by a panoramic camera system, a virtual camera can be aimed and zoomed to produce imagery with a narrower field of view. This imagery can be composed as described above.

Gaze can also be an effective control mechanism for manually aimed cameras. In particular, the user can aim the camera as desired using a traditional viewfinder or live-view screen, and then use gaze direction to select which section of the scene the camera should focus on and optimize its light levels for. This would be particularly useful in video and cinematography, where center-weighted auto-focus is relatively useless and it would be awkward to use a touch-screen for target selection. It would also be useful in event photography, where photographers often do not have time to carefully frame their shots. In these situations, photographers often simply point their camera and hope they get the shot ("spray and pray"), without having time to carefully frame and focus.

Additionally, combining gaze-tracking glasses with a translucent augmented reality (AR) display allows a user to have full control over a manually aimed camera without any traditional viewfinder at all. In particular, a rendering of the camera's field of view in the glasses superimposed over the user's field of view would help the user make manual adjustments to aim and zoom without looking down at the camera. This rendering could be a kind of bounding box that represents what is visible to the camera. It could also be a reticle-like target or a spotlight effect. A head-mounted AR display relies on the eyes' direct image of the world rather than a viewfinder or live-view display. As such, the user does not need to look at an indirect, lower-quality display, and does not need to shift their attention away from the world.

Some existing augmented reality displays can cause users discomfort because they require the user to make unnatural eye movements, which confuse the body's natural behaviors with regard to focusing, directing, and converging the eyes. However, the display in the present disclosure has the advantage that the user does not need to focus on the display, and in fact it is better if they do not because the goal is to encourage users to stay focused on the world.

Dissuading users from focusing on the display is achieved in part by using only very simple shapes and avoiding distracting details. The display can also be artificially blurred, which would give the frame a fuzzy spotlight or highlight effect, rather than looking like a hard-edged bounding box. The display can also update dynamically based on the user's current gaze direction in order to optimize for the differences between human peripheral and foveal vision. Binocular effects can also be used to make highlighted regions appear floating in space, nearer to the objects the regions highlight. The displays for gaze-directed photography as described in the present disclosure do not require full-color to be effective. This is advantageous because full-color AR displays are more complicated and expensive than displays with just one or a few colors.

One day, AR display technology will improve to the point where 3D, high-resolution, full-color virtual objects and images can be seamlessly blended with the real world without causing user discomfort. When this occurs, this display technology can be incorporated into the present disclosure and provide even more information about the camera state within the glasses which may be helpful to some photographers. For example, over- and under-exposed regions can be highlighted, camera state such as battery life and mode settings can be shown, and previews of previously recorded images can be clearly displayed.

In the detailed descriptions that follow, components are described in the context of three gaze-directed photography usage scenarios: head-mounted camera systems, externally-mounted camera systems, and portable camera systems. It is appreciated that this organization is for example only, and that any component described can be used in any of the scenarios. The components are not limited to usage within the scenario in which they are introduced.

6.2 Head-Mounted Camera Scenarios

In accordance with an exemplary embodiment of the present disclosure, the gaze-directed photography system positions a world-facing high-definition camera system relatively close to the user's eyes, for example on a helmet.

FIG. 1A illustrates a pair of glasses 100 with gaze-tracking functionality in accordance with an exemplary embodiment of the present disclosure. This particular "sports" head-mounted gaze tracker can be used during activities that involve active tasks, urgency, or some level of danger. The forward-facing reference cameras 101 capture a field of view that is preferably as wide as the user's field of view. They need not be very high resolution, as they are only used for intermediary processing and not generating final images or video. The frame 103 either contains all electronics necessary to support the operation of the glasses, or can connect with an external module in order to make the glasses as lightweight and comfortable as possible. These additional electronics include power, communication, control, data processing, small speakers or transducers for user feedback, rangefinders, 3D scanners, structured-light projectors, lidar, inertial measurement sensors (IMUs), and physiological sensors such as EEG, EMG, and heart rate monitors. It might be made of a combination of plastic, metal, and other materials.

Figure 1B:
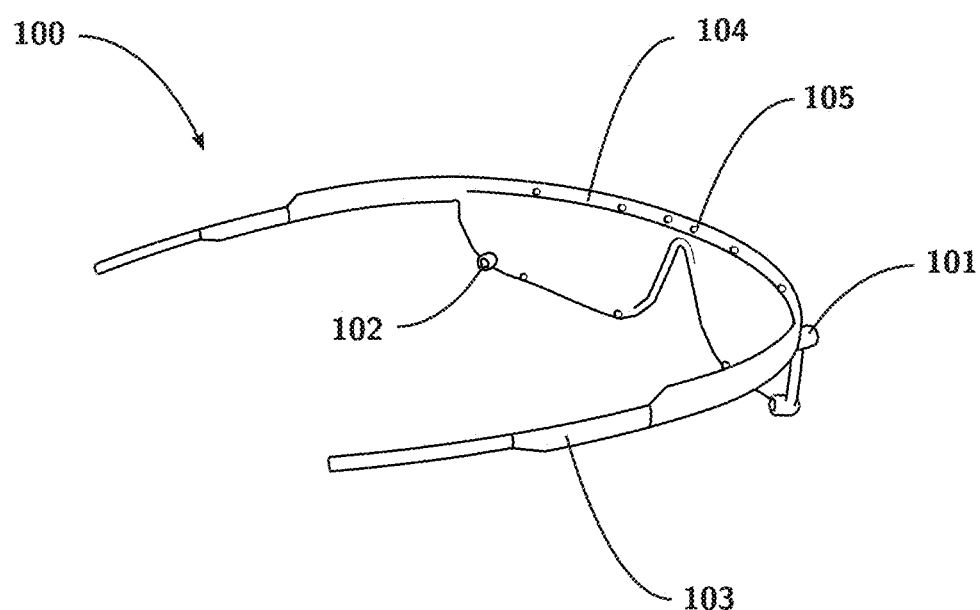
FIG. 1B shows a back perspective view of the pair eye tracking glasses of FIG. 1A in accordance with an exemplary embodiment of the present disclosure.

FIG. 1B shows the rear view of the glasses 100 in FIG. 1A, with a setup for performing eye tracking in accordance with an exemplary embodiment of the present disclosure. Infrared LEDs 104 are used to illuminate the eyes, which are tracked with the rear-facing cameras 102. Additionally, regular LEDs 105 may also be used as status indicators to show information such as whether the power is on or whether video is being recorded, for example.

Figure 1C:
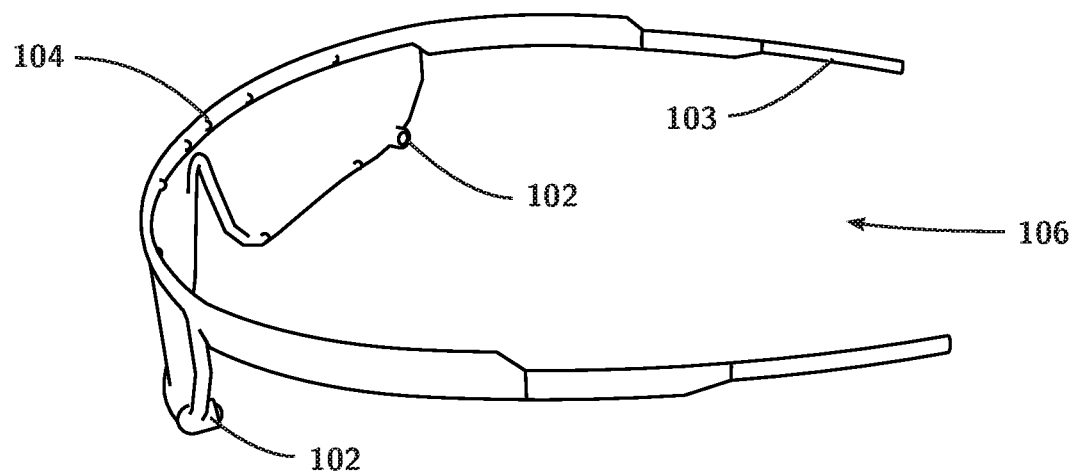
FIG. 1C shows a front perspective view of a pair eye tracking glasses without forward-facing reference cameras.

It is appreciated that the gaze-tracking glasses 100 shown in FIGS. 1A-1B merely represent one possible design. Many different designs are contemplated and can be used in the present disclosure. Any method of tracking the user's gaze with respect to the world around them can be utilized by the gaze-directed photography system. As will be described in greater detail below, FIG. 1C shows a simpler example of gaze-tracking glasses. These glasses do not have a forward-facing world camera, and instead are calibrated to work directly with the wide-angle camera system described below.

Figure 2A:
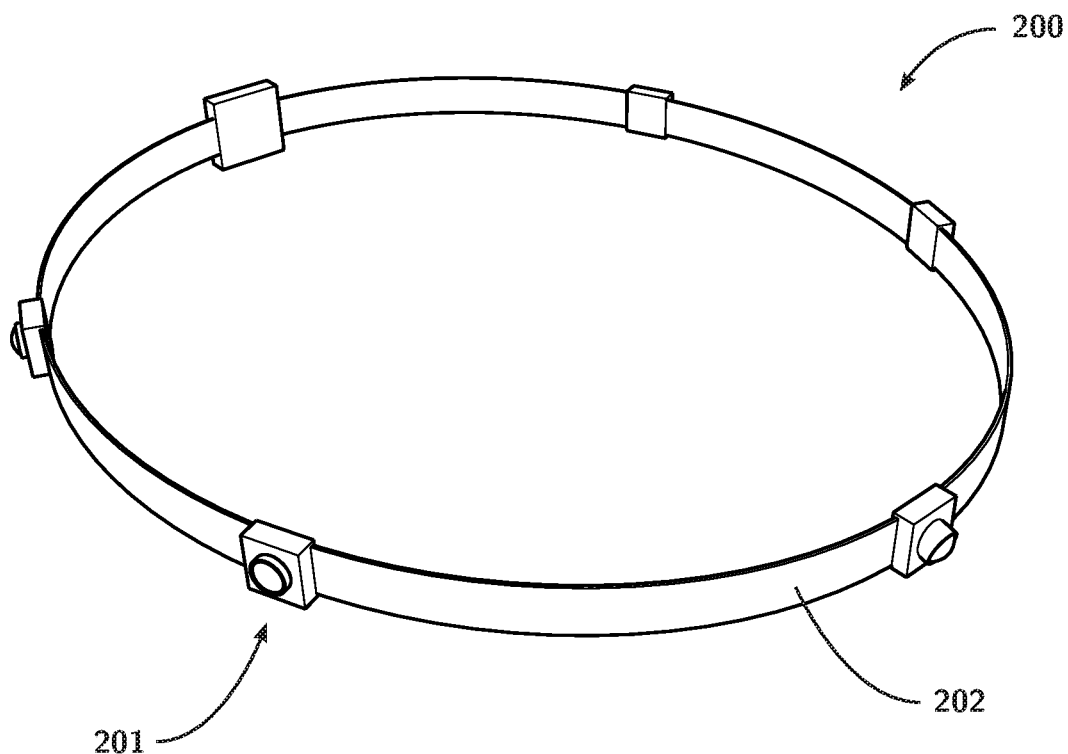
FIG. 2A shows a front perspective view of an example panoramic camera system.

FIG. 2A shows an exemplary design for a multi-sensor and multi-lens panoramic camera system 200 in accordance with an exemplary embodiment of the present disclosure. The high-definition cameras 201 are attached together with a strap 202 that could be a semi-rigid plastic, elastic band, rubber, or textile. The cameras could also be incorporated directly into a hat or helmet, and be oriented in any direction rather than just in a ring.

The cameras 201 can be triggered simultaneously to take still images or video, and may communicate with each other and with the glasses 100. The cameras are arranged such that their fields of view overlap with each other whenever the band is in a roughly elliptic shape. The panoramic strap system 200 is meant to be worn on a user's head and capture a 360-degree view that is roughly parallel with the ground. However, it is not necessary to have a complete 360-degree view: cameras could be arranged in any configuration.

Figure 2B:
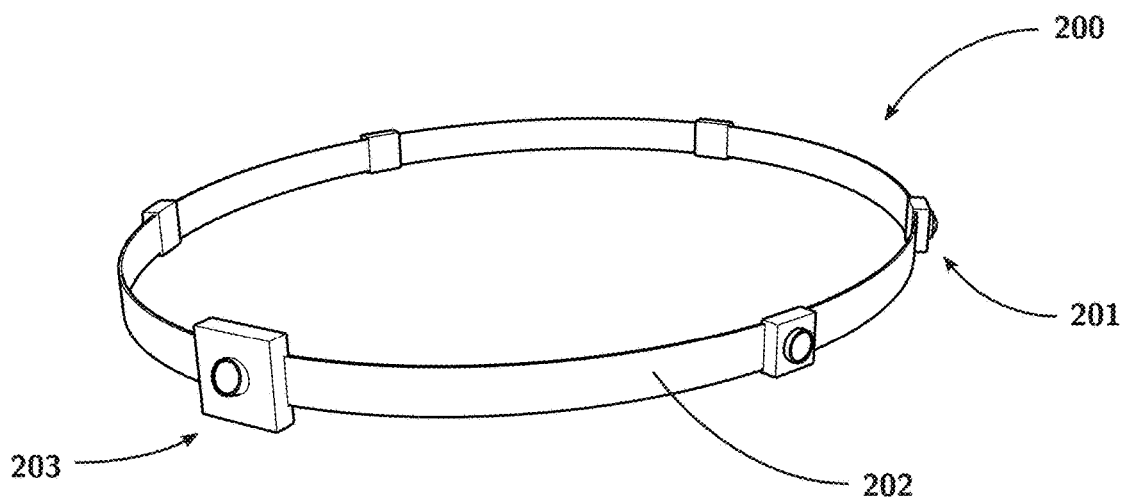
FIG. 2B shows a back perspective view of the panoramic camera system of FIG. 2A.
Figure 2C:
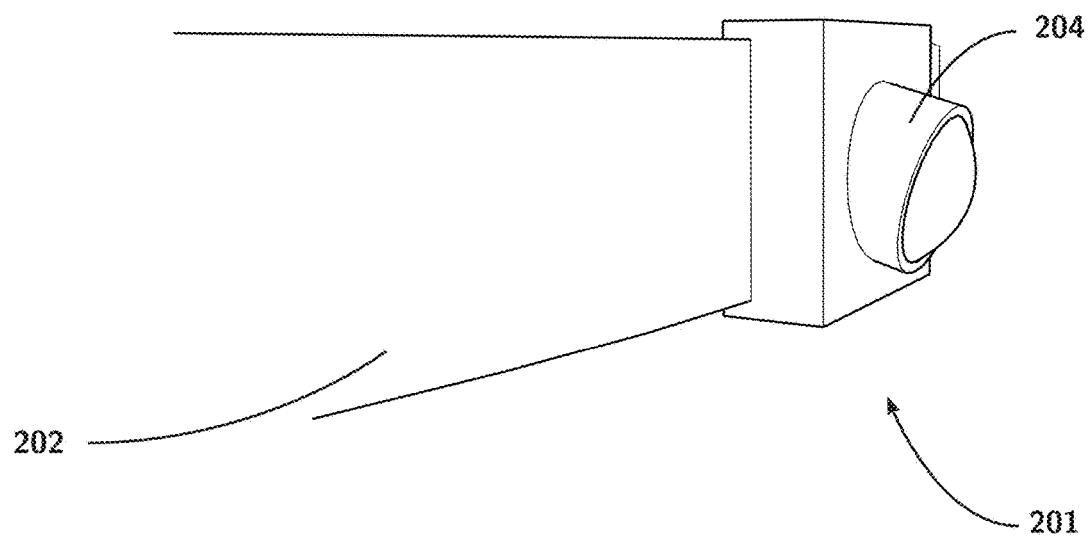
FIG. 2C shows an expanded view of a forward-facing camera of the panoramic camera system of FIG. 2A.

FIG. 2B shows another angle of FIG. 2A. Here, the enclosure for the rear-most camera module 203 is larger than the others, allowing it to hold additional electronics. In general, the cameras and their enclosures do not need to be homogeneous. They can, for example, have different lenses and sensor resolutions. FIG. 2C shows a close-up of the forward-most camera 204, which in this case is angled down slightly. The camera angles could either be adjustable or fixed at some angle to ensure that the resulting panoramic view is roughly parallel with the ground for the particular activity the user is doing.

The panoramic camera system 200 may include one or more microphones for capturing high-definition audio in conjunction with recorded video. It may also include additional sensors such as inertial motion, mapping, and localization sensors. It may also include mechanisms to interact with the user such as a small screen or status LEDs that show camera state and tactile input mechanisms like buttons and switches for adjusting settings.

It is appreciated that the panoramic camera setup described in FIGS. 2A-2C is merely one possible design; many different designs are contemplated and can be utilized in the present disclosure. The gaze directed photography system can utilize any method of recording high-definition images in any field of view. Cameras can be added or removed, and point in any direction. The cameras can be consolidated into a single enclosure rather than being arranged around the head. Devices which take "spherical video" or "fish eye photos" are well-suited to be utilized in the present disclosure. The system may optionally include sensors and projectors to detect depth and movement information. For the purposes of an exemplary system, any image data with a large field of view, whether from a single wide-angle camera or stitched together from multiple cameras, can be utilized. The imagery captured can be of any field of view and captured from any vantage point at any time. It should be appreciated that, in certain embodiments, the panoramic camera system utilizes 3D models, depth-maps, and stereoscopic images and video as described in the present disclosure.

Figure 11:
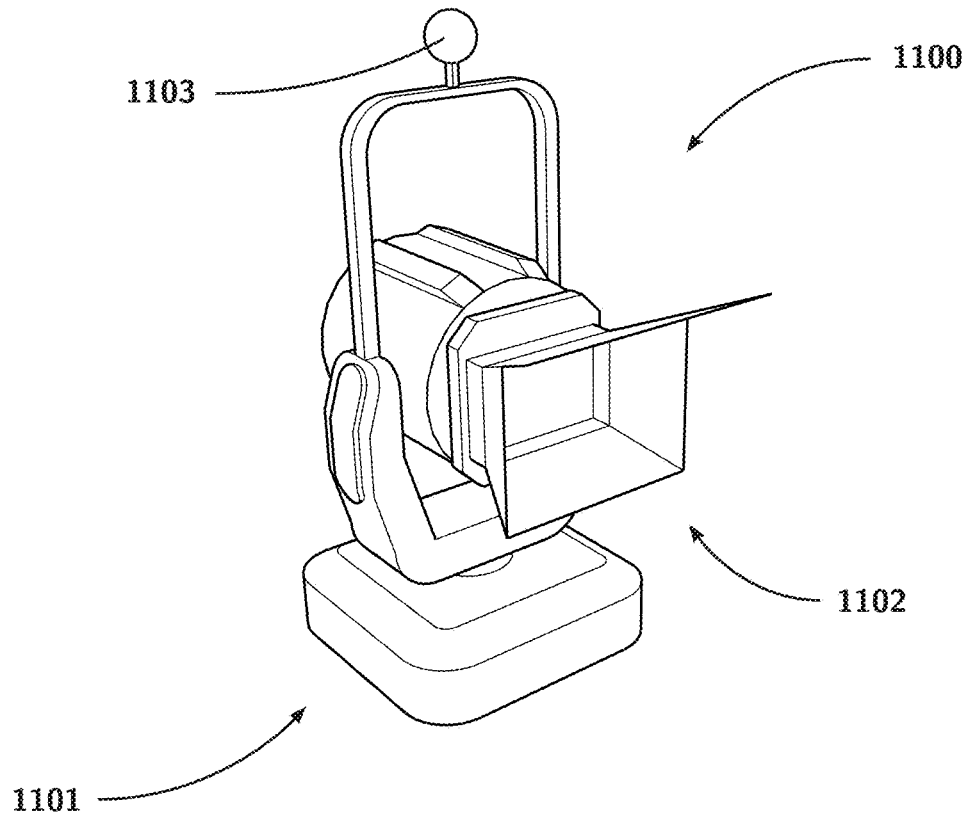
FIG. 11 shows a front perspective view of an exemplary gimbal-mounted television camera.
Figure 25:
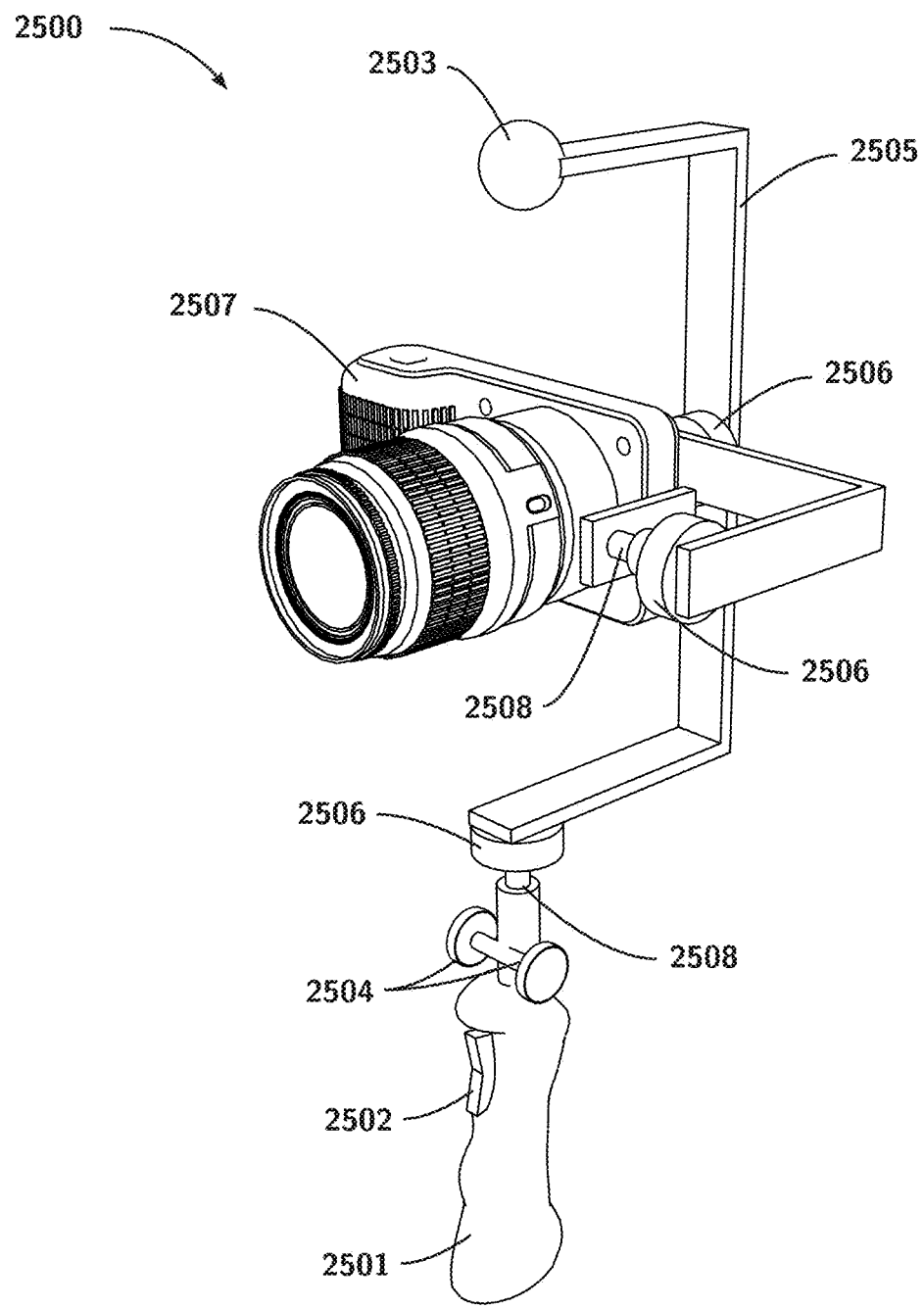
FIG. 25 shows a gimbal-mounted, hand-held camera system.

The wide-angle camera system can also be replaced or augmented with a gimbal-mounted camera, analogous to ones shown in FIG. 11 and FIG. 25. A camera system with a wide field of view can be transformed and cropped down to a smaller field of view in software, which performs a similar function as physically moving a camera on a gimbal. Gimbals may be servo-motor driven. They may perform dual function as both a motion stabilizer for the camera using sensed motion data, and to direct the camera in the direction of gaze.

Figure 3:
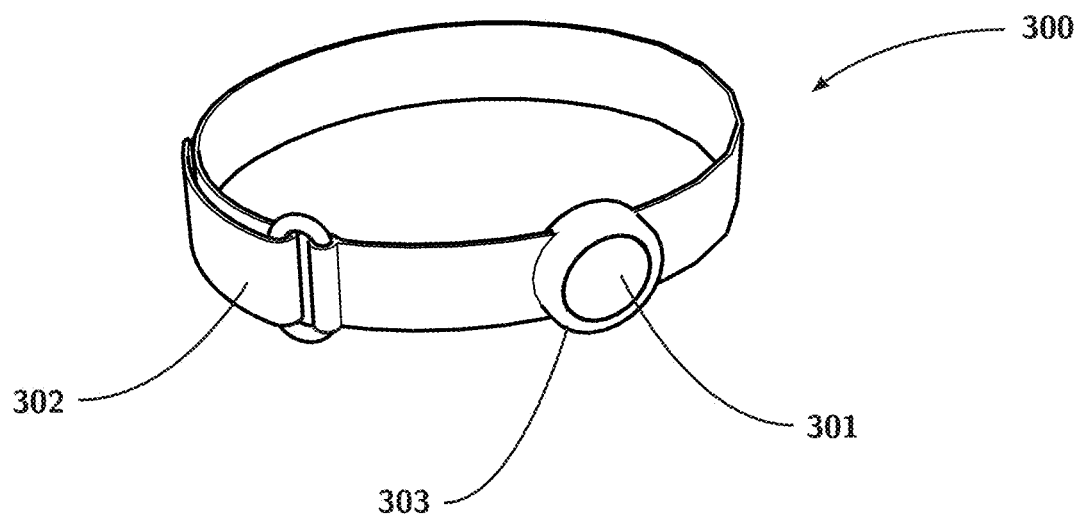
FIG. 3 shows a perspective view of an example trigger button and strap.

FIG. 3 illustrates an exemplary user-input mechanism 300 that is secondary to eye movements in accordance with an exemplary embodiment of the present disclosure. This exemplary mechanism 300 has a two-step button 301, which allows the user to input two kinds of signals by pushing it either halfway or fully. The strap 302 shown here has a hook and loop fastener, but it is appreciated that any other kinds of straps, mounts, and attachments can be used instead. For example, the button could be worn wrapped around the hand in the palm, as a bracelet, on a finger as a ring, attached to handlebars or a ski pole, or anywhere else within convenient reach of the photographer. The enclosure 303 contains any electronics necessary for power and communication with the rest of the system. Using a button is just one example of user input, but any form of input would work for gaze-directed photography.

Other examples include voice commands and hand or eye gestures such as a double-blink or a long single blink. Other eye gestures are contemplated and can also be used with the present disclosure. In certain embodiments, the control system recognizes if a user looks at a particular object or scene long enough, or has a long enough dwell time, and subsequently takes a photo or begins tracking the object. Other input mechanisms are contemplated. For example, sensors implementing electroencephalography (EEG) or electromyography (EMG) can allow the user to use intentional physiological signals as a control mechanism. Triggers could also include unintentional signals, such as deviations in heart rate, EEG signals, and pupil dilation. A touchscreen, smartphone application, or other more advanced user interface can be used, and contemplated to be within the scope of the present disclosure, to control the camera system, e.g., adjusting the camera settings and managing, sharing, editing, and deleting saved images. Advanced functionality can also be accessed with voice commands or eye gestures. For example, the user input may recognize the user briefly looking up and subsequently delete a last photo taken.

Figure 4:
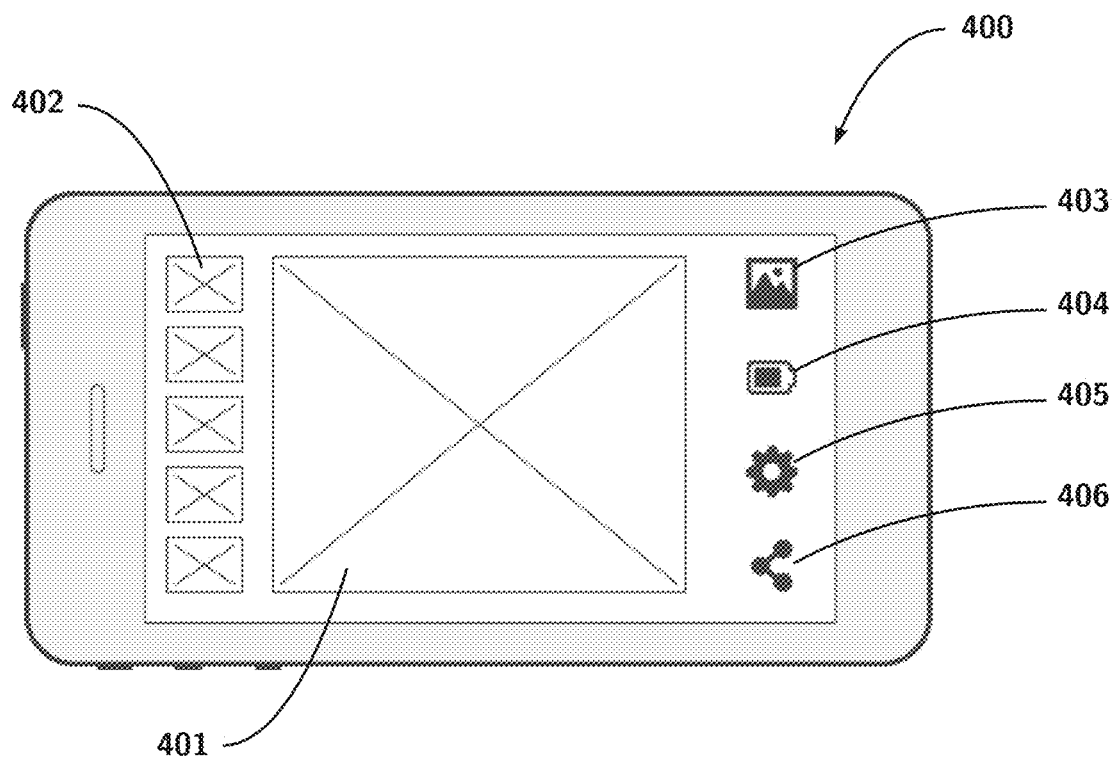
FIG. 4 shows an exemplary user-interface on a smartphone that interacts with a camera system.

FIG. 4 shows an exemplary user interface (UI) 400 of a smartphone incorporating a custom remote-control application of the present disclosure. As an example, the user interface can provide access to one or more functionalities, such as remotely triggering an image 403, viewing camera state such as battery life 404, changing system-wide camera settings 405, and sharing images over the internet 406. The user interface can also include a large preview of the most recent taken picture 401 and a history of previously taken images and videos 402. It is appreciated that a similar external user interface can also be used with the additional embodiments described herein. Moreover, the user interface is not necessarily limited to a smartphone, it can be implemented on any computing device.

Figure 5A:
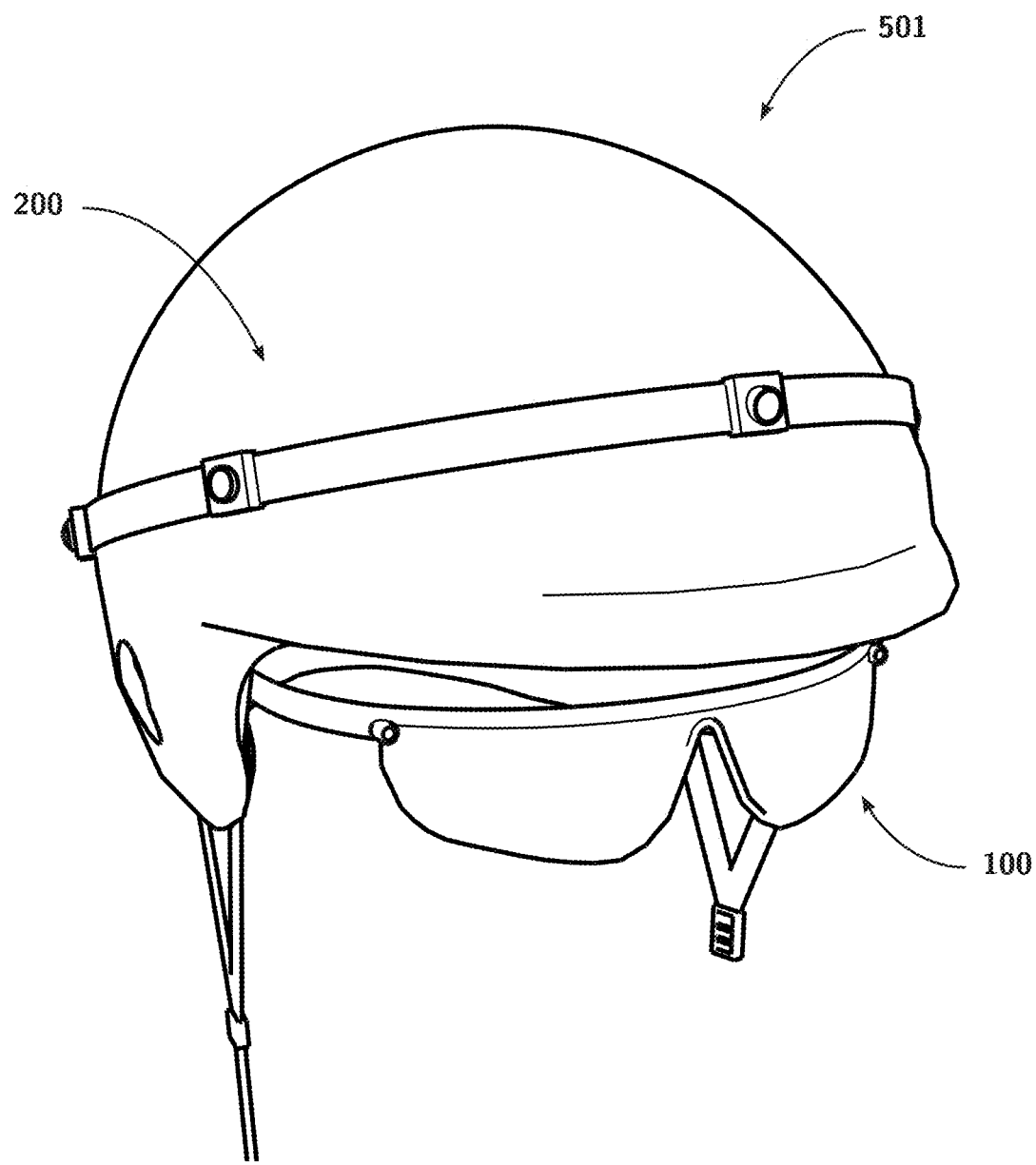
FIG. 5A shows a front perspective view of an exemplary bicycle helmet incorporating or in use with the tracking glasses of FIG. 1A and the panoramic camera of FIG. 2A.
Figure 5B:
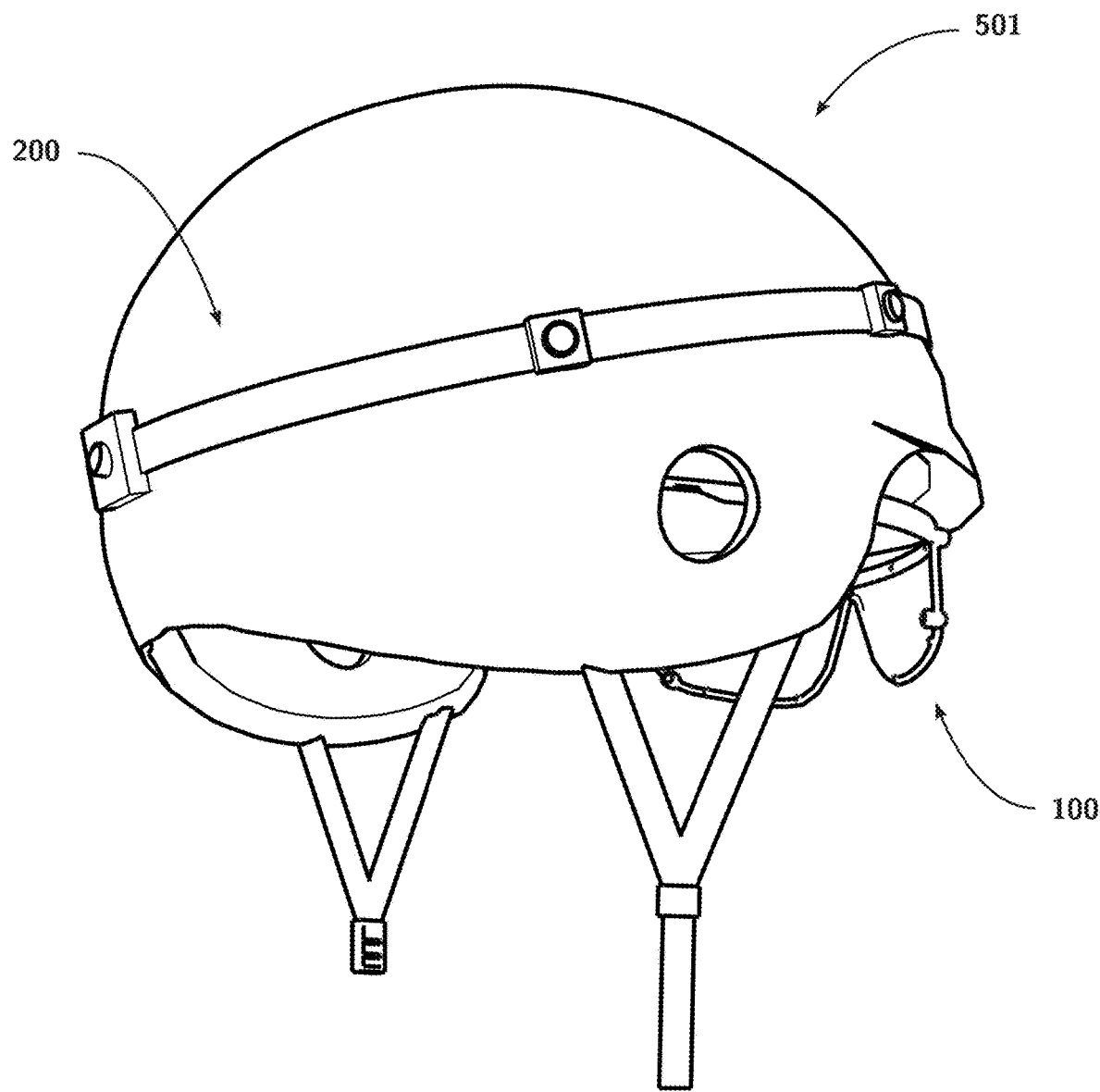
FIG. 5B shows a back perspective view of the bicycle helmet of FIG. 5A.
Figure 5C:
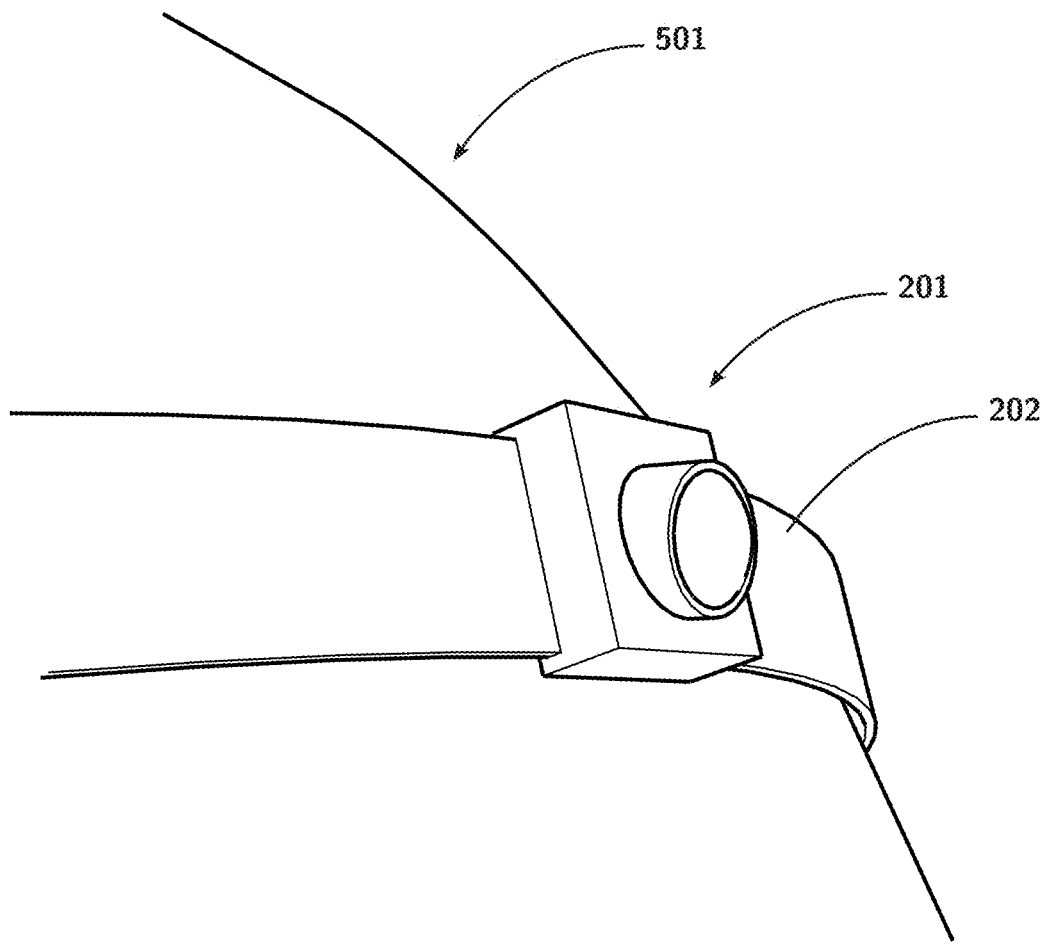
FIG. 5C shows an expanded view of a forward-facing camera of the panoramic camera system of FIG. 5A.

FIGS. 5A-5C show an example of how the panoramic strap 200 and the gaze tracking glasses 100 might be worn together in accordance with an exemplary embodiment of the present disclosure. In this example, they are being used with a bicycle helmet 501. It is appreciated that the strap 200 can be secured to the helmet in any way, for example from the compression force of elastic straps, from a ratcheting tightening mechanism, or with adhesive tape. Alternatively, the cameras can be attached directly to a hat or helmet. The glasses 100 are shown worn under the helmet, but they can also be designed as goggles that would be worn over the helmet, or even a head-mounted device without lenses. In accordance with an exemplary embodiment of the present disclosure, all of the cameras and eye-tracking functionality can also be incorporated into a helmet or hat as a single unit.

FIG. 5C shows a close-up or expanded view of one camera module 201 mounted to the strap 202 and worn over the bicycle helmet 501. In accordance with an exemplary embodiment of the present disclosure, the camera lens and sensor are angled down relative to the enclosure and strap, which compensates for the angle of the front of the helmet. This angle could either be fixed or adjustable by the user.

The figures described so far are just one representative example of how a camera system can be used in conjunction with a gaze-tracking system. For example, the cameras can be sewn into a hat and used by police officers; the camera can be a wide-angle camera mounted to the top of the helmet; the gaze-tracking system and camera can be integrated into a single device, potentially built into a helmet. In accordance with the exemplary embodiment of the present disclosure, the gaze-tracking system measures the user's gaze with respect to the world, and also records high-definition images of the world.

Figure 6:
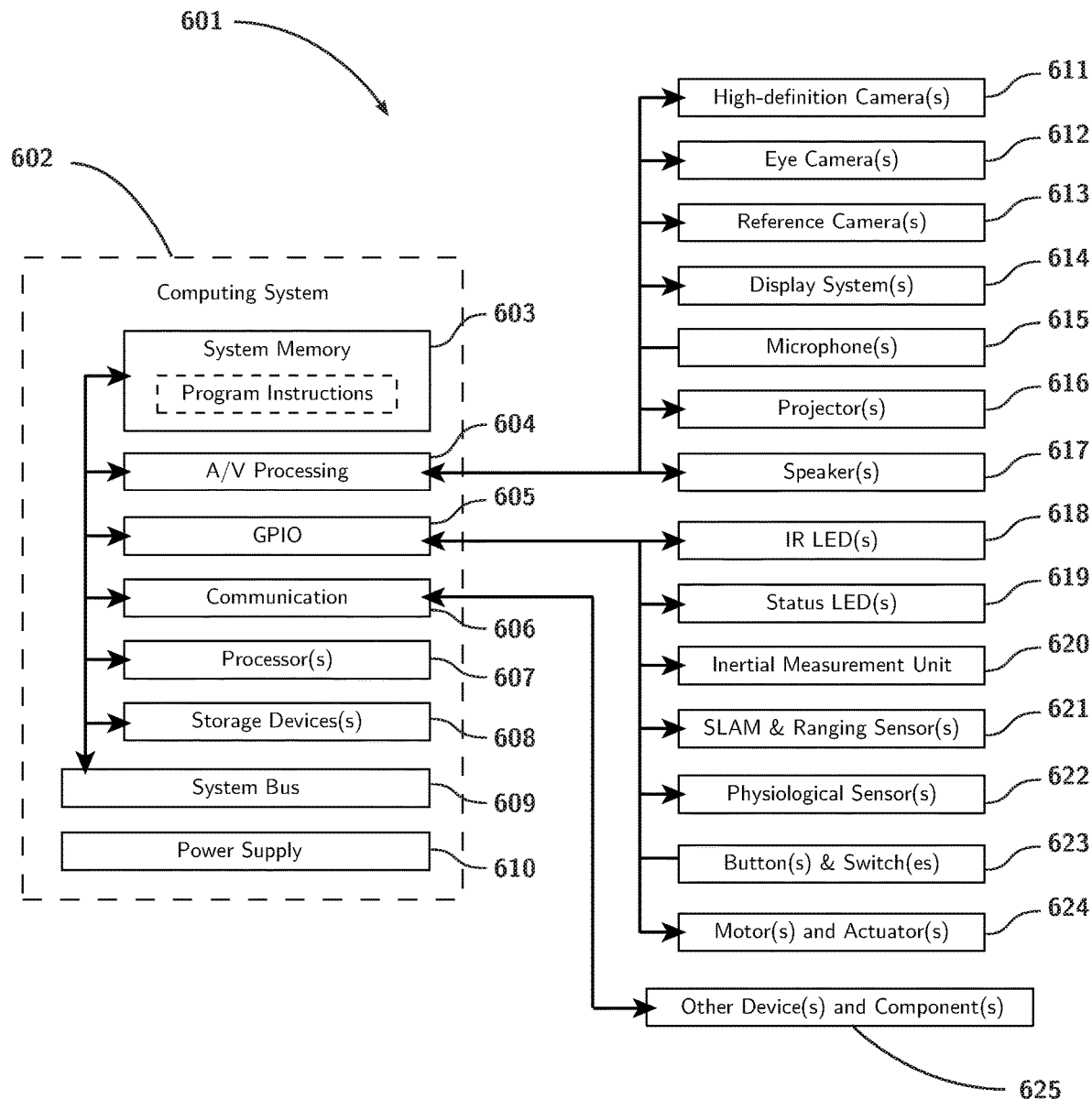
FIG. 6 shows a block diagram of an exemplary computing system.

FIG. 6 is a schematic showing one exemplary computing and networking architecture of the system in accordance with an exemplary embodiment of the present disclosure. A computing system 602 provides fundamental operating requirements and comprises system memory 603, which can be any type including volatile or non-volatile RAM or ROM. The system memory 603 contains operating instructions that carry out some of the processes described herein. The computing system 602 also can comprise input and output interfaces for audio, video, and images 604, general digital and analog I/O 605, and communication 606 with other devices 625. For example, the other devices can be cameras 1100 and/or 1301 (see FIGS. 11, 13A-C), phones (see FIGS. 4 and 18A-B), triggering systems 300 (see FIG. 3), external computers, remote servers, or any other device. The communication can occur over wired or wireless connections, using any communication protocol. The computing system 602 also can comprise one or more processors 607 which may be of any type, including CPUs, GPUs, ASICs, and DSPs. The computing system 602 also can comprise either internal or external data storage device 608 or both, which can be of any type including flash memory, hard disks, or EEPROM. The computing system 602 also can comprise a system bus 609, which communicatively connects the other components 603-608. The computing system 602 also can comprise a power supply 610 for powering the computing system 602. It is appreciated that the various components of the computing system 602 can be implemented as separate components, or all within a system on a single chip, or any combination thereof.

Referring back to FIGS. 5A-5B, the glasses 100 and the panoramic strap 200 are shown connected together and share a single computing system 602 and a power supply 610, which can be located in the rear panoramic strap camera 203. It is appreciated that the present disclosure is not limited to such configuration and other configurations can be utilized as well. For example, the computing system 602 can be located in its own enclosure and worn for example on the hip or carried in a pocket. Or, the glasses 100 and panoramic strap 200 be implemented as independent systems with their own computing system 602 and communicate with each other as external devices 625. Or, each camera on the panoramic strap 200 could have its own computing system 602 but share a single power supply 610. Other devices such as remote servers, a tablet or personal computer, a smartphone, a portable processor based device are also examples of computing devices 601, which can perform one or more functionalities or processes. Other options are possible and are within the scope of the present disclosure.

In FIG. 6, the computing system 602 controls the cameras 611, 612, and 613 which can correspond to cameras 101, 102, 201, 203 and other cameras discussed in the present disclosure, in accordance with an exemplary embodiment of the present disclosure. The computing system 602 also controls the infrared LEDs 104, 618, which are used to illuminate the user's eyes. The computing system 602 can also control a variety of ways for the system to interact with the user such as a microphone 615, or microphone 1703 (see FIG. 17A) for voice input, a speaker or transducer 617 for audible output, status LEDs 105 for visual output, and various tactile inputs 623. Other microphones are also used to capture high-quality audio in conjunction with the recorded video. The computing system 602 can also communicate with inertial sensors 620 for tracking the devices' orientations, and sensors or systems for simultaneous localization and mapping (SLAM) and ranging sensor(s) 621. These sensors may include inertial measurement units (IMUs), gyroscopes, accelerometers, magnetometers, global positioning system (GPS), and the like. The computing system 602 can also communicate with ranging sensors 621. The ranging sensors may include lidar, sonar, depth-sensing cameras, and other ranging and 3D scanning mechanisms. The computing system 602 can also communicate with structured light projectors 616. The computing system 602 can also communicate with physiological sensors 622 such as electroencephalography (EEG), electromyography (EMG) sensors, and heart-rate monitors. The computing system 602 can also control one or more displays such as display systems 614, 1302 (see FIGS. 13A-B), display 1903

(see FIGS. 19B-19E, 19H, 20 and 21) or general-purpose displays for viewing and modifying system state. Furthermore, the computing system 602 can control various motor(s) and actuator(s) 624.

The computing system 602 can communicate with external devices that can be other computing systems similar to the computing device 601. For example, the manual trigger 300 can be implemented with its own computing system and communicate (with wires or wirelessly) with the glasses 100 and panoramic strap 200 as another device 625. The trigger 300 can also be implemented without a computing system as a tactile input 623.

A cross-country bicyclist might ride for hours and miss dozens of interesting photo opportunities because stopping for each one would take too long with a traditional camera and viewfinder. They also might wear a traditional helmet-mounted camera, but not capture nicely composed photos or videos. This person can benefit from utilizing the gazed-directed photography system. The bicyclist can use the wireless trigger 300, as shown in FIG. 3, strapped to the handlebars; while riding, the rider can simply look at a scene and snap a shot. When the button 301 is pressed, an image from the wide-angle camera setup 200 and the user's gaze location relative to that image are recorded. Alternatively, the bicyclist can trigger the recording by double-blinking, or using another suitable gesture as previously described herein.

The control system can automate one or more framing processes. For example, when using instantaneous gaze target to direct the camera's aim, the control system automatically decides for the user what framing of the scene around that point should be. Alternatively, when using the user's gaze over a period of time to scan a scene and define framing, the control system captures a tight crop around everything user looked at—in some embodiments, after rejecting outliers or converting the data to a heat map. It is appreciated that the control system utilizes some automation to determine the exact framing both because the user input is not exact and because the image will (usually) need to fit in a particular aspect ratio. The photograph can also be leveled with the horizon using IMU sensor info.

For example, the control might select the framing around the target by simply centering the framing around the target. It also might choose framing based on an aesthetic cropping heuristic. Aesthetic heuristics might include the "rule of thirds", balance, symmetry, depth accentuation, object amputation avoidance, and machine learning algorithms such as neural networks that have been trained to identify optimal composition based on a corpus of human-ranked image data.

Figure 16A:
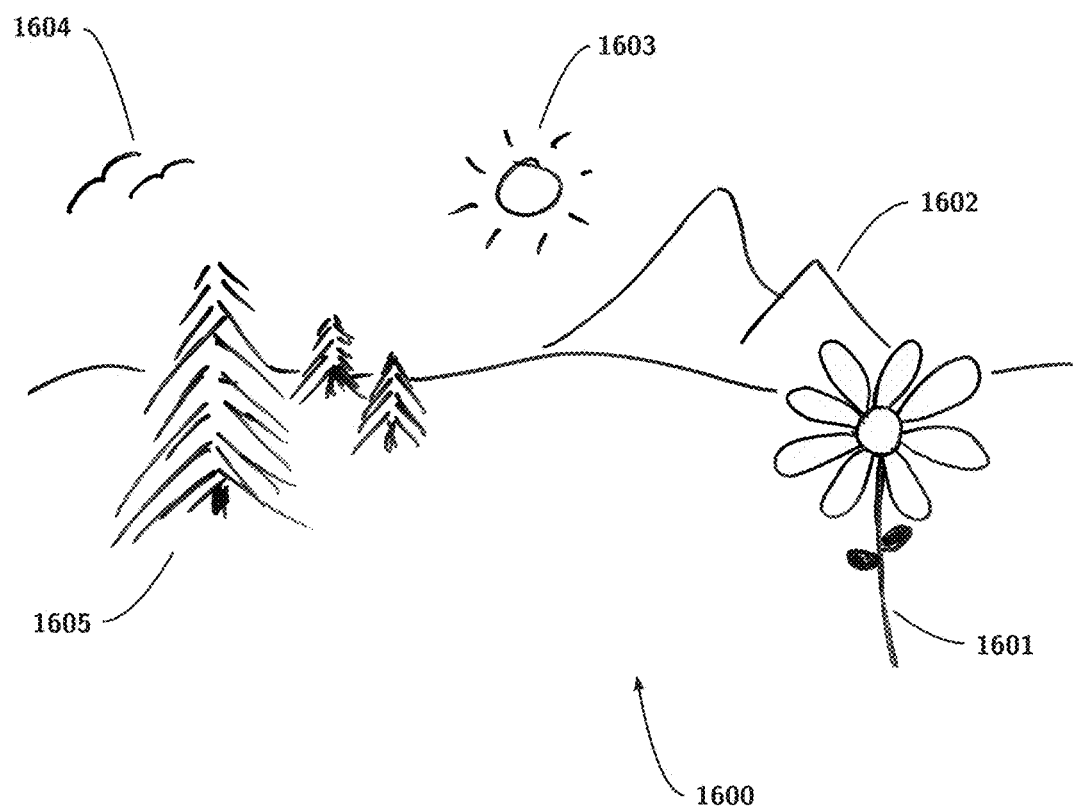
FIG. 16A illustrates an exemplary scene.
Figure 16B:
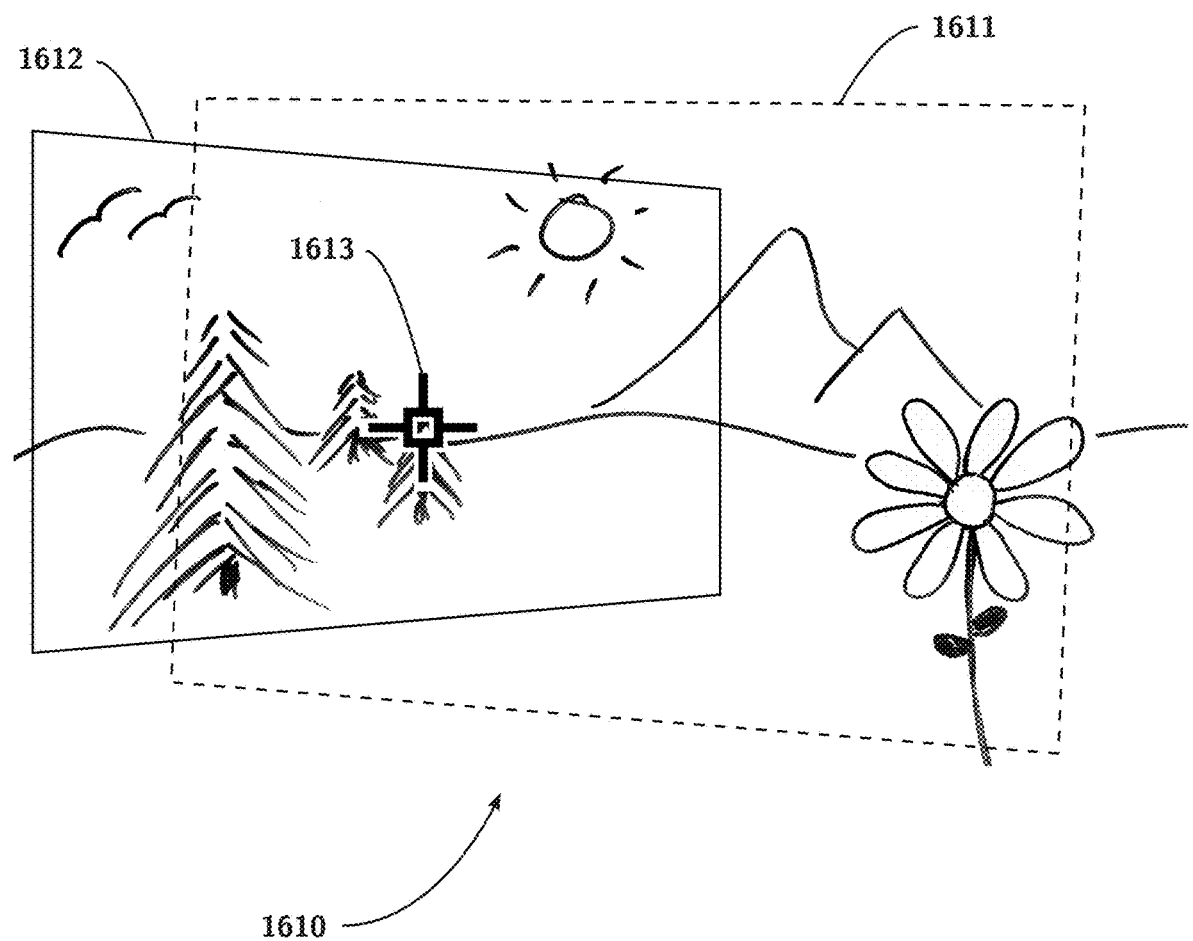
FIG. 16B depicts a representation of mapping a gaze target onto another camera's field of view.
Figure 16C:
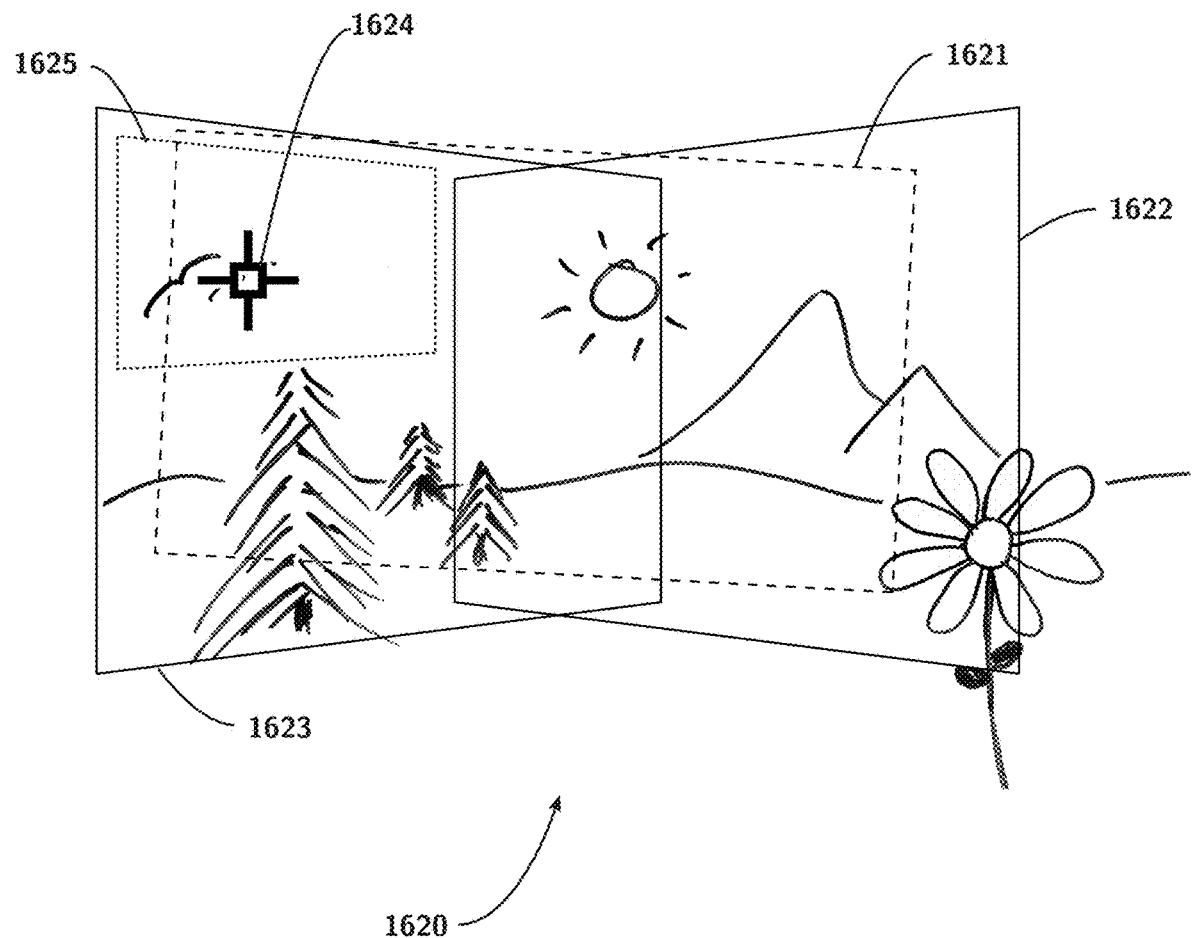
FIG. 16C shows a further representation of gaze-directed photography using a panoramic setup.
Figure 16D:
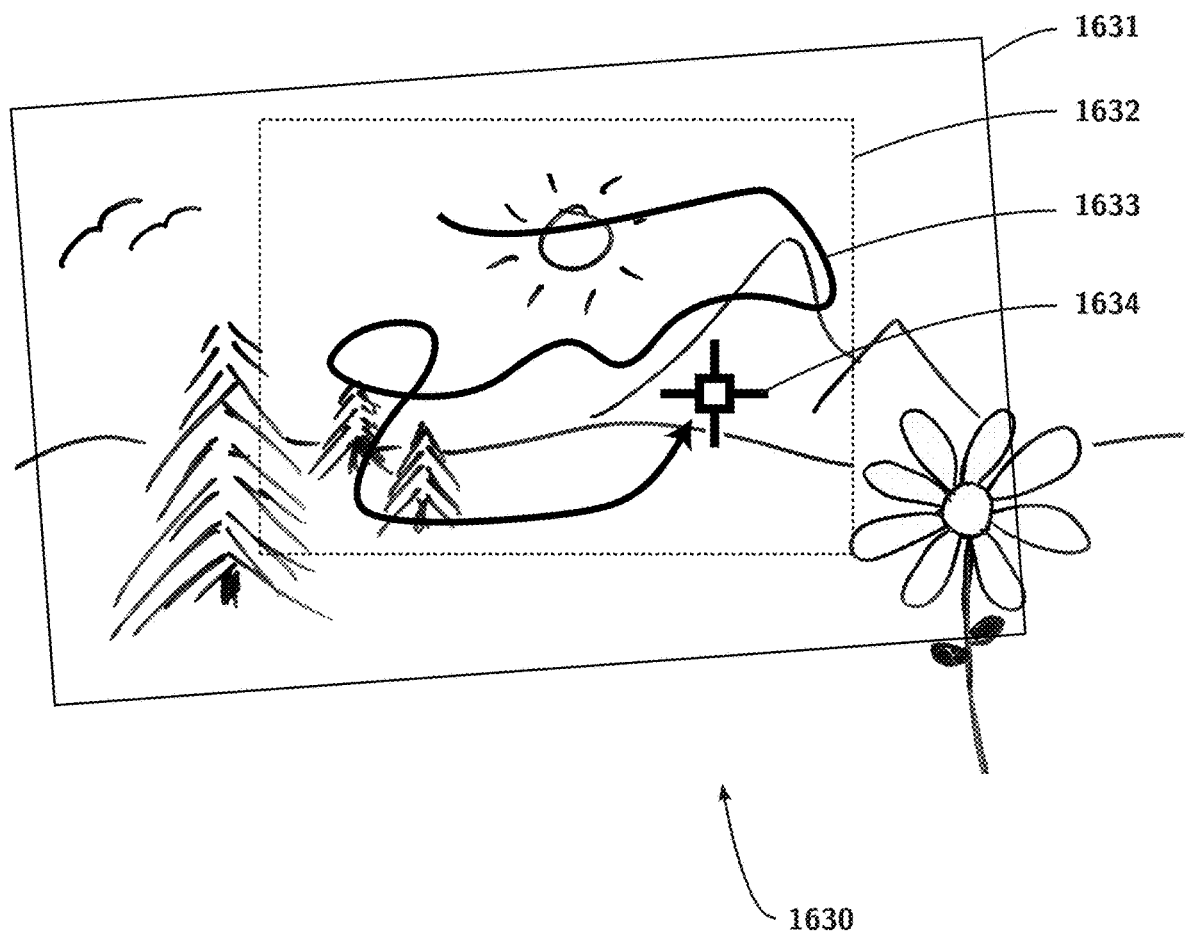
FIG. 16D illustrates a representation of a composition from tracking gaze targets over time.

Referring to FIG. 16D, the control system can also use gaze targets in a recent time window to select the framing around the target in addition to or instead of an aesthetic cropping heuristic, as shown by a sample representation 1630. For example, the user can hold down a button halfway while glancing over the example scene 1600 or fixating briefly on multiple objects to compose the shot before triggering. The control system will record a path 1633 of the user's gaze 1634 and determine one or more objects the user targeted within the field of view 1631. Alternatively, the system can use the gaze targets in a recent time window. These targets can be optionally weighted in importance so that most recent targets are weighed higher. In this case, the control selects a framing 1632 around the target based on a combination of aesthetic cropping heuristics, using weighted gaze location over the period of time, and IMU data for horizon leveling. Optionally, the first or last object in the scene can be optimized for, in terms of focus and brightness.

Figure 7A:
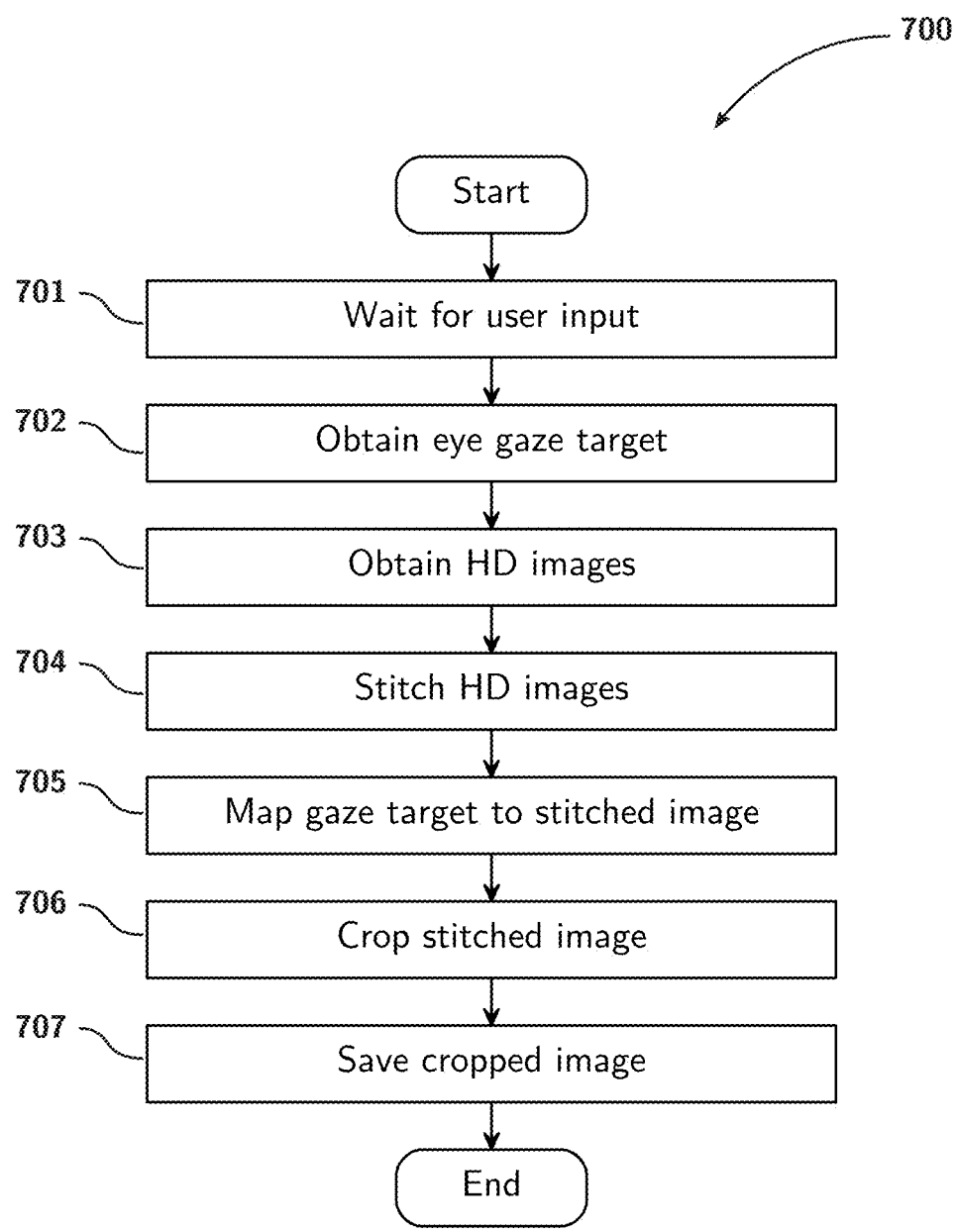
FIG. 7A shows an exemplary process for utilizing a camera system for gaze-directed photography with panoramic images.

Referring back, FIG. 7A shows an exemplary process by which the gaze-directed photography system performs basic composition in accordance with an exemplary embodiment of the present disclosure. In this example, the user is wearing the helmet 501 with glasses 100, panoramic camera strap 200, and trigger 300. The system waits at 701 for the user to press button 301. In 702 the system records where the user's gaze is with respect to the image taken by the glasses' reference camera(s) 101. In 703, all cameras on the panoramic strap 200 take simultaneous photos. In 704 these photos are stitched together to create seamless, cohesive image data. In a similar manner, in 705 the reference image from 101 and gaze target from 702 are also mapped to the stitched image data. In 706, aesthetic heuristics and other factors are used to choose a framing around the gaze target as mapped to the HD panoramic photo. A projection is chosen to produce a flat output image, and the image is projected and cropped. Finally, the resulting crop is saved in 707.

Each camera has its own parameters, such as focus, exposure, and motion compensation, but in one or more embodiments the cameras are synchronized by the control system. For example, if the gaze target is within the field of view of multiple cameras, the control system would send instructions to each camera to focus on the distance of the gaze target, whether or not the gaze target is in that camera's field of view. This allows the images to be more easily stitched together. It also allows the cameras to achieve a bokeh effect using a shallow depth of field and still be stitched together.

It is appreciated that stitching together the images from the cameras and cropping the resulting image is not strictly necessary to achieve a gaze-directed photograph. Another possibility is to determine which of the images from multiple cameras 201 has the gaze target nearest to its center. That image can be saved and optionally cropped as described above, and the remaining images can be discarded.

Referring now to FIGS. 16A-C, FIGS. 16A-C depict representations of the processes 700. FIG. 16A illustrates an example scene 1600 that a user encounters, including a plurality of objects 1601-1605 that are potentially of interest, in different positions and at different depths in the scene. For example, the flower 1601 is in the foreground and the mountains 1602 and sun 1603 are very far away. Each object 1601-1605 is a potential target of the user's gaze that the user may wish to photograph. FIG. 16B is an example representation 1610 of mapping a gaze target between two fields of view. Since a field of view 1611 of the forward-facing reference camera 101 is not necessarily the same as a field of view 1612 of the high definition camera 201, the control system maps the gaze target 1613 of the user from the gaze tracking glasses' field of view 1611 to the field of view 1612. The control system may do this by calculating a transformation from the field of view 1611 to the field of view 1612. This transformation may be a homography computed by searching each image for matching keypoints. In some embodiments, the transformation is computed using a dense optical flow between the two fields of view. In certain embodiments, the transformation incorporates IMU data from both the glasses 100 and the camera system 200. The control system may also perform an object or pattern search of the field of view 1612 for an area similar to a small patch of image under the gaze target in 1611. In further embodiments, the control system also creates a unified 3D model of the world using structure from motion, ranging sensors, IMU data, stereo vision, and other techniques, and use this 3D model to refine the mapping. The control system may also use any other suitable method for mapping a target from a first field of view to a second field of view. In other embodiments, the control system uses any combination of these techniques combined with a probabilistic algorithm such as a particle filter or Kalman filter, which may use Bayesian reasoning to decide the most likely mapping based on a stream of multiple potentially noisy or contradictory input signals.

FIG. 16C shows a further representation 1620 of the processes 700 using a panoramic setup. A first image 1623 and a second image 1622 taken by the camera are stitched together as previously described to generate a stitched panoramic image. A gaze target 1624, in this case a bird 1604 of the scene 1600, is mapped from a field of view 1621 of the reference camera 101 onto the stitched panoramic image. Furthermore, the control system then crops the stitched image to generate a cropped image 1625 that emphasizes the gaze target 1624. Additionally, object tracking can be used to maintain focus on the bird 1604 and the user can take further pictures, even when the user is not holding their gaze on the bird 1604.

Figure 7B:
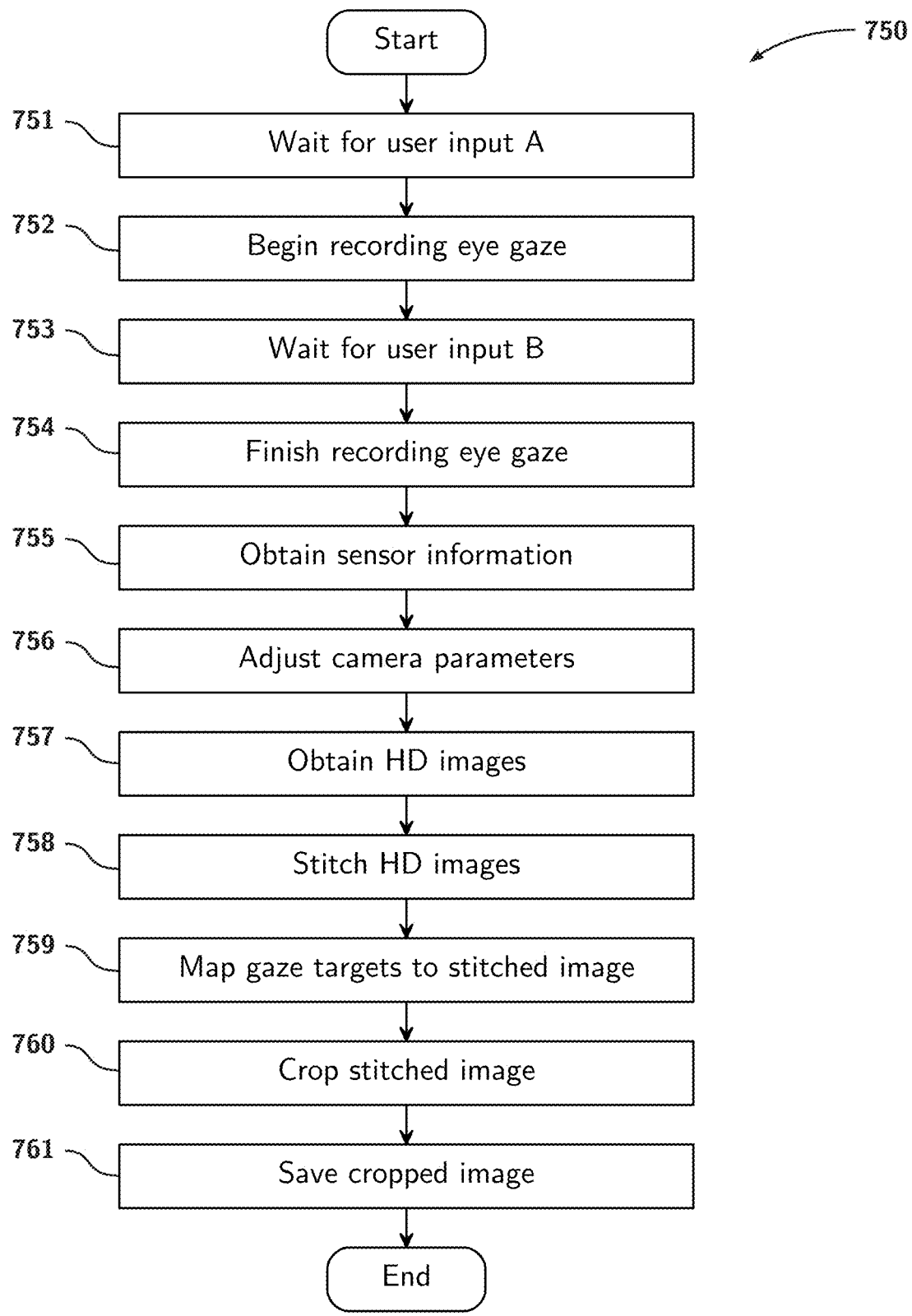
FIG. 7B shows an exemplary process for utilizing a camera system for gaze-directed photography with panoramic images.

Referring back, FIG. 7B shows a variation of FIG. 7A with more sophisticated compositional functionalities in accordance with an exemplary embodiment of the present disclosure. First, in 751-754, the system accepts two kinds of user input and captures eye gaze over a period of time. The user inputs A and B here might be for example a half-press and full-press, respectively, of the trigger button 301. This additional user input gives the ability for the user to look at multiple objects or scan over a scene, effectively defining the region or objects of interest. It is appreciated that inputs A and B may occur nearly simultaneously, which means that it is still possible to target just a single gaze point rather than a region, such as in FIG. 7A. 755 is an opportunity for the system to gather additional sensor data, such as from 620 and 621. For example, range sensors can determine a depth map of the scene, and inertial sensors can determine movement, vibration, and orientation information. Some of this data can be used to adjust camera parameters in 756 such as focus, exposure, and motion compensation prior to taking the HD photos in 757. This extra sensor data can also assist further in the process at 760. For example, orientation information can help make sure the final framing and crop is level with the horizon. Furthermore, in step 756, the data also allows a user to dynamically refocus multiple cameras in unison and achieve automatic rack focusing during video recording, as will be described in more detail below in reference to FIGS. 11 and 16F.

Figure 8A:
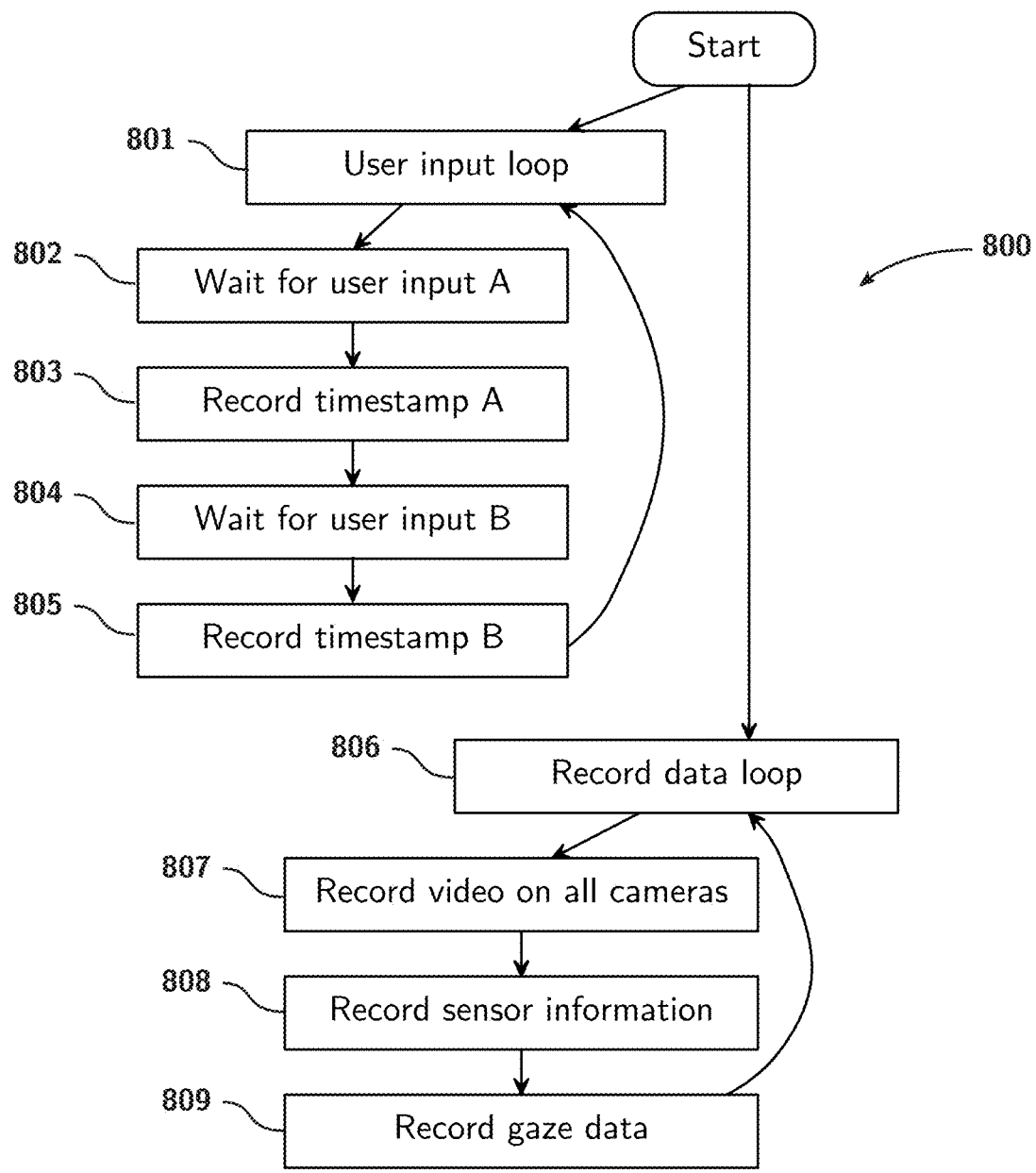
FIG. 8A shows an exemplary process for utilizing a camera system for gaze-directed cinematography.

FIG. 8A shows how processes similar those in FIGS. 7A-7B can be applied to video and cinematography in accordance with an exemplary embodiment of the present disclosure. This process 800 has two concurrent sub-processes: continuous data recording in 806-809 and intermittent user input in 801-805. For the duration of use, all HD video 807, sensor information 808, and gaze data 809 are obtained and recorded. At the same time, the user has the ability to periodically indicate gaze targets, and these targets are recorded and associated with a timestamp in 801-805. In one embodiment, information regarding gaze targets and user input can be relayed to the cameras to control camera parameters. Targets can also be indicated with dwell time or other related indicators, which may not necessarily be intentional.

Figure 8B:
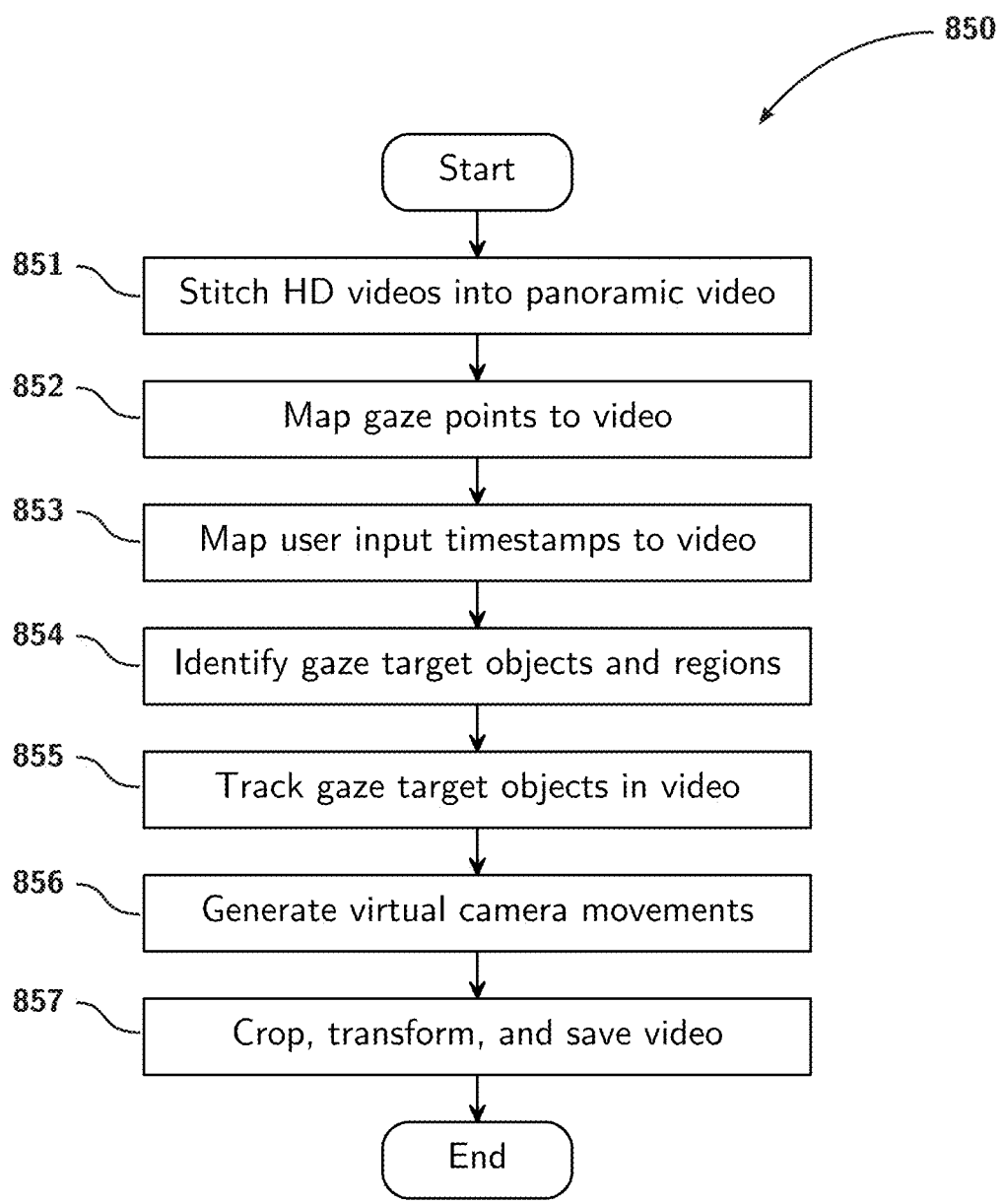
FIG. 8B shows an exemplary flow chart for processing data recorded in FIG. 8A into output video.

FIG. 8B shows how the data recorded during process 800 is processed in method 850 to produce an output video. In some embodiments, all processing in method 850 is performed after recording to save power and battery life. The process is similar to a single photo, except that the panoramic is now a video. In 851, HD videos are stitched into a panoramic (or "spherical") video. Then, in 852, gaze points are mapped to the panoramic video. In 853 and 854, the user's objects and regions of interest are identified at particular times in the panoramic video. In 855, object tracking is used to identify how those objects and regions move in the periods between user input. In 856, virtual camera movements are created to follow objects of interest and interpolate between framings that were defined by the user input and aesthetic heuristics, as shown and described in FIG. 16E. Given these generated virtual camera movements, in 857 the final video is projected and rendered.

Figure 16E:
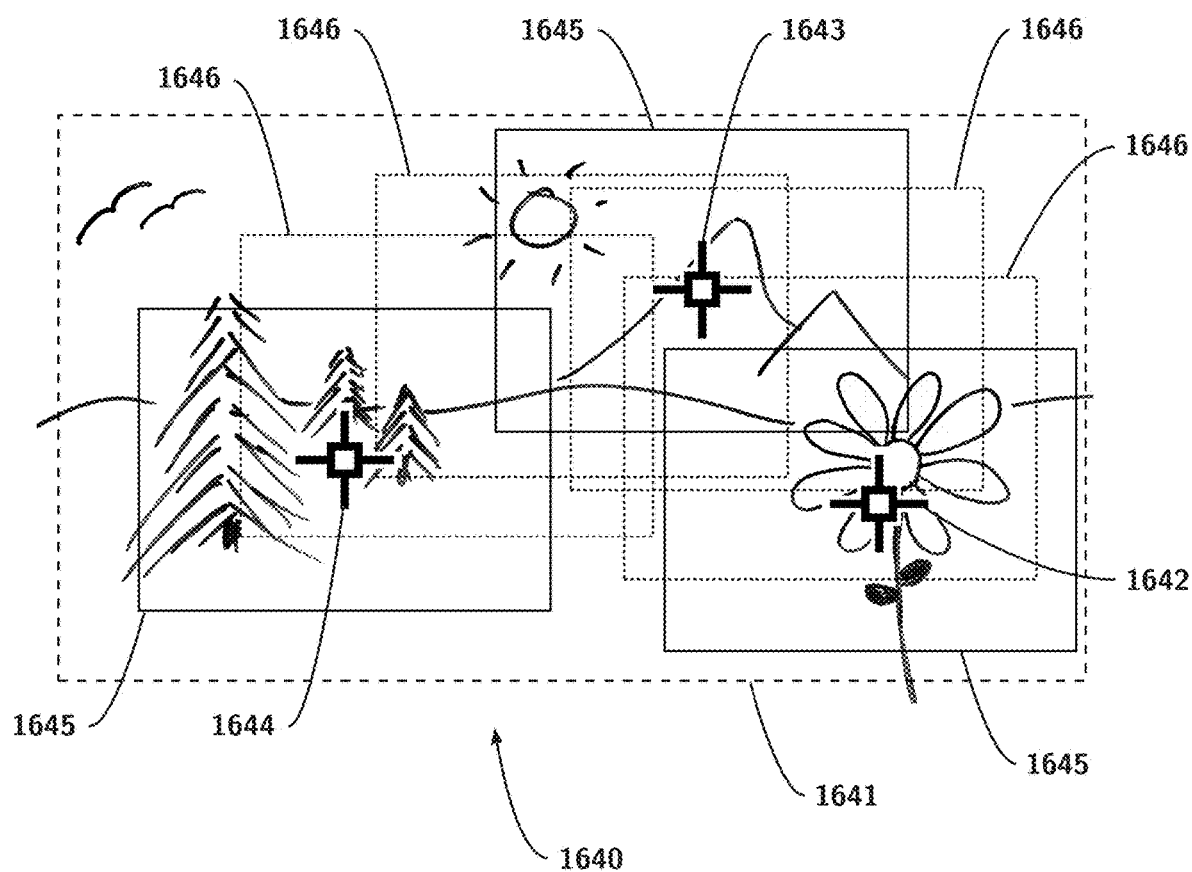
FIG. 16E shows an example representation of a compositional interpolation of a video.

Referring to FIG. 16E, FIG. 16E illustrates a representation 1640 of a compositional interpolation for video as described by the processes 800 and 850. Gaze targets 1642-1644 are mapped onto a panoramic video 1641 and are identified at particular times. For example, the user indicates gaze target 1642 at a first point in time, then later at target 1643 at a second point in time, then even later at target 1644 at a third point in time. In order to generate a resulting video, the system first generates three key frames 1645 around the gaze targets 1642-1644 using similar cropping and framing techniques as described in the present disclosure. Then, when the system creates virtual camera movements to interpolate between the gaze target locations, it generates intermediary frames 1646 that pan between targets and produce the final video. As discussed in the present disclosure, the system can also identify how the objects represented by the gaze targets 1642-1644 move with object tracking. The system can use this object tracking to generate additional keyframes around the target objects even when the user is not looking at them. Other options for automated cinematography are also possible. For example, sped-up 'hyperlapse' videos can be generated which use gaze targets as a predominant focus point, and also stabilize the sped-up video. Motion data from the devices can also be incorporated in order to stabilize, orient, and interpolate the frames.

Furthermore, referring back to FIGS. 8A-B, if a user is wearing a panoramic camera system such as system 200, the control system may track an object even after it leaves the user's field of view. In one example, the user begins tracking an object, a car driving towards the user for instance, that moves out of their field of view. The object may remain in the field of view of one or more cameras of the camera system, such as the rear-facing cameras recording behind the user's head. The system continues to track the object contained in the images or video from the one or more cameras. In this way, the control system may stitch together an image or video with object tracking, even when the object of interest is behind the user's head.

A characteristic of all embodiments of the gaze-directed photography systems is that the user's point of view is not necessarily the same as the point of view of the high-definition camera(s), and some amount of translation may be necessary to map user gaze estimations to points in the world and to pixels on an HD image. This translation can take a number of forms, from a mapping between 2D coordinate systems to a complex 3D model of the world based on any number of available sensors.

Alternatively, referring to FIG. 1C, when the HD cameras are sufficiently close to the user's eyes, the control system may map the user's gaze directly to the HD images without the use of a world reference camera. FIG. 1C shows gaze tracking glasses 100 without forward-facing reference cameras. The glasses 100 have a frame 103 and may include one or more rear-facing cameras 101, and one or more infrared or regular LEDs 104 as previously described herein. Mapping gaze directly to the HD cameras may result in a lower gaze target tracking accuracy than would be achieved using a world reference camera if the HD cameras are not attached rigidly to the eye-tracking cameras. However, it is possible to calibrate the system to behave sufficiently well to achieve correct framing of photos around gaze targets without using a reference camera. As discussed in the present disclosure, it is even possible to skip stitching and simply select the HD camera view that has the gaze target closest to its center as a base image. This base image can be cropped as discussed in the present disclosure, or outputted as-is with no cropping. The result will still be an image that emphasizes the target of the user's gaze at the time the picture was taken.

In accordance with an exemplary embodiment of the present disclosure, the control system finds a mapping that defines a relationship between points in images, as shown and described in FIG. 16B. The problem is similar to stitching together partially-overlapping photos and videos into mosaics and panoramics. The relationships between images can be computed geometrically by the control using known information about the locations of the cameras, but are more commonly computed by comparing image features and calculating the 'best fit' mapping as discussed in the present disclosure. Additionally, in real-world scenarios, data will not overlap perfectly because of occlusions, lens distortions, changes in exposure, and a host of other issues. A wide range of techniques can be used for finding the best fit, optimal seams, and required transformations to mesh all the data together. Additionally, information about the epipolar geometry of the scene and the relative poses of the devices can be used to refine the mapping.

In some embodiments, data coming from multiple sensors is integrated into a unified world model. A more complex model might incorporate additional features and sensor inputs. For example, we could track the relative distance and orientation between the HD cameras and the glasses—commonly called 'relative pose estimation'—using inertial measurement units (IMUs) and other sensors. 3D models such as point clouds can be generated using a combination of ranging sensors and computer vision techniques like bundle adjustment, structure from motion, and multiple-perspective vision. All this information can be combined into a unified world model using probabilistic techniques such as particle filters, Kalman filters, and other techniques common in probabilistic mapping and localization algorithms.

With a 3D model of the surrounding world, the control system will have increased performance of camera control. For instance, depth information associated with various objects in the 3D model may seed the auto-focus of the camera with an approximate depth to begin searching. 3D information about the world can also help refine gaze target estimation as discussed in the present disclosure.

In accordance with an exemplary embodiment of the present disclosure, a few techniques can be used by the control that allow the user to capture images or video that they are interested in, but may not have been prepared to take—either because something happened too quickly, or because the user did not actually see something or react in time. The general pattern is to opportunistically capture HD images or video and save them to a temporary buffer of data. This temporary memory buffer is kept filled with the most recently captured data.

Figure 9:
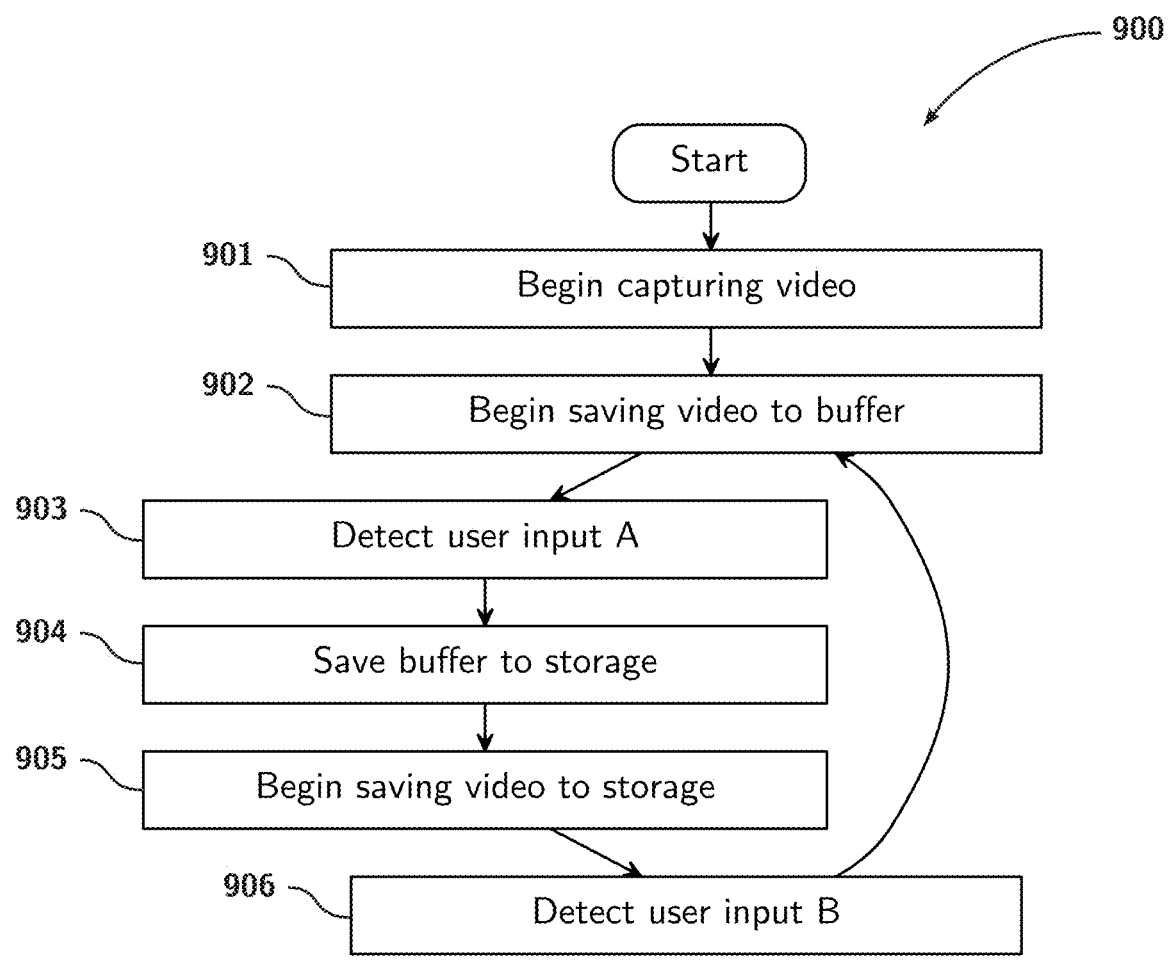
FIG. 9 shows an exemplary process for enabling a user to record post hoc images and video that already occurred.

FIG. 9 illustrates a method 900 for saving temporary buffer data as concise video fragments. The system is turned on, and immediately begins recording HD video in 901. This video is by default saved to a circular buffer of transient memory, as in 902. When full, this new data overwrites the oldest data. However, when user input 903 (e.g. from the trigger 300) is detected, the system first writes all memory in the buffer to non-transient storage in 904 and also begins recording all subsequent video to non-transient storage 905. This continues until the user stops the process 906 and the system is back in a "standby" buffered mode.

This technique is particularly effective in capturing concise, poignant video snippets, analogous to looping GIF images. This truncated style of video is popularly shared as a looping video or animated image because they communicate a lot of information in a short amount of time.

The buffered save pattern does not leverage gaze control; however it can be combined with other techniques in the present disclosure. For example, a motorcyclist might use a similar system while riding through the mountains. They might have glasses 100 and a panoramic strap 200, which captures a rolling 10-second buffer from multiple cameras on their helmet. In the middle of a curve, the rider sees a car accident occurring on the other side of the road—but must return their eyes to the road immediately. The rider did not anticipate this event, and was unable to maintain gaze on it. However, using the image buffer and techniques/processes similar to steps 854-857, object tracking can work both backwards and forwards in time: a verbal "save" command would preserve high-resolution images of the accident both before and after the rider saw it using cameras pointed in all directions.

In general, if image data is not discarded, the control can allow the user to control a "virtual camera" after footage is already taken. This virtual camera could be by default controlled by gaze inputs, aesthetic heuristics, and motion data—but also be manually changed if the user desires a different framing or target object.

In accordance with an exemplary embodiment of the present disclosure, various operations can occur at different stages in the pipeline, and on different devices, with subtle trade-offs. For example, white balancing might happen before the image file is saved in one embodiment, and in another it might not happen until the file is transferred to a host computer. In this example, performing white balancing sooner results in a smaller file and easier user experience; performing it later results in larger files and more flexibility for the photographer. Traditionally, certain actions like zooming and changing the depth of field of an image have been firmly entrenched in preprocessing because they are best accomplished by changing camera optics. However, due to a range of sophisticated computational photography techniques and sensor technologies, even these effects are within the reach of post-processing, albeit with a decrease in quality. For example, light field cameras allow focus to be adjusted in post-processing, and this focus can be chosen based on gaze target.

Additionally, it is appreciated that the flowcharts in the figures merely show exemplary processes or flows, and the present disclosure is not limited to such flows or processes. In many cases, the blocks shown can be performed in different orders, broken up into smaller pieces or combined into larger pieces, performed in parallel or series, and performed on one computing device or broken up across a few, including remote servers, smartphones, or personal computers. In particular, it can be advantageous to save data (e.g. information from steps 754, 755, and 757) to storage on the camera device, and perform complex processing (e.g. steps 758-761) on a device with more processing capability and available power. The computer architecture described herein is applicable to all devices and components in the disclosure.

6.3 Externally-Mounted Camera Scenarios

Although shown in various figures, the camera system does not need to be mounted on the user's head. In fact, improved stability, vantage point, and increased lens and sensor size are all good reasons to have the camera in another location.

Figure 10A:
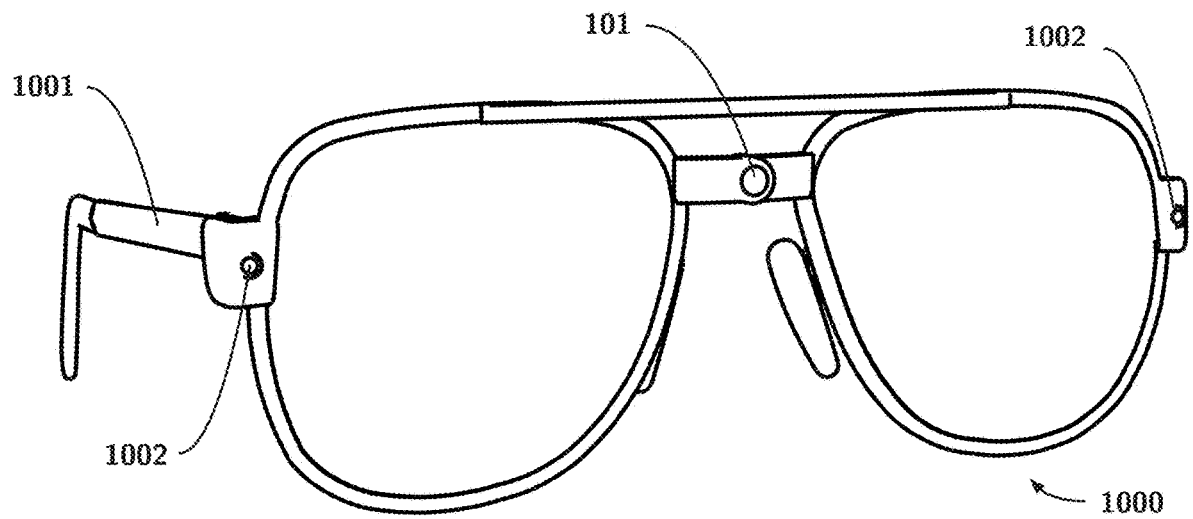
FIG. 10A shows a front perspective view of an exemplary pair of general-purpose eye tracking glasses.
Figure 10B:
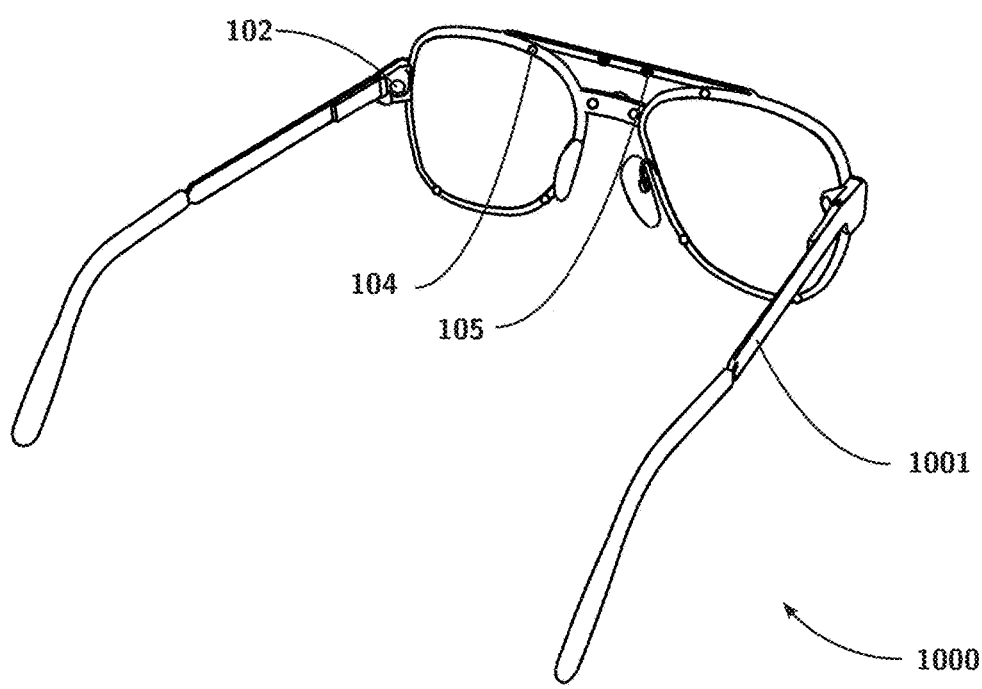
FIG. 10B shows a back perspective view of the pair of general-purpose eye tracking glasses of FIG. 10A.
Figure 10C:
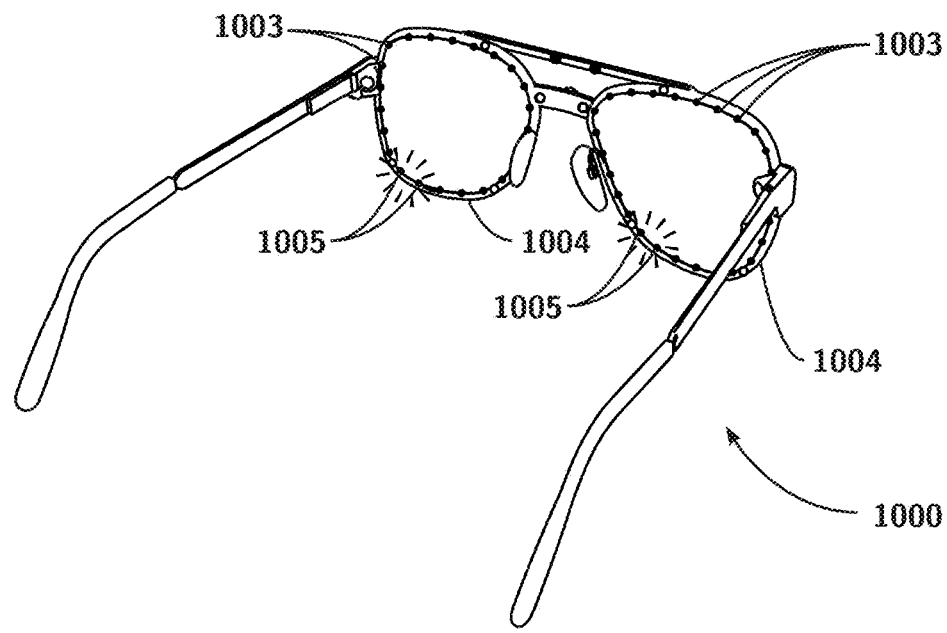
FIG. 10C shows a back perspective view of a pair of general-purpose eye tracking glasses having field of view direction indicators.

FIGS. 10A-C depict an exemplary embodiment of another pair of gaze-tracking glasses 1000, similar to glasses 100, but intended to look like a reading or sunglasses. FIG. 10A shows the front perspective view of the glasses 1000. In accordance with an exemplary embodiment of the present disclosure, the glasses 1000 have a single forward-facing reference camera 101 (though two or more are possible), and a frame 1001 that is also an enclosure for a computing device 601 (though it can also connect with an external enclosure). The frame 1001 can also contain physiological sensors and other electronics as described in the present disclosure. The glasses 1000 can also contain rear-facing structured light projectors, LEDs, and cameras to assist with phakometry, or measurement of the crystalline lens radii of curvature using Purkinje images. The glasses 1000 also include forward-facing sensors 1002. The sensors 1002 may be additional reference cameras, structured light projectors, lidar, rangefinders, 3D scanners, or other suitable sensor useful for gathering depth and 3D information about the world as described in the present disclosure. Additional information about the world can be used to refine gaze depth estimates and resolve ambiguities in the epipolar geometry that exist between multiple perspectives of a scene, such as between the gaze tracking glasses' world reference camera(s) and the high definition camera(s). FIG. 10B shows a rear perspective view of the glasses 1000, with the gaze tracking cameras 102, infrared illuminating LEDs 104, and status indicator LEDs 105. The placement and number of all these elements is just for illustration: any device that records gaze with respect to the world can be used for gaze-directed photography.

In one or more embodiments, the sensors 1002 are at least one of a lidar sensor, a structured-light projector, or other suitable rangefinder. The sensor 1002 emits a type of wave, either light, structured-light, laser, or other form of radiation, which reflects off of one or more objects. The sensor 1002 then receives a reflected wave and calculates the depth of or distance to the object based on one or more properties of the reflected wave. The system may then map the external environment in a 3D model. In certain embodiments, the system uses the sensor 1002 for range finding and depth detection of various objects as described in the present disclosure.

In some embodiments, 3D information is derived from images without the need to radiate or emit a signal from the glasses. For example, the system can generate 3D information using structure from at least one of motion, bundle adjustment, and stereo cameras. The system can combine information from sensors on multiple devices with different vantage points to increase the amount of information available to generate the 3D model. In particular, the system can combine ranging and image information from sensors on both the high definition camera(s) and on the glasses with IMU motion data on each device to provide a more accurate world model. Additionally, external data such as maps, topography, landmarks, and GPS can be incorporated. This world model may be represented as a point cloud, probability cloud, mesh of polygons, collection of solid parametric shapes, or any other suitable model. The system uses the 3D world model to refine the predictions of gaze tracking, object tracking, and camera control algorithms as described in the present disclosure.

In certain embodiments, a 3D world model facilitates automatic focus racking during video recording. With video recording, it is very important that focus racks smoothly from one focus plane to another and avoids "searching" because the focus change is highly conspicuous in the final product. The auto-focus system uses the accurate 3D model of the world along with current and target focus depths to smoothly transition from one plane to another. In other certain embodiments, the auto-focus system is augmented with contrast- or phase-based auto-focus systems to, for example, do fine-grained adjustments after the world model has been used for smooth, course-grained racking.

Figure 22:
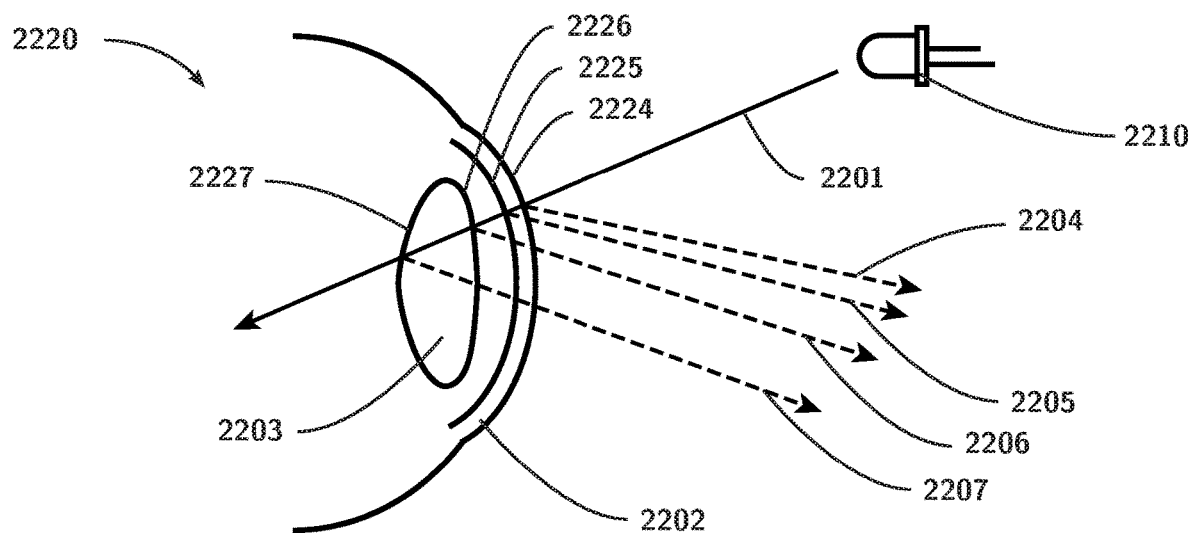
FIG. 22 shows a schematic illustration of light reflecting off of the human eye.

FIG. 22 depicts a schematic view of light reflecting off of a human eye 2220 having a first, a second, a third and a fourth media boundary 2224-2227 respectively. Note that this schematic is for illustration only, and not meant to be an optically-accurate ray tracing. In one or more embodiments, the system uses rear-facing sensors similar to sensors 1002 to measure the shape of the user's eyes with phakometry, which involves reflecting light off of the eye and recording the locations of reflections. As shown in FIG. 22, a light source 2210 shines a single ray of light 2201 towards the cornea 2202 and crystalline lens 2203. The system records the location of a first, a second, a third and a fourth Purkinje image 2204-2207 respectively. The Purkinje images 2204-2207 are reflections of the ray of light 2201 off of each media boundary 2224-2227 respectively. A distance between the third 2206 and the fourth 2207 Purkinje images relates to a shape of the lens and how far away the user is focusing their eyes. These reflections can also be used to determine the direction that the eye is pointing and generate a 3D model of the eye.

Figure 23A:
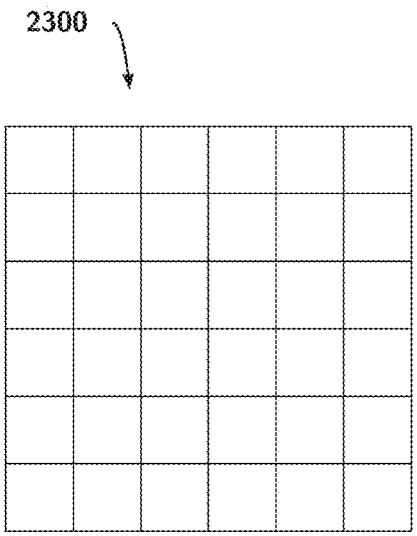
FIG. 23A shows an example of a spatial grid pattern of structured light.
Figure 23B:
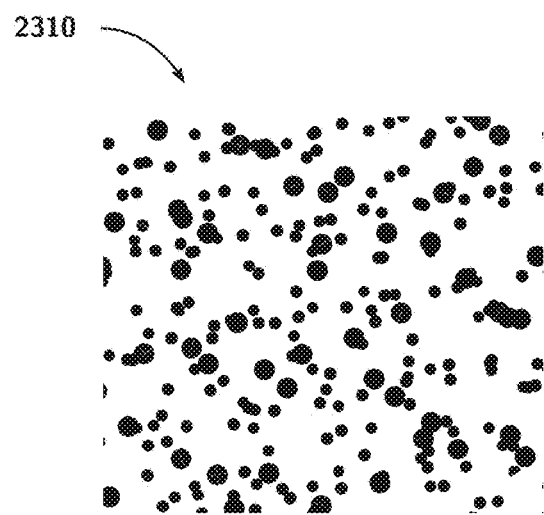
FIG. 23B shows an example of a spatial pseudo-random speckled pattern of structured light.
Figure 23C:
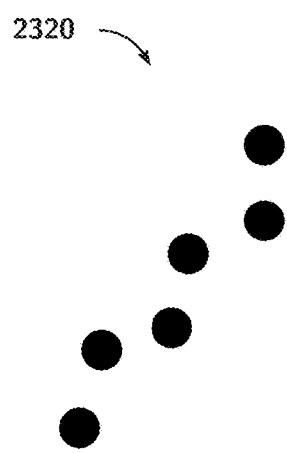
FIG. 23C shows an example of a spatial dot pattern of structured light.
Figure 23D:
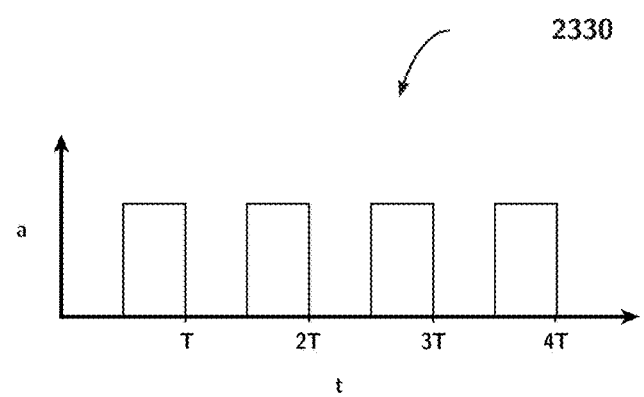
FIG. 23D shows an example of a temporal pulse train pattern of structured light.

FIGS. 23A-23D show different spatial and temporal patterns of structured light. In other embodiments, the system uses structured light rather than a point source of light. Light can be structured spatially, as illustrated in FIGS. 23A-23C, and temporally, as illustrated in 23D. FIG. 23A shows a spatial grid pattern, 23B shows a spatial pseudo-random speckle pattern, and 23C shows a spatial dot pattern as might be generated by LEDs arranged on the rim of eye glasses. FIG. 23D shows a temporal pulse train with period T, where light amplitude is on the y-axis and time is on the x-axis. Since the patterns shown in FIGS. 23A-23D are generated by (or are known to) the system a priori, and because they are in patterns unlikely to be produced externally by chance, the system distinguishes the Purkinje images from unrelated ambient light and other interference and noise. As such, structured light reflections are more robust and work with higher ambient light levels than reflections from a basic point source.

By determining shape, curvature, or distortion of the crystalline lens of the user's eye, the system further determines a gaze depth estimate associated with the user's gaze. In certain embodiments, the system refines the gaze depth estimate with tracking and integrating information about the degree of convergence of the pupils. Lens distortion and eye convergence are examples of the eyes' accommodation response as they look at targets at varying depths.

Figure 24:
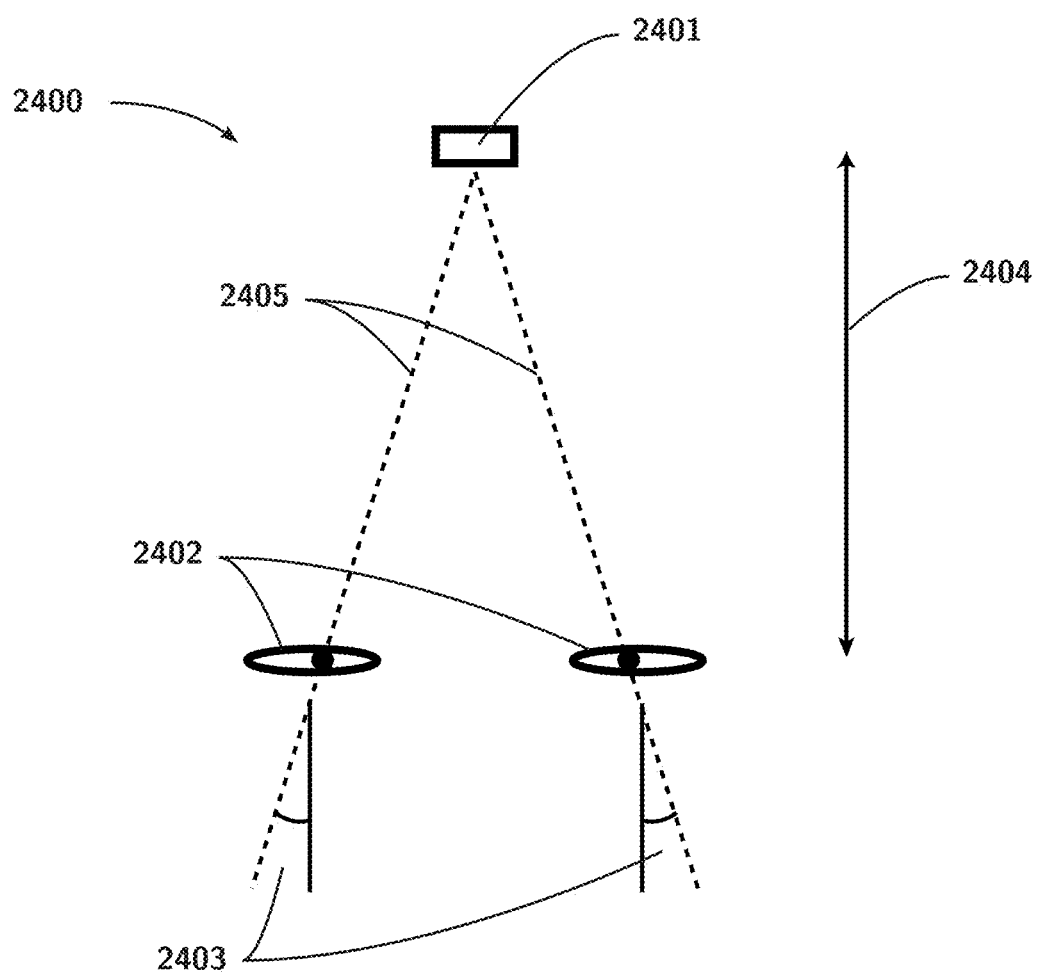
FIG. 24 shows an illustration of the relationship between gaze depth and eye convergence.

FIG. 24 illustrates an angle of convergence 2403 of a user's eyes 2402 while fixated along rays 2405 on a gaze target 2401. The system determines the angle of convergence 2403 with data such as from camera 102. The system then calculates a distance 2404 between the gaze target 2401 and the user's eyes 2402 based, at least in part, on the angle of convergence 2403. In some embodiments, the system incorporates information from 3D world models and a gaze direction vector of the model to refine the gaze depth estimate. The best estimate will use as much information as possible, including gaze depth, gaze vector mapping, a 3D model or depth image, object detection, and motion data. The system may then track gaze targets, control auto-focus algorithms, vary an AR display, or otherwise adapt its functionality according to the present disclosure based on the user's gaze.

FIG. 10C shows the pair of gaze-tracking glasses 1000 having a plurality of indicator LEDs 1003 encircling a rim 1004. According to one embodiment, distinguished indicator LEDs 1005 indicate to the user in which direction the camera is pointed relative to the glasses 1000. The LEDs 1005 may be distinguished in a number of ways, either by being lit up while non-distinguished LEDs remain unlit, by blinking, by having a differentiating color, or by any other suitable distinguishing method. As shown in the exemplary embodiment in FIG. 10C, the indicator LEDs 1005 show that the camera is pointed down and to the left, relative to the glasses 1000.

FIG. 11 shows a high-resolution television camera 1102, such as a camera that might be used at a sporting event, mounted on a motorized, computer-controlled gimbal 1101 in accordance with an exemplary embodiment of the present disclosure. The gimbal uses stepper motors, servo motors, or any other suitable method of actuation. The gimbal 1101 has two degrees of freedom, but more or fewer degrees are possible. A small omni-directional sensor system 1103 is mounted near the camera 1102 so as to track information about the surrounding world. The sensor system 1103 can include one or more wide-angle reference cameras, and may also contain motion sensors such as an IMU, SLAM, range-finding, and 3D scanning sensors for tracking the camera's relationship in space to the surrounding world and the glasses. The camera system 1100 can comprise a computing device 601 and additional sensors such as rangefinders, structured-light projectors, lidar, etc.

The gimbal-mounted camera 1102 can also be replaced or augmented with a multi-camera panoramic or wide-angle camera system, such as a panoramic camera system 200 except not head-worn. The image from a camera system with a wide field of view can be transformed and cropped to a smaller field of view by the gaze directed photography system, which performs a similar function as physically moving the camera. The camera systems can be located anywhere, such as on a tripod, on a flying drone, or on the roof of a car. The gimbal can serve dual purpose as a control system for aiming the camera and a motion stabilizer for offsetting rotations of whatever the camera is mounted to. A user wearing a gaze-tracking device like 1000 would be able to control one or more camera systems similar to 1100.

In addition to directing the gimbal-mounted camera direction based on gaze target, other control options are possible. For example, the user could control the direction and zoom with a remote control or joystick. In one or more embodiments, the system follows the user's head movements using IMU motion data in the glasses 1000 to control the direction. It is to be understood that both embodiments may be used, as a whole or at least in part, with the system controlling focus based on gaze targeting as described in the present disclosure.

The ability to control multiple cameras is particularly useful for a photographer. For example, a photographer may wish to record multiple perspectives of a scene without relying on an assistant. In one or more embodiments, the photographer utilizes gaze and object tracking according to the present disclosure to control each of the camera systems automatically and in unison. The control system receives an input trigger from an input device and determines a target object of a gaze of the user. The control system maps the target object to the field of view of each camera. Each camera then tracks the object and may adjust one or more camera parameters to keep the object in focus, in frame, etc. In this way, the photographer can continue taking photos or video of the target object even when the object is out of his or her field of view or the field of view of one or more camera systems. Alternatively, the photographer may wish to have each of the cameras recording different subjects. In this case, the photographer could cycle through the cameras, setting them up to track particular objects independently. In this way, a single photographer could orchestrate a number of independent gimbal, tripod, and drone-mounted cameras at an event. Furthermore, in other embodiments, the photographer then switches his or her gaze to a new, second target and triggers a second input. The control system then directs the camera systems to smoothly rack focus from the first target to the second target, as will be described in more detail below and shown in FIG. 16F.

Cameras like 1100 can be controlled for professional photography and cinematography. For example, sports videographers need to quickly aim large cameras at fast-moving targets. A gimbal-mounted camera driven by gaze, head movements, or both would be an effective way of keeping the action in frame, especially when sudden changes in direction are necessary. Combining object tracking and gaze-based control, a single photographer could even control multiple cameras by switching among them and making sure they are all trained on interesting targets. Cinematographers also use gimbal-mounted cameras for complex shots that require remote-control and motion stabilization of the camera, such as chase scenes, aerial footage, and long-takes with camera hand-offs between photographers. Combining gimbal stabilization with gaze-control and potentially head motion control would be an effective way for a camera operator to capture these complex shots.

A small flying drone with a gimbal-mounted camera can be programmed to hover over a photographer, and an on-board camera would become their personal, gaze-directed eye-in-the-sky. For example, imagine a photojournalist documenting a news event. Having an easy-to-direct aerial camera would let them get otherwise difficult shots while staying focused on their own safety and surroundings. Or, imagine how this might help someone skiing while filming a professional snowboarder: the photographer's two goals are to keep the subject well framed in a video, and to not crash. The drone would automatically track above the photographer and follow the snowboarder with the camera. The photographer would direct the video by occasionally glancing over the intended scene while holding a button in their hand, and be free to look elsewhere when not pressing the button.

Figure 12:
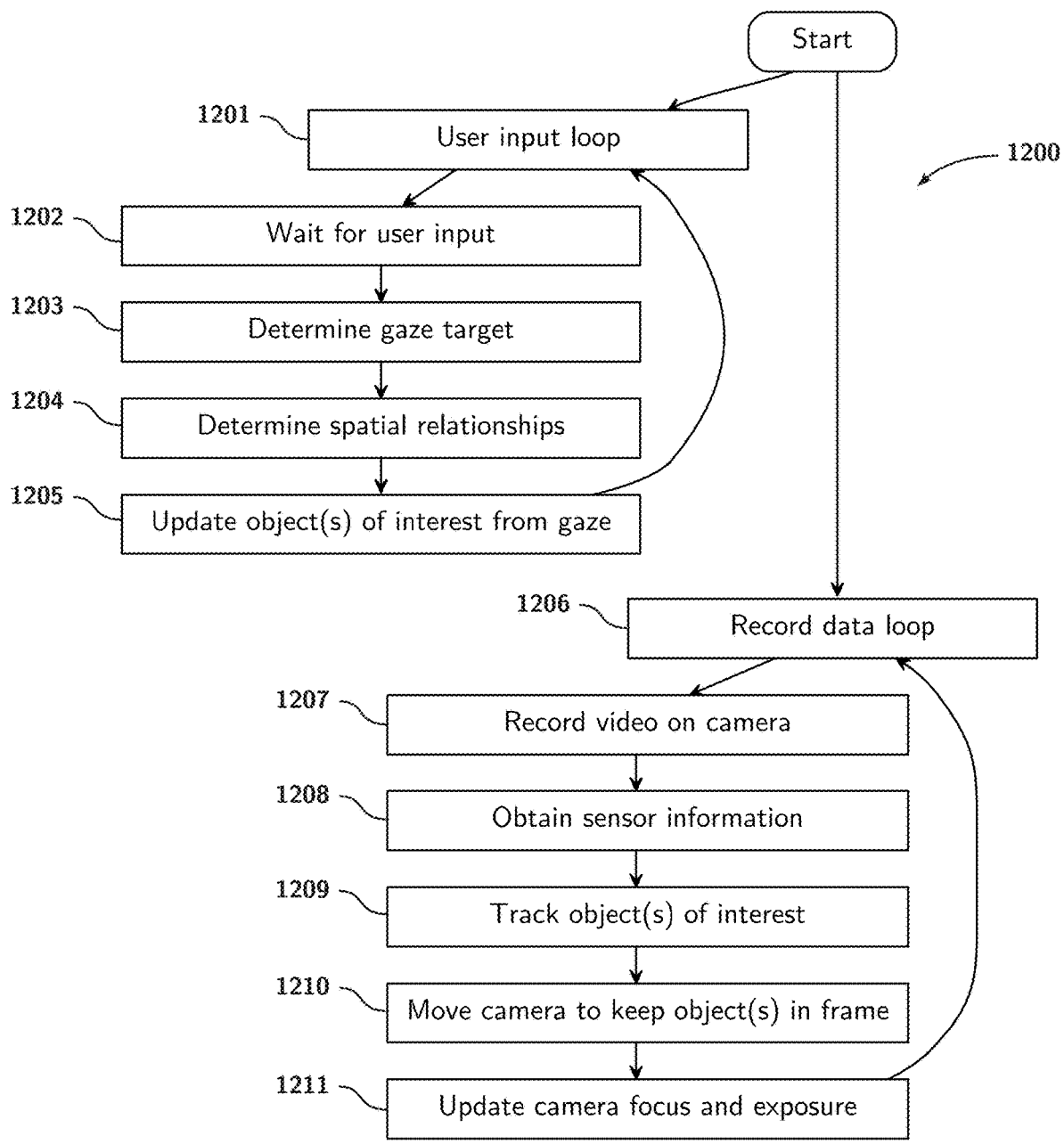
FIG. 12 shows an exemplary process of controlling the gimbal-mounted television camera of FIG. 11.

FIG. 12 shows an exemplary process for controlling a gimbal system 1100 with the glasses 1000 and some additional user input, in accordance with an exemplary embodiment of the present disclosure. The additional user input, for example, is from a trigger 300 or a portable processing device or a smartphone via the user interface 400. The flowchart 1200 is analogous in some ways to the flows for cinematographic recording 800 and processing 850, except that the flowchart 1200 uses a moving, externally-mounted camera rather than a panoramic, head-mounted camera. Like the flowchart 800, there are two independent processes: gathering intermittent user input 1201 and continuously recording data 1206.

The user input and gaze detection in steps 1202-1203 are similar to the input flows from steps 751-754 and steps 802-805 which permit the user to select either a single target, a number of targets, or a scene. Motion, orientation, ranging, and image data, and other sources on both the glasses 1000 and camera system 1100 can all be used in 1204 to determine the spatial relationship (or relative pose) between the glasses and camera and possibly generate a 3D model of the world. This helps to map the gaze target from the glasses to an object of interest as observed by the camera in 1205. This object of interest is tracked by the camera system independently of user input. During the recording loop 1206-1211, the camera is continually updating its framing and optics based on an object of interest being tracked. This object of interest is set independently by the user input loop 1201.

6.4 Portable Camera Scenarios

It is common for event photographers to "spray and pray" without careful focusing or framing to capture a transient event, because not getting any photo is slightly worse than getting an out-of-focus or poorly framed photo. It can be very difficult to get a shallow depth of field bokeh effect and also have the right subject in focus with this method. It is also common for photographers to "focus recompose" using a center-weighted auto-focus mechanism in order to achieve correct focus and framing. This is slower than "spray and pray", but is more likely to get the correct subject in focus. However the method is also flawed because rotating the camera will shift the focal plane slightly behind the intended subject. It also requires some manual dexterity and expertise to use the camera's focus-lock feature. Using gaze as a control input is superior to both "spray and pray" and "focus recompose" for speed and accuracy.

Gaze direction is a very effective way of instructing a hand-held camera what part of the scene to optimize for. The user holds up the camera and then simply looks where they want it to focus and adjust settings for. This guided automatic control is powerful because it simplifies the mental model of using the camera and lowers cognitive overhead while still offering a high level of control. When photographing scenes with varying levels of brightness or depth, eye gaze targeting would be a better alternative to a touchscreen on a camera or choosing an AF point in a viewfinder for choosing the subject and kicking off the automatic focus and exposure processes.

Figure 13A:
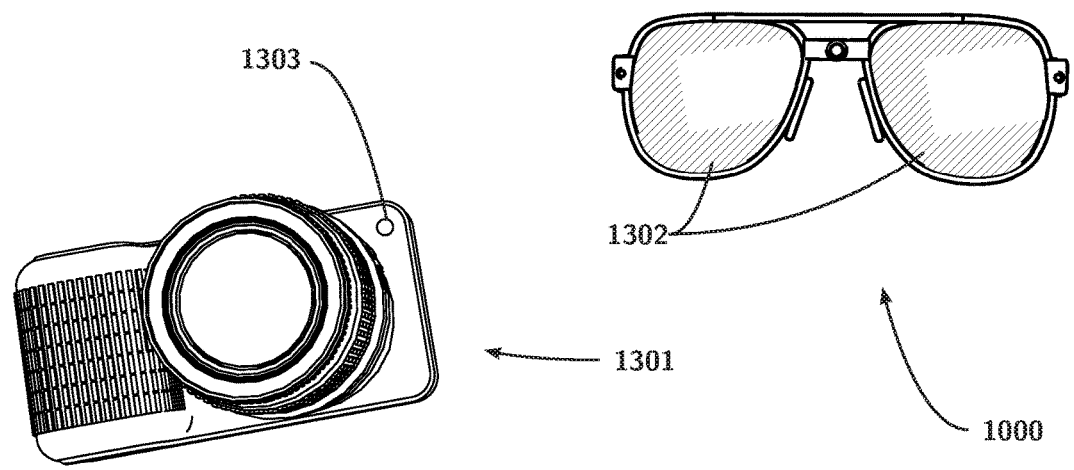
FIG. 13A shows a front perspective view of a hand-held camera being used with the tracking glasses of FIG. 10A and a display showing the hand-held camera's field of view.
Figure 13B:
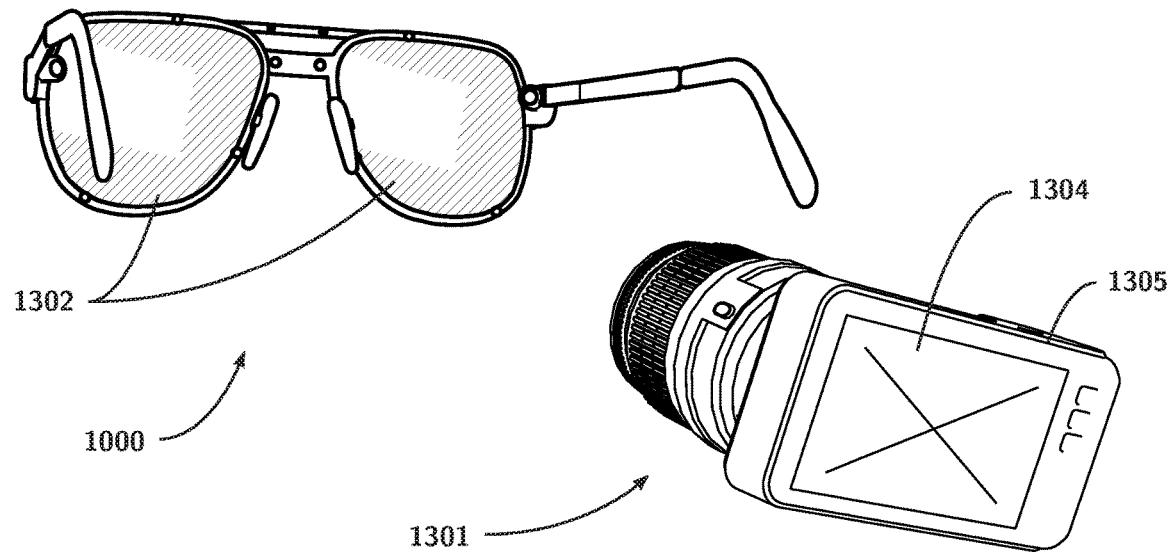
FIG. 13B shows the back perspective view of the hand-held camera and the tracking glasses of FIG. 13A.
Figure 13C:
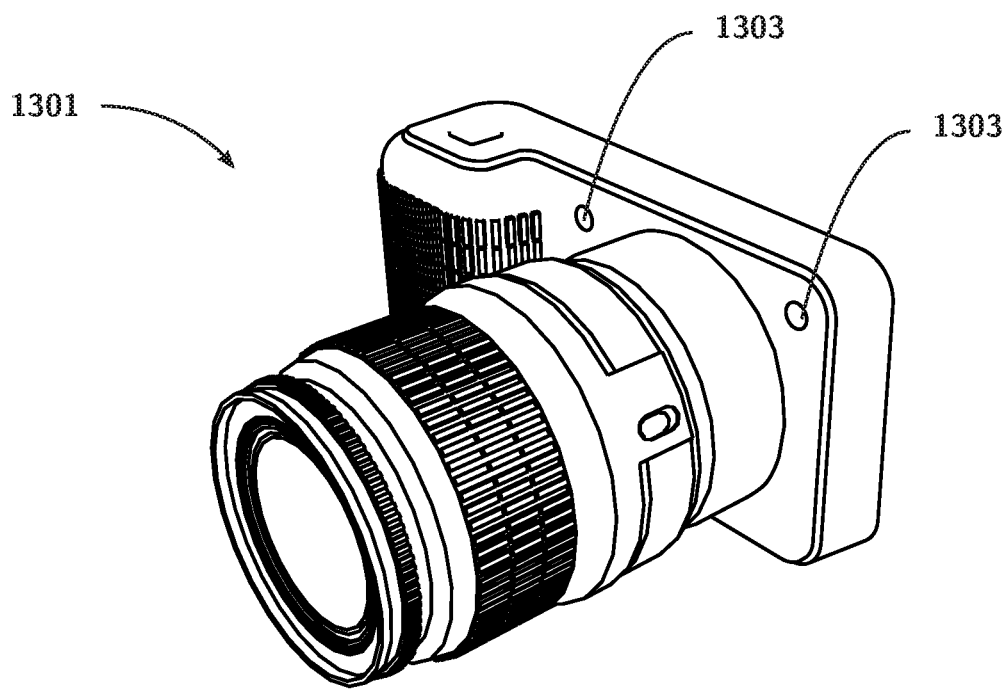
FIG. 13C shows a front perspective view of the hand-held camera.
Figure 13D:
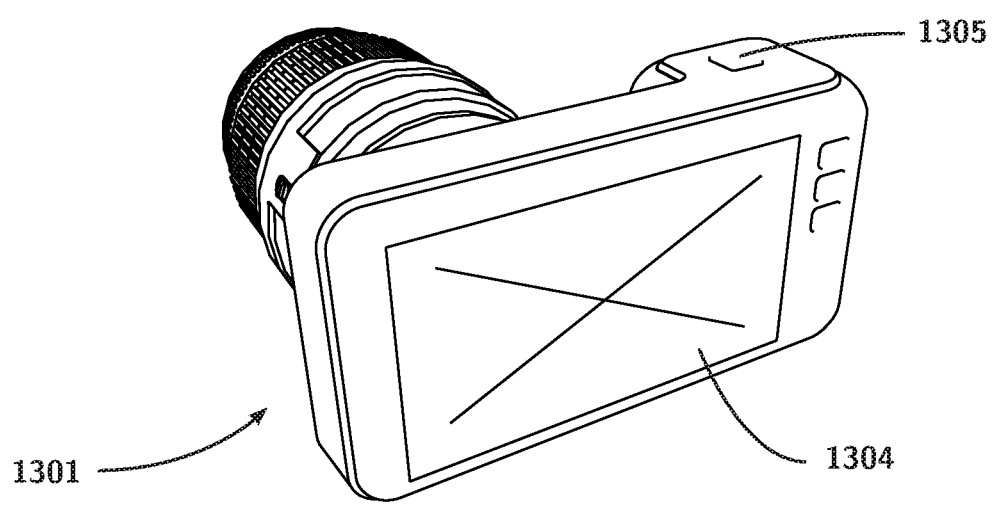
FIG. 13D shows a back perspective view of the hand-held camera.

FIGS. 13C-D show a handheld, manually-aimed camera 1301. The manually-aimed camera 1301 may be a digital single-lens reflex (DSLR) camera, mirrorless interchangeable lens camera, digital cinema camera, smartphone, fixed-lens camera, action camera, or other suitable image capturing device. The camera can optionally include sensors 1303, which are similar to those described for the gimbal-mounted camera sensors 1103 and glasses' sensors 1002, e.g. IMUs, rangefinders, etc. The camera 1301 can be used with the gaze-tracking glasses 1000 as a means of controlling certain parameters, such as the point of focus, brightness, and object tracking. This process would work essentially the same as that shown in FIG. 12, except that step 1210 is omitted because the user is manually moving the camera. Many photographers have a strong intuition for where their camera is pointed, and would be able to simply aim, look at their target, and snap a picture. It is also feasible to use a wide-angle lens on the camera, and then automatically crop down and level the final shot using techniques such as those described in the present disclosure to tighten up the framing and level the image. It should be appreciated that, in certain embodiments, the manually-aimed camera 1301 utilizes 3D models, depth-maps, and stereoscopic images and video as described in the present disclosure.

In addition, a user may also wish to use a viewfinder or live-view on a display of the camera as opposed to the gaze tracking of the present disclosure for some photos. In that case, the control system will sense that the camera is close to the user's face. If the control system determines that the camera is sufficiently close, it may turn on or make operable the viewfinder of the camera and disable gaze control. Alternatively, the photographer can use the live-view on display 1304 to roughly compose their shot and then focus using gaze control, glancing first at the live view on display 1304 and then at the scene.

Figure 17A:
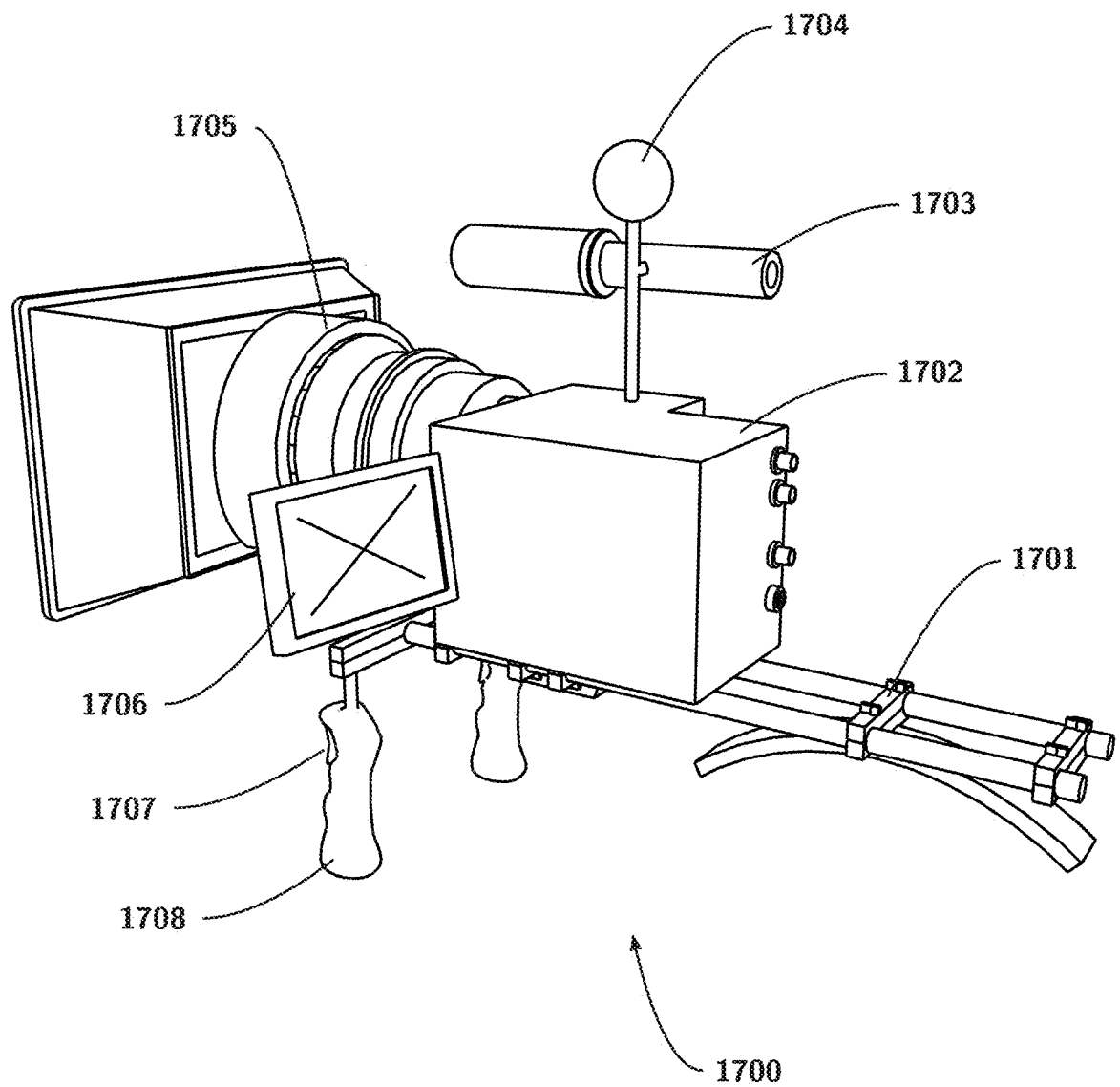
FIG. 17A shows a side perspective view of a handheld digital cinema camera.
Figure 17B:
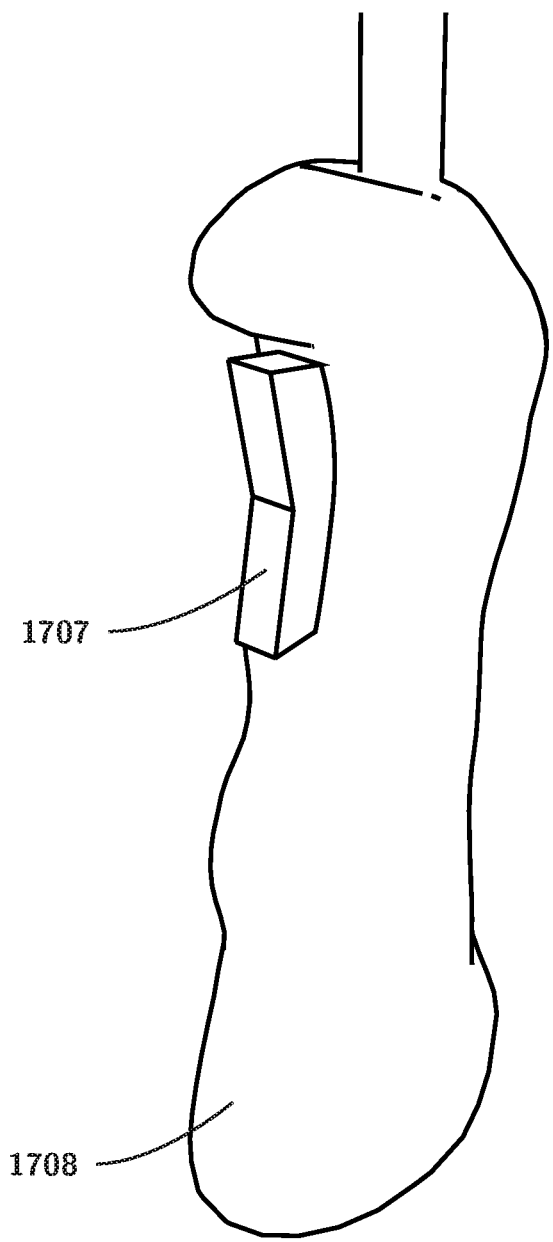
FIG. 17B shows a detailed view of a grip on the handheld digital cinema camera of FIG. 17A.

Referring to FIGS. 17A-B, FIG. 17A shows another manually-aimed camera, in particular a shoulder-supported digital cinema camera system 1700. The camera system 1700 optionally includes a shoulder support 1701, a body 1702, a live-view display 1706 and sensors 1704 that may include additional reference cameras, ranging sensors, IMUs, 3D scanners, and others. It also optionally includes grips 1708 with exemplary controls 1707. The camera system 1700, like the hand-held camera 1301, can be used with gaze-tracking glasses such as 1000. While recording video, the user will be able to re-focus the camera by looking at a gaze target and then triggering a user input such as 1707 or using a gesture or another secondary input command as described in the present disclosure to re-focus, set object tracking, set brightness, or adjust other camera parameters. FIG. 17B shows a close-up of one possible user grip 1708 and user input 1707. In this case, the button 1707 is a continuously variable toggle switch. Such an input 1707 allows the user to control parameters of the camera system.

Figure 17C:
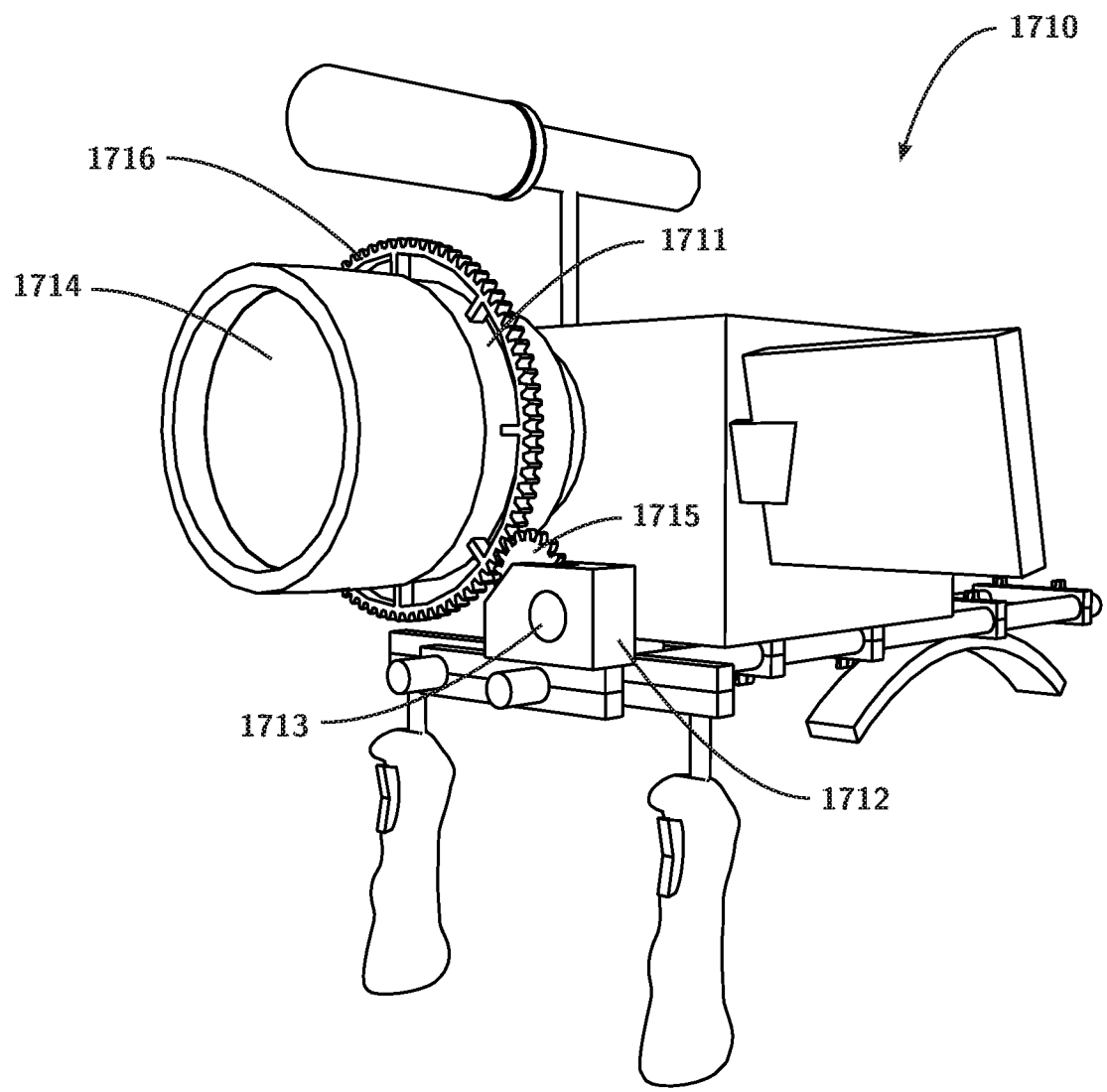
FIG. 17C shows a gaze-directed follow-focus accessory.

FIG. 17C illustrates a digital cinema camera system 1710 having a gaze-controlled follow-focus accessory 1712. The follow-focus accessory 1712 is attached to the camera system 1710 and a lens 1714 and turns focus adjustment ring 1711 on the lens 1714 using gears 1715, 1716, without the operator needing to touch the lens 1714. The follow-focus accessory 1712 allows a wide variety of lenses 1714 to be remotely controlled, allows the camera system 1710 and lens 1714 to be positioned in more locations, and avoids shaking the camera system 1710 when making adjustments. The follow-focus accessory 1712 includes all necessary sensors 1713 as described in the present disclosure.

Figure 16F:
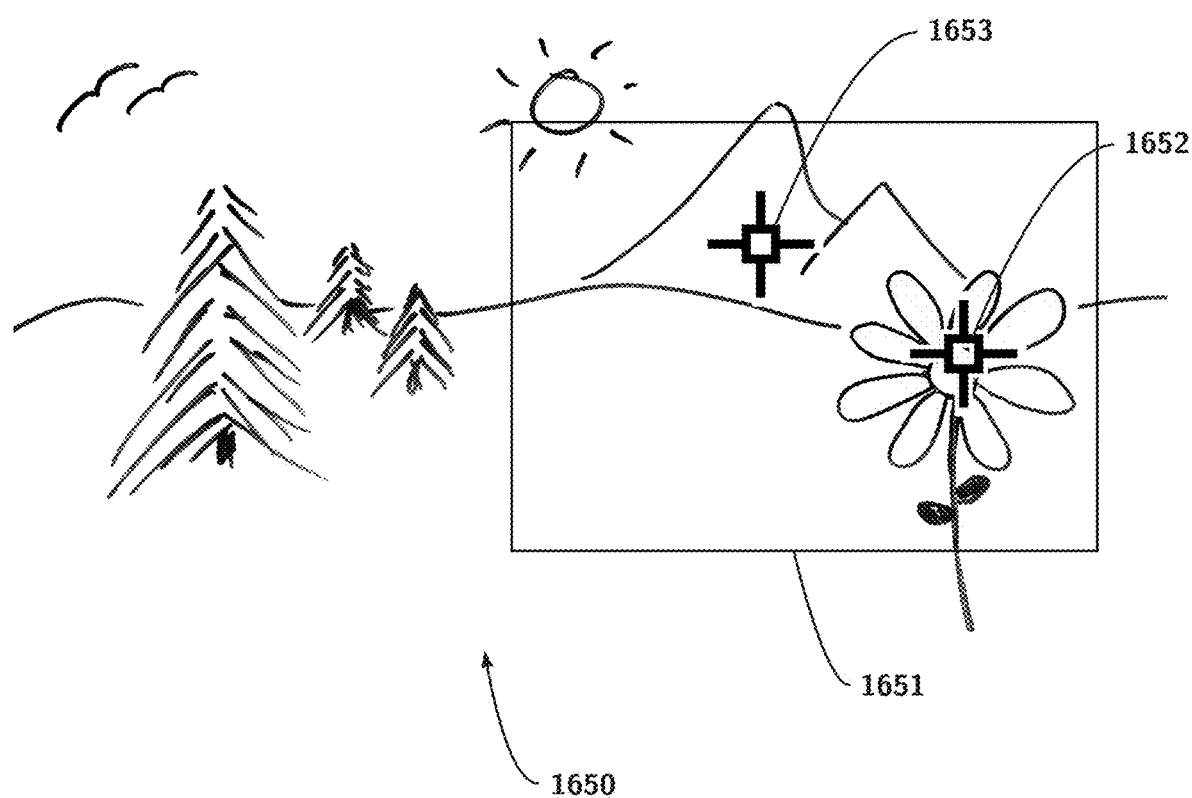
FIG. 16F depicts an example representation of gaze-directed focus racking.

FIG. 16F shows a representation 1650 of gaze-directed focus racking using the manually-aimed camera. Here, the camera has a field of view 1651. Points 1652 and 1653 are drawn in the scene for illustration—they are not actually displayed anywhere. The user might look at point 1652 in the scene and then trigger a user input, after which the camera would focus on the flower at point 1652. Then the user could look at point 1653 in the scene and trigger the user input again, causing the camera to re-focus on the mountains at point 1653. The user could use a control like the continuously variable toggle switch 1707 or a follow focus wheel or other similar input to control the rate at which focus is racked between the two points. Alternatively, the system could automatically rack the focus based on an easing function, such as a linear interpolation or a quadratic "ease-in-and-out" function. If available, 3D ranging and depth information about the scene as described in the present disclosure would assist the system in performing the focus racking process.

FIG. 25 shows a portable, gimbal-mounted camera system 2500. Like camera system 1700, gimbal-mounted camera system 2500 includes a grip 2501, a variable toggle switch 2502, and sensors 2503. The gimbal-mounted camera system 2500 may also include one or more continuously variable rotary wheel inputs 2504 and other relevant buttons, switches, and inputs. Above the grip 2501, a six-axis gimbal 2505 is implemented with brushless DC motors 2506 and linear actuators 2508, the gimbal 2505 having three rotational and three linear degrees of freedom. Like with gimbal 1101, more or fewer degrees of freedom are possible. The gimbal 2505 holds a camera system 2507 which may be a DSLR, digital cinema camera, action camera, smartphone, mirrorless interchangeable lens camera, fixed-lens camera or other suitable camera system. The gimbal-mounted camera system 2500 may be held directly in a user's hand or mounted on a further stabilization system. It may also be mounted instead on a shoulder-supported system such as 1700. It should be appreciated that, in certain embodiments, the gimbal-mounted camera system 2500 utilizes 3D models, depth-maps, and stereoscopic images and video as described in the present disclosure.

In certain embodiments, the gimbal 2505 is an IMU-driven gimbal mount to achieve a "floating" feeling in video: the gimbal 2505 is programmed to keep the camera 2507 motion independent of small-scale rotations and movements of the operator or base. Then, the camera 2507 is aimed either by discerning intentional motions of the gimbal-mounted camera system 2500 or by remote control by a second operator. In some embodiments, focus and other parameters such as aperture (lens iris) diameter are controlled remotely. The camera system 2500 incorporates gaze control to make it easier for a single operator to control important camera parameters. In particular, gaze control and secondary user inputs as described in the present disclosure allow the operator to properly focus the camera. Framing and composition methods described in the present disclosure can be used in conjunction with stabilization and leveling algorithms to keep targets of interest in frame and in focus.

In other embodiments, the camera system 2500 uses IMU data from the gaze tracking glasses 1000 to control composition and camera direction, which causes the camera to follow head-movements while simultaneously being stabilized. The camera system 2500 allows the operator to aim the camera 2507 by moving their head, while being free to adjust the camera grip 2501 at will because the gimbal 2505 keeps these movements independent of the camera motion. Head control can potentially be enabled or disabled using a secondary user input, analogous to how gaze control can be activated intentionally. This is useful if the operator needs to turn away but wants the camera to remain stationary. Head-controlled camera motion can be combined with gaze-directed focus. Additionally, zoom can be adjusted with a mechanism such as the wheel 2504. Rack focusing can be implemented using the toggle button or other user input as described in the present disclosure. This allows a single operator to control camera motions, zoom, and focus where previously a second operator would have been required.

Figure 15:
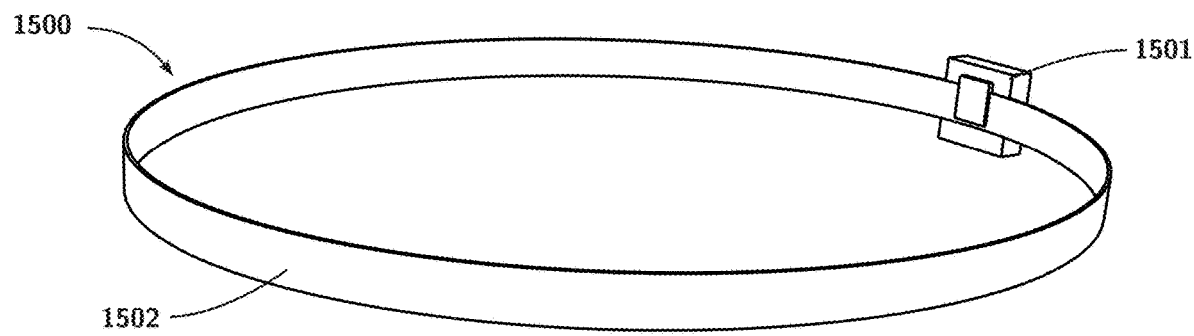
FIG. 15 shows a motion sensor and transmitter clipped to a headband.

FIG. 15 shows a simple motion control system 1500 that does not use gaze-tracking. The motion control system 1500 comprises a transmitter 1501 having an IMU that communicates motion data, clipped to a headband 1502. The transmitter 1501 could also be clipped to headphones or a hat, for example. Combining the motion control system 1500 with the gimbal-stabilized camera system 2500 allows a single operator to both carry and aim the camera 2507, rather than relying on a second operator with a remote control. These motions can also be smoothed.

Figure 18A:
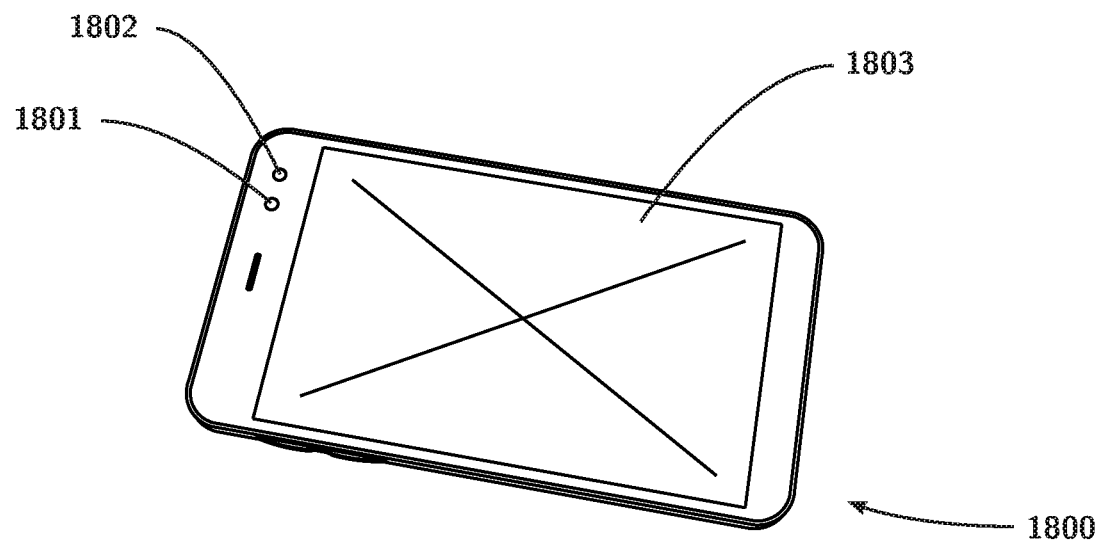
FIG. 18A shows a front perspective view of a smartphone.
Figure 18B:
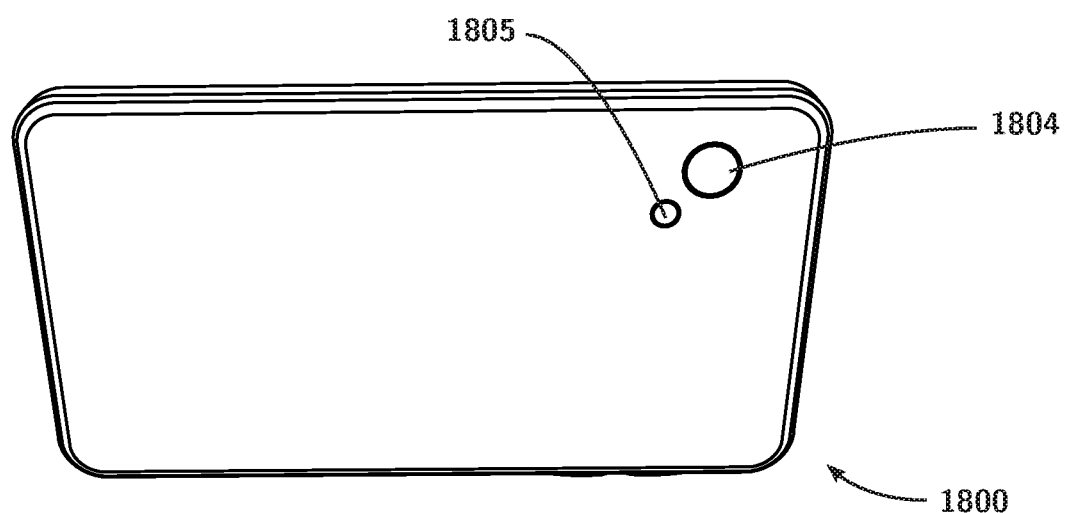
FIG. 18B shows a back perspective view of the smartphone of FIG. 18A.

FIGS. 18A and 18B show a portable, manually-aimed camera, this time in the form of a smartphone 1800. This is an example of how gaze-directed photography could be implemented without the need for gaze-tracking glasses. This could also be implemented on a camera such as 1301. The phone 1800 has a display 1803, a rear-facing camera 1801, and a set of sensors 1802. On the other side it has a forward-facing, high-definition camera 1804 and additional forward-facing sensors 1805. The user holds the camera in front of them and directs it towards the scene they are interested in photographing. The live-view display 1803 helps the user frame their shot. Then, the user is able to look up at the scene to help direct focus and exposure. This smartphone uses the rear-facing camera and sensors to track gaze targets, instead of using head-mounted tracking glasses. Other than the location of the tracking cameras (on the camera rather than on the user's head), other aspects behave similar to the other hand-held cameras.

FIG. 13A shows gaze-tracking glasses 1000 with the addition of augmented reality (AR) display system 1302 in accordance with an exemplary embodiment of the present disclosure. This display system may be implemented using any suitable method, such as rendering the display directly on a semi-translucent surface, using a holographic or light-field display, using a waveguide, using a curved mirror, projecting light directly onto the retina, or even directly stimulating the retina or visual cortex using a visual prosthetic. The display system 1302 may be full color, contain just a few colors, or be monochrome or grayscale. The glasses 1000 are shown in combination with a hand-held, manually aimed camera 1301. In addition to high-resolution camera functionality, the hand-held camera 1301 can comprise a computing device, such as computing device 601 and sensors 1303, to track its relationship in space to the surrounding world and to the glasses 1000 as described in the present disclosure. In one or more embodiments, the hand-held camera 1301 is a large-sensor camera. However, it can be any camera system, including externally mounted cameras. The AR displays described in the present disclosure can also be used to render virtual camera movements resulting from cropping, gaze tracking, and object tracking in panoramic camera systems as described in the present disclosure.

Also, it is appreciated that the AR displays described here are useful independent of gaze-tracking functionality. The ability to understand the camera's point of view by having information overlaid on the user's point of view is useful even if all parameters of the camera are controlled manually. It is also useful even if the user does not have any control over the cameras, for example so they can check and cycle through the lines of sight on a number of cameras set up on tripods, gimbals, or being controlled by assistant camera operators.

FIG. 13B shows a rear perspective view of the hand-held camera 1301 and glasses 1000 shown in FIG. 13A. These figures illustrate the way that the AR display system 1302 reflect the relative pose and fields of view between the glasses 1000 and the camera 1301. A user wearing the glasses 1000 would see some kind of indication of the current field of view or perspective of the camera, relative to their own field of view. For example, in FIGS. 13A-B, the hand-held camera's field of view is represented to the user by a hard-edged bounding box. A comparable rendering of how highlighted regions might work when the user and camera 1301 are viewing a scene is depicted in FIG. 19B.

Figure 19A:
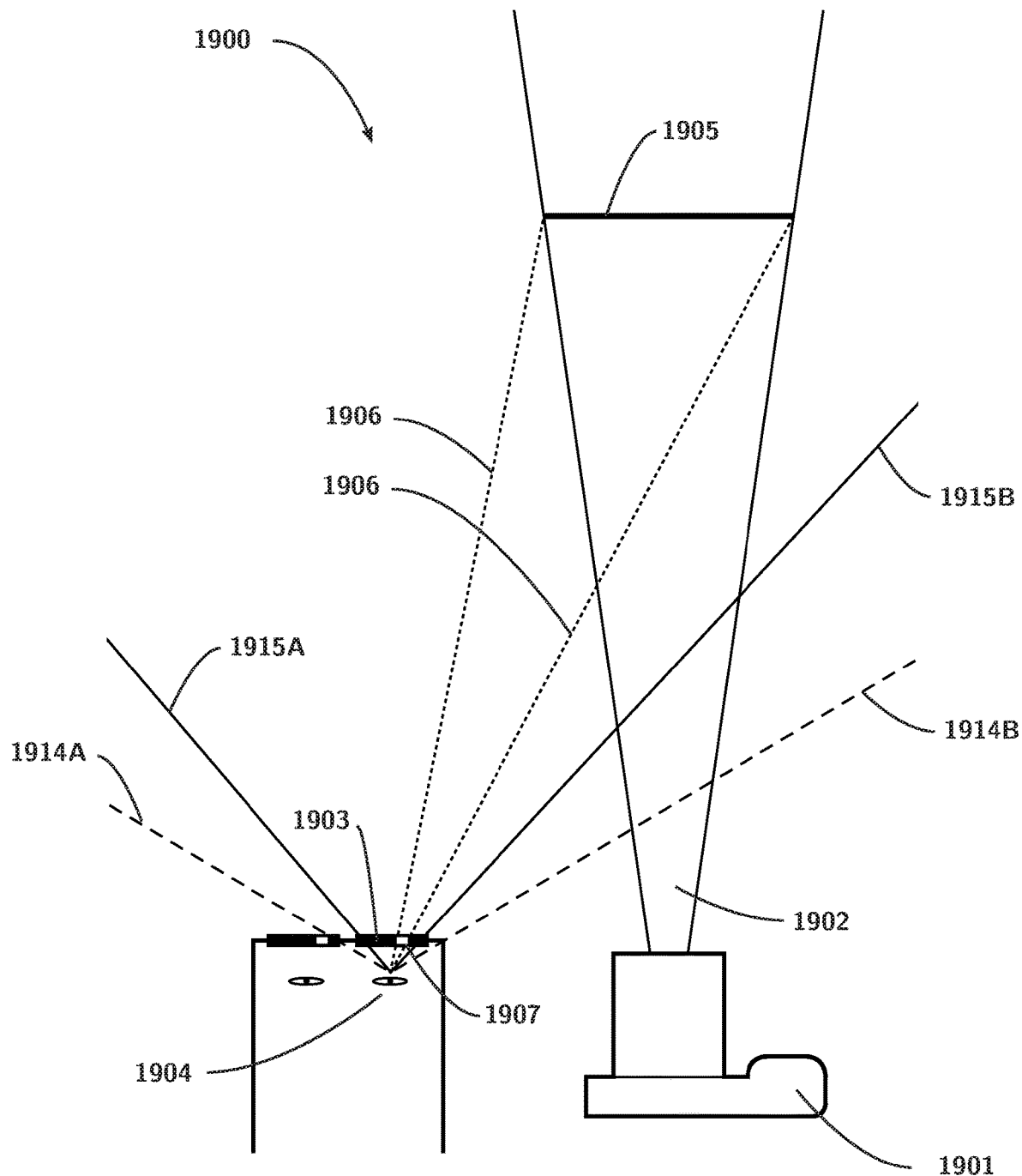
FIG. 19A illustrates a depiction of AR field of view rendering with an AR display and a handheld camera.

Referring to FIG. 19A, the diagram in FIG. 19A shows a process 1900 by which this field of view representation can be derived in the 1-dimensional (horizontal) case for the right eye. An analogous process is used for the left eye and the vertical dimension. Shown is a hand-held camera 1901 with field of view 1902, alongside a user with pupil 1904 positioned behind an AR display 1903. Here, the user has a field of view bounded by 1914A-B and the AR display covers a subset of the user's field of view bounded by 1915A-B. The control system can choose a plane 1905 in the camera's field of view perpendicular to the optical axis of the camera to represent in the AR display. The depth of this plane away from the camera can be chosen based on situation-specific user interaction considerations such as whether it is desirable to highlight the location of objects in the scene, the current focal plane of the camera, or some other depth. The intersections of the plane 1905 with the camera's field of view 1902 represent a bounding box the control system should show to the user. If these intersections are traced back to the user's eyes along rays 1906, the intersections define a highlighted region 1907. This highlighted region is depicted in both the horizontal and vertical axes of the AR display, such as depicted in FIGS. 19B-E.

Figure 19B:
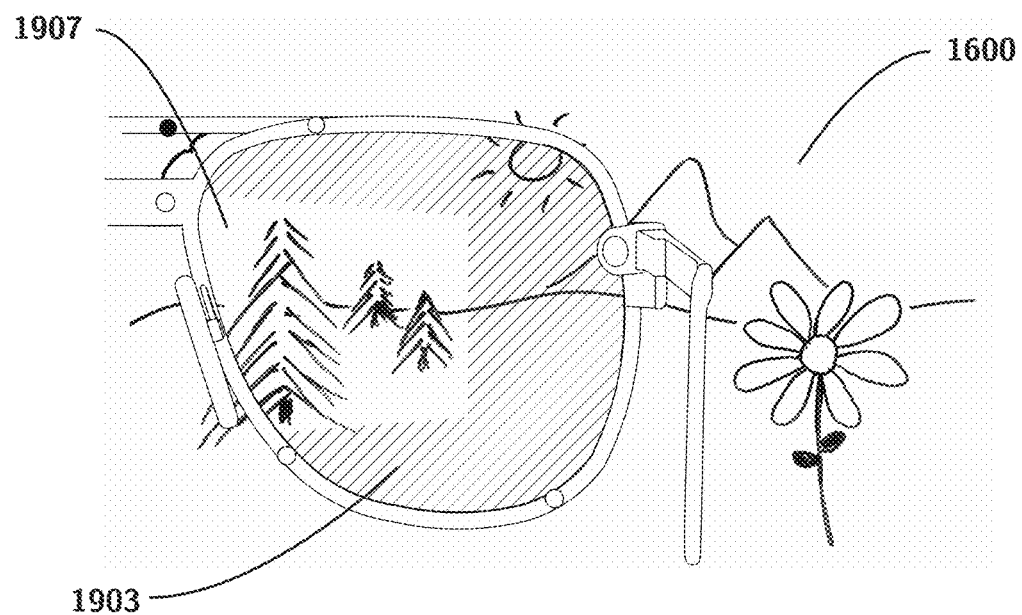
FIG. 19B depicts an example highlighted region on an AR display over an exemplary scene.

FIG. 19B illustrates an example highlighted region 1907 over an exemplary scene 1600. The highlighted region 1907 of the AR display 1903 depicts to a user a field of view of a camera without the user having to look or glance at the camera itself.

Figure 19C:
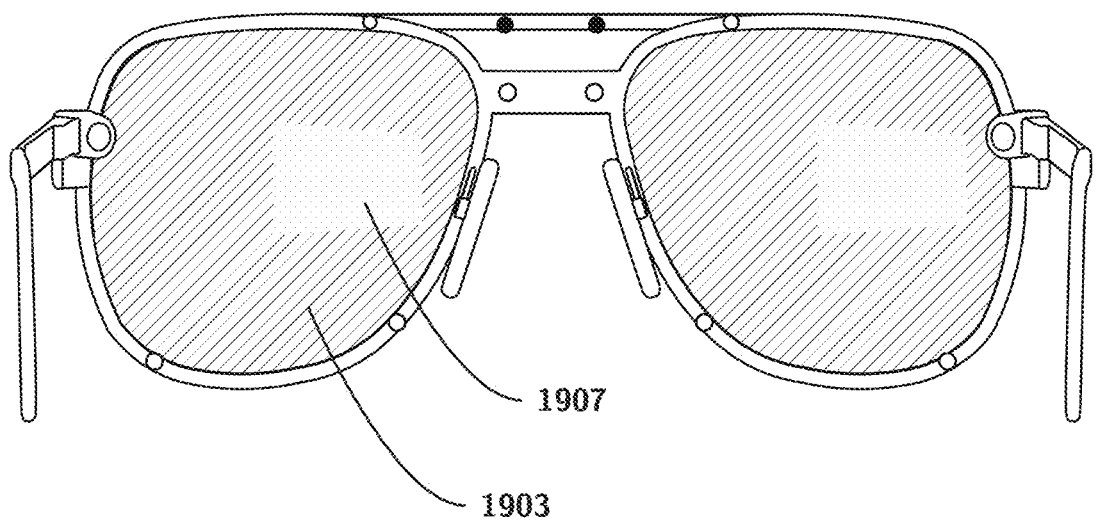
FIG. 19C shows the AR display with a highlighted box display.
Figure 19D:
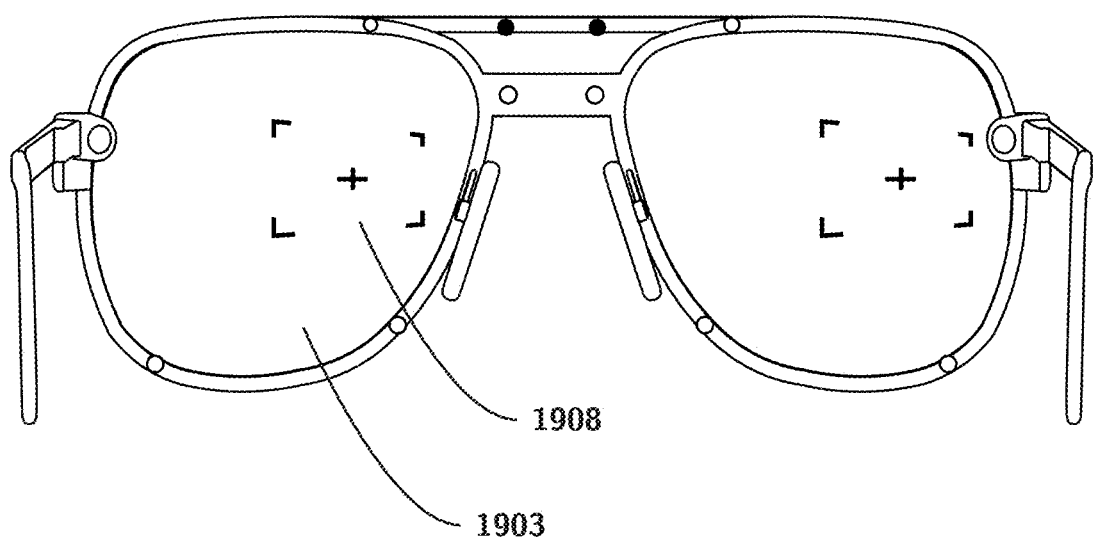
FIG. 19D shows the AR display with a reticle display.
Figure 19E:
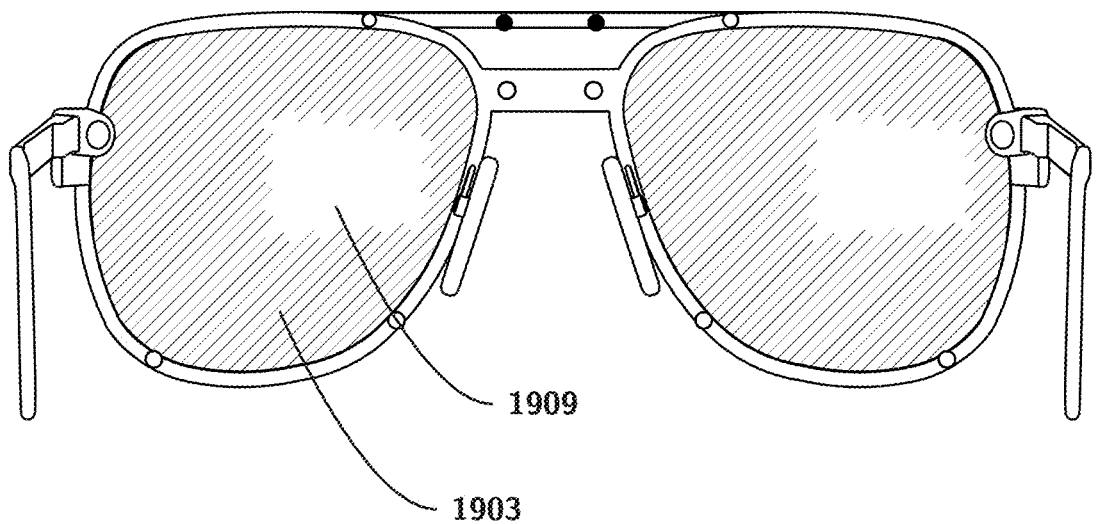
FIG. 19E shows the AR display with a blurred highlight.

FIGS. 19C-E show various possible ways of representing a camera's field of view on an AR display. FIG. 19C depicts the highlighted bounding box display 1907 representing the camera's field of view on the AR display 1903, visually analogous to sunglasses with a section cut out. FIG. 19D shows the field of view represented as a reticle 1908 with printers' bleed or crop marks displayed on the AR display 1903. In further embodiments, as shown in FIG. 19E, the field of view is represented by a fuzzy spotlight effect or blurred highlight 1909 displayed on the AR display 1903.

Figure 19F:
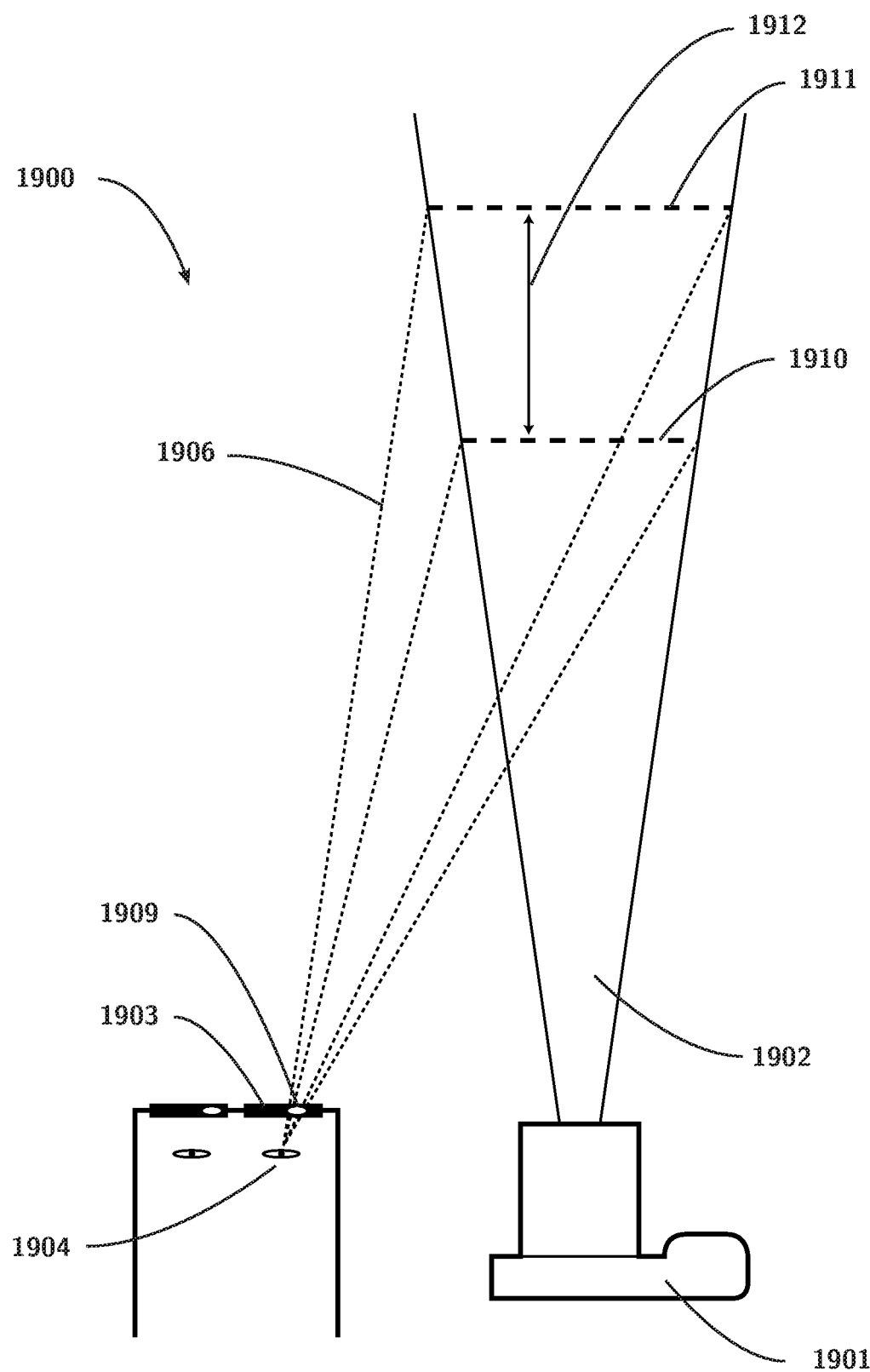
FIG. 19F illustrates a representation of depth of field rendering with the AR display and the handheld camera.

FIG. 19F depicts how the blurred highlight 1909 could be used to represent the ambiguity inherent in a larger depth of field of the camera. Here, a front plane 1910 and a back plane 1911 of the camera's depth of field are a certain distance 1912 apart, and represent the region in which imaged objects are reasonably in-focus. This creates multiple rays 1906 from the planes 1910 and 1911 intersecting with the camera's field of view 1902, and when traced back to the display these can be manifested as the blurred region 1909. A blurred region can also be used to indicate ambiguity in the region being photographed due to sensor and tracking errors. Blurred regions may also occur as an artifact of the display technology used, or be used intentionally to help alleviate eye-strain and fatigue.

Figure 19G:
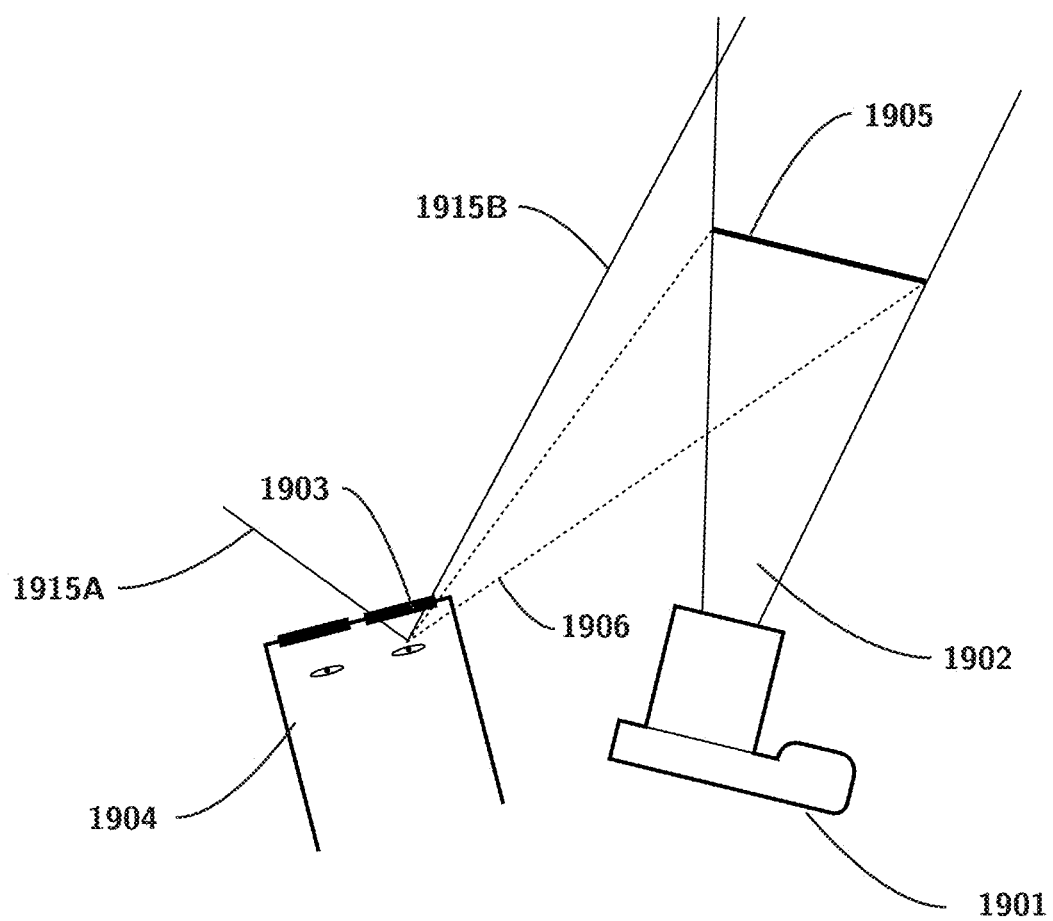
FIG. 19G depicts a further representation of a situation in which a field of view of the camera is out-of-view of a point-of-view of the user.
Figure 19H:
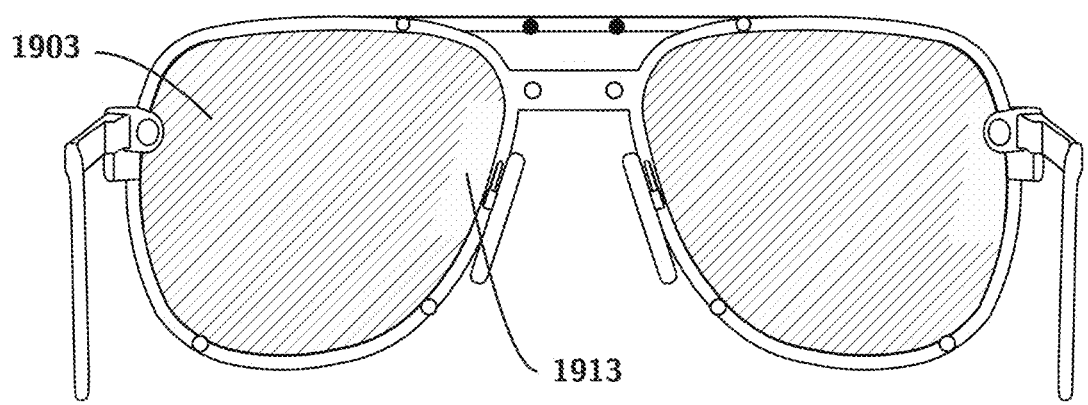
FIG. 19H shows the AR display with an out-of-view indicator.

FIGS. 19G-H illustrate a situation in which the camera's field of view 1902 and the AR display's field of view bounded by 1915A-B do not overlap. As shown in FIG. 19H, an indicator 1913 can be shown representing roughly which direction the camera is pointing relative to the glasses and the user's field of view. This information can also be relayed using rim-mounted LEDs as depicted in FIG. 10C.

Figure 20:
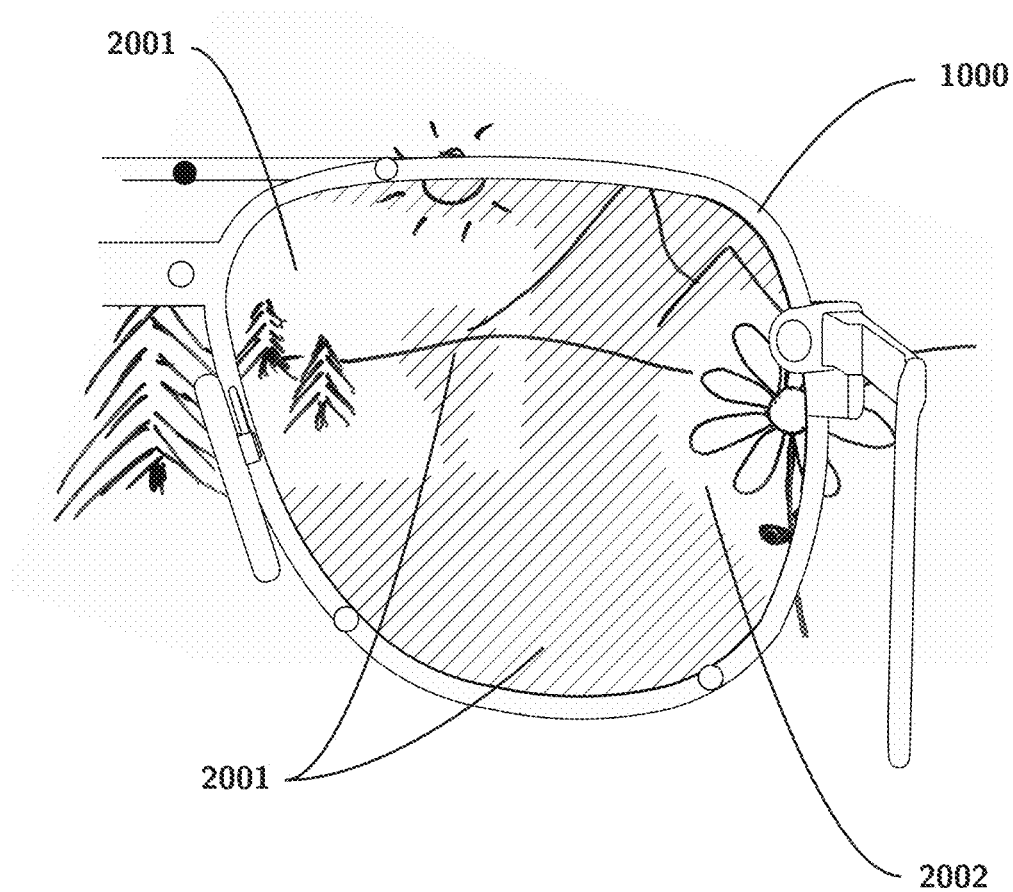
FIG. 20 shows the AR display with an exemplary parallax representation.

FIG. 20 illustrates an example of a parallax representation on an AR display. Since the camera and the user have different perspectives on a scene, certain objects can be occluded in one perspective but not the other. The glasses 1000 might highlight non-contiguous regions 2001 and 2002 in the scene in order to highlight what is visible to the camera and leave non-highlighted regions 2003 to represent what is not visible to the camera. The effect is similar to what would theoretically be seen by the user if a spotlight were shone out of the camera. Region 2002 might be displayed in 3D such that it appears to be at close depth, while region 2001 might be displayed at an apparently further-away depth. This can be achieved with holography, light-field displays, or simple binocular 3D.

Figure 21:
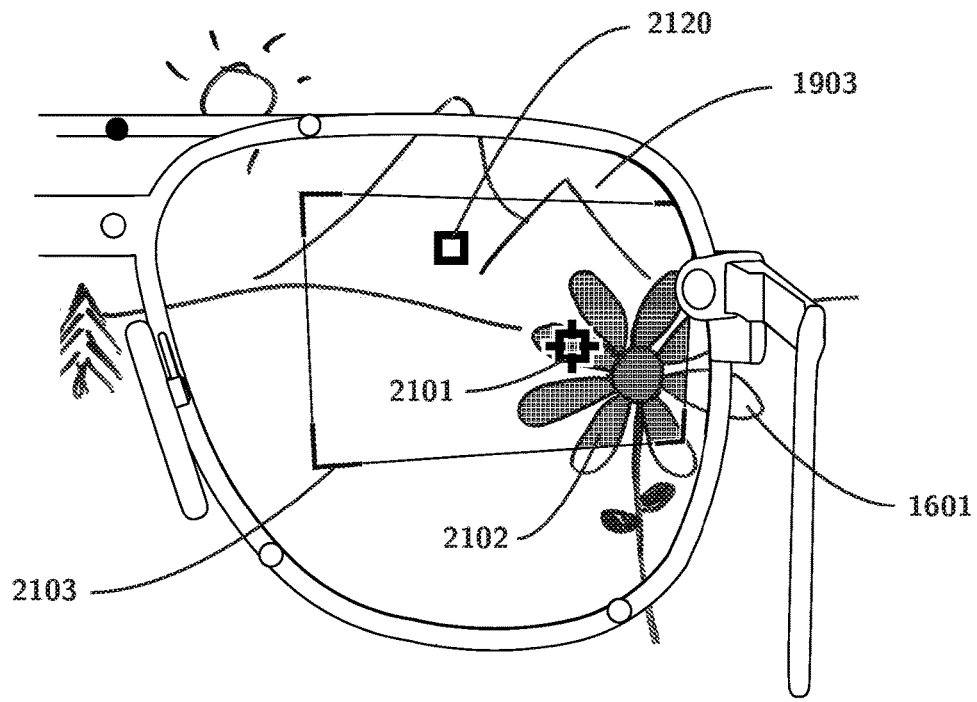
FIG. 21 shows the AR display with focus peaking and object tracking.

FIG. 21 depicts how additional information about the camera's state can be overlaid on the AR display, such as information about the objects currently focused on, or regions that are under-exposed or over-exposed. For example, in FIG. 21 a flower 1601 is a current gaze target as represented on the AR display 1903 by a reticle 2101. The camera may detect portions of its field of view that are currently in focus, and then represent those portions on the AR display with focus peaking 2102. Furthermore, the AR display depicts a marker 2120 over other objects being tracked by the control system. The other objects may be used for focus racking, for example. In addition, the AR display may represent the field of view of the camera with a bounding box or crop marks 2103. It is to be understood that the AR display 1903 may use any suitable color, shape and size graphics to represent the additional information about the camera's state or objects being tracked.

In further embodiments, other information is represented on the AR display, such as a preview of the last photo taken or a live view feed. The types of other information and the size, shape and location of that information on the AR display is controllable by the user or the control system such that it does not detract from the view of the user's environment. It is to be understood that the representations of the information may be used in conjunction with other embodiments of the present disclosure.

A standard trigger button 1305 can additionally be included on the hand-held camera 1301 or any other camera or grip, behaving similar to trigger 300. The camera 1301 can include a display 1304 similar to the display 400 that provides access to additional settings for the system as a whole, and for displaying previews of pictures and video taken. It can of course also behave like a live-view display, or a traditional viewfinder can be supplied. Preferably, the glasses 1000 can be configured to detect when the display 1304 or a viewfinder is directly in front of the user's eyes. When this occurs, the system disables the AR display system 1302 and turns the display 1304 into a standard viewfinder.

In situations where camera aim and zoom are controlled manually as in FIGS. 13A-13B, in accordance with an exemplary embodiment of the present disclosure, information conveying the camera's field of view can be superimposed over the person's line of sight as a highlighted region. This allows the user to frame and compose without ever looking at the camera.

Figure 14A:
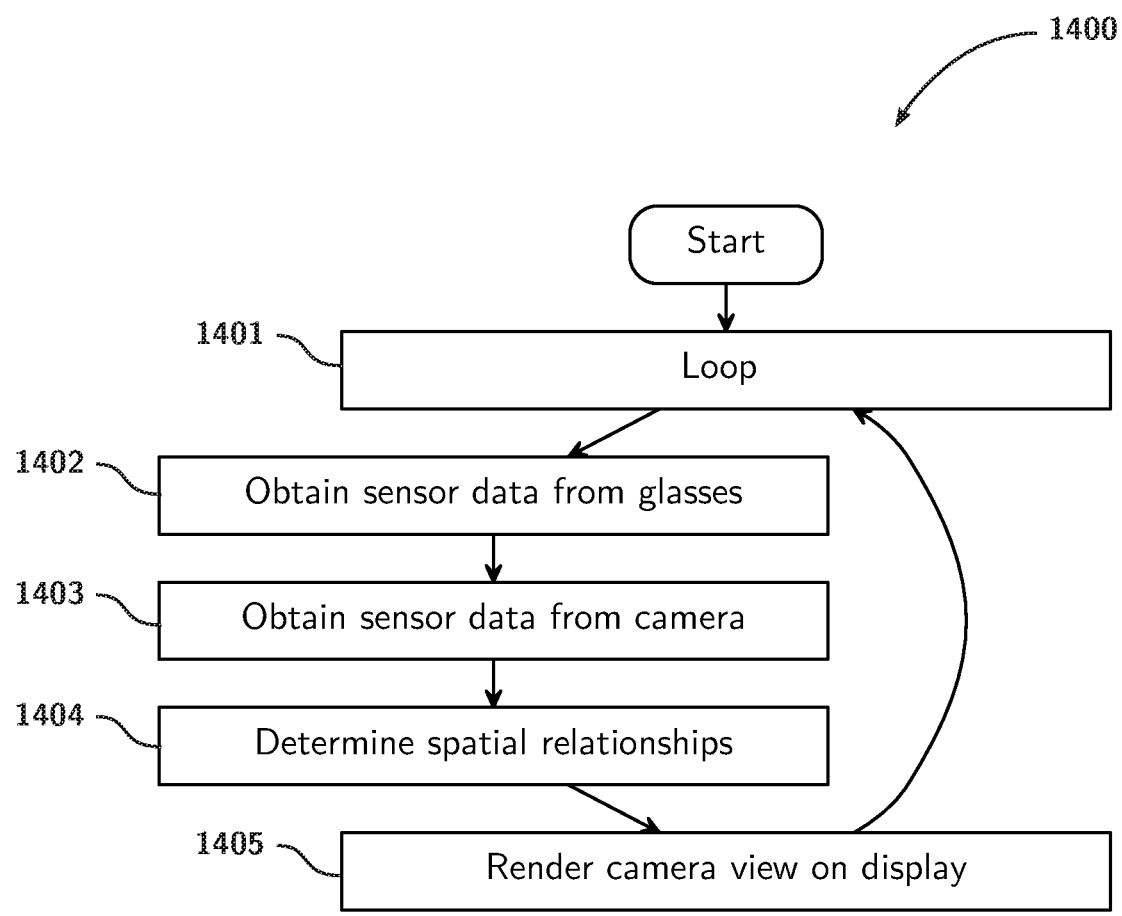
FIG. 14A shows an exemplary process for updating the display system in FIGS. 13A-13B.

FIG. 14A shows an exemplary process 1400 of updating the display system in accordance with an exemplary embodiment of the present disclosure. In steps 1402-1403, sensor data is collected from both the camera 1301 and glasses 1000. This can include image, SLAM, motion data, and data from additional sensors such as rangefinders, structured-light projectors, lidar etc. for pose and 3D/depth info. The combined sensor data is used to determine the spatial relationships between the camera, glasses, world, and user's eyes in step 1404. Finally, the information about what the camera can see is rendered to the display system 1302 in step 1405. The control performs the rendering process which can include drawing a rough bounding box over the camera's field of view from the user's perspective, or highlighting the parts of the user's perspective that are also visible by the camera, or any other representation that helps the user aim and zoom the camera such as focus info, occlusions, framing, etc. according to the present disclosure.

Figure 14B:
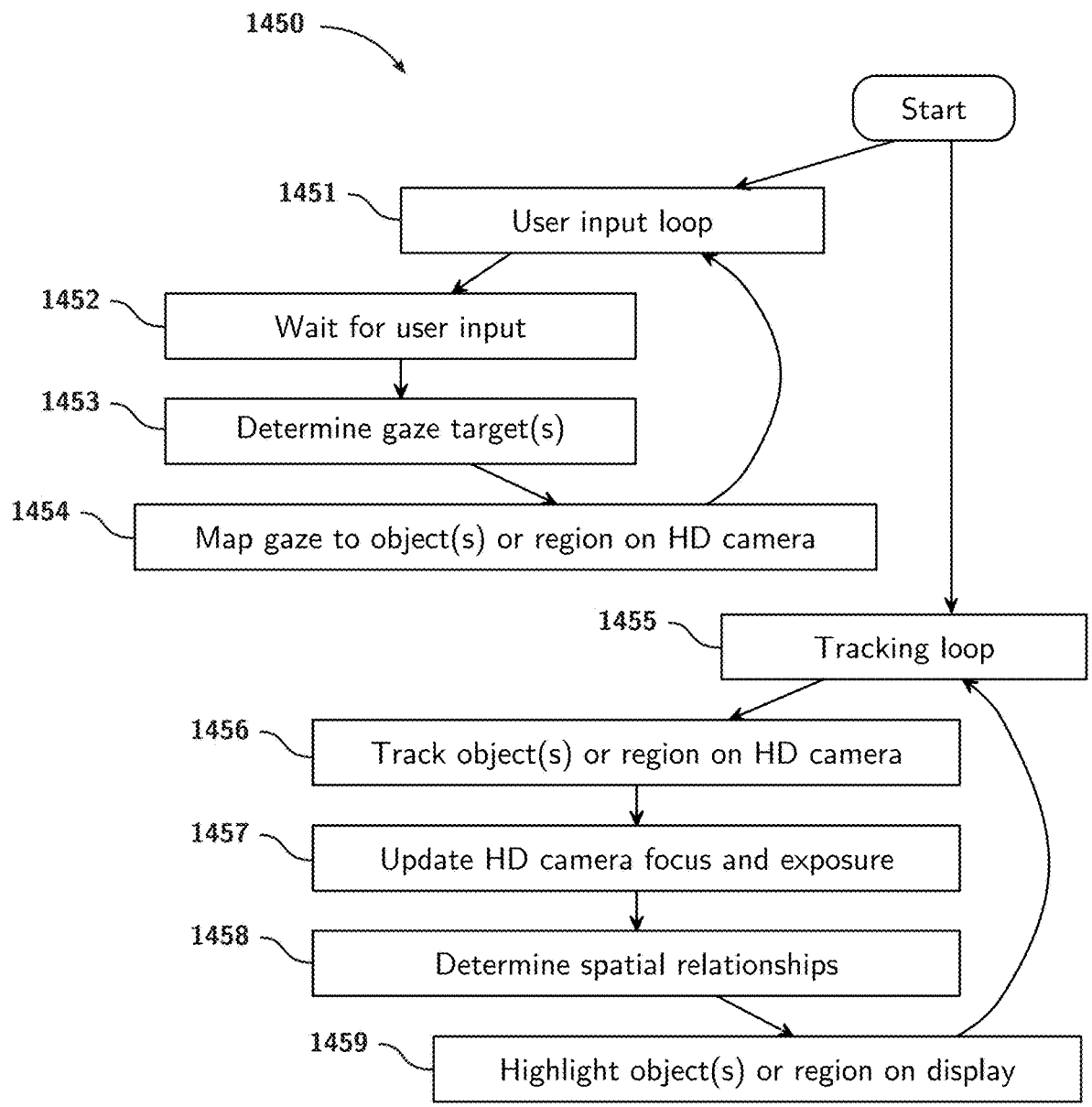
FIG. 14B shows an exemplary process for using gaze to control the hand-held camera of FIGS. 13A-13B.

FIG. 14B is an example of how gaze-directed object and scene selection is implemented in accordance with an exemplary embodiment of the present disclosure. The process is analogous to control of a gimbal-mounted camera depicted in flowchart 1200, gaze-directed cinematography recording depicted in process 800 and processing depicted in method 850 in that it leverages concurrent user gaze interaction and object tracking to allow a user to select objects and then look away while those objects continue to be tracked. In particular, steps 1452-1454 allow a user to select one or more objects or a scene using gaze direction. These objects or scene are mapped to the field of view of the hand-held camera 1301 and tracked. This object tracking occurs continuously in 1455. The camera tracks the object and keeps it in focus and properly exposed in 1457. Then, given sensor data obtained during 1402-1403, the tracked target is mapped back to the glasses in 1458 and rendered on the glasses in 1459 as a highlighted region, marker, or reticle. It is possible that multiple objects are tracked, as shown in FIG. 21. In a situation like this, a videographer might use a system such as the continuously variable toggle switch 1707 in FIG. 17B to rack focus between the two selected points.

It is appreciated that gaze-based object and scene selection is also useful without any AR display, assuming that the user first aims the camera and is able to hold it stable while looking at the scene. Also, the display mechanisms described herein can be useful for the head-mounted and externally-mounted embodiments described herein. For example, the AR display can help give a user feedback that object tracking is working correctly or that it needs to be reinforced, for example in conjunction with gaze-reinforced object tracking processes in FIGS. 8A-8B and FIG. 12. It is also appreciated that the AR display is useful without gaze-based object and scene selection.

CONCLUSION

The present disclosure improves the user experience of recording photos and video and gives photographers more power. As much as possible, the control enables users to stay focused on the world around them and their tasks at hand rather than needing to intermittently shift focus to a camera viewfinder or live-view. A variety of techniques solve the gaze control "Midas touch" problem and allow users to intentionally and effectively compose and frame their shots using gaze and other inputs such as buttons and head-movements. Leveraging multiple HD camera views rather than a physically moving camera results in a cheaper and more robust system. The head-mounted panoramic camera system has a number of advantages over existing designs. The control utilizes augmented reality displays to render information about what a camera can see on top of what the user can see. The techniques can especially help photographers who need to be able to react quickly to changes around them and allows solo operators to control all camera parameters.

All arrangements described herein are merely for illustrating various exemplary embodiments of the present disclosure. Other arrangements and elements can be used instead, and some elements may be omitted altogether, used independently, and combined in other arrangements. Many of the elements that are described are functional entities that may be implemented as discrete or distributed components or in conjunction with other components, in any suitable combination and location.

While various aspects and embodiments are described herein, others are apparent and possible. The various aspects and embodiments here are for purposes of illustration only and are not intended to be limiting. All terminology used in this document is for the purpose of describing particular embodiments only, and is not intended to be limiting. Since many modifications, variations, and changes in details can be made to the given examples, the descriptions and figures in this document should be interpreted as illustrative and not limiting.

What is claimed is:

1. A method for gaze-directed control of at least one physical camera system having a first dynamic field of view, the method comprising:
   receiving an input trigger from a user;
   determining a target of a gaze of the user on a second dynamic field of view via one or more physical eye-tracking cameras and a physical forward-facing reference camera, the physical reference camera having the second dynamic field of view independent of the first dynamic field of view, wherein the first dynamic field of view and the second dynamic field of view are each independent of a dynamic position of the target;
   geometrically mapping the target and a plurality of pixels surrounding the target from the second dynamic field of view of the physical reference camera to a plurality of pixels within the first dynamic field of view of the at least one physical camera system, wherein the geometrically mapping uses an approximation of an epipolar geometry relationship between the first dynamic field of view and the second dynamic field of view;
   adjusting at least one parameter of an image from the at least one physical camera system based on the mapping to include the dynamic position of the target into the first dynamic field of view; and
   capturing one or more images optimized for the target via the at least one physical camera system, the captured one or more images framed substantially independent of a head position of the user.

2. The method according to claim 1, wherein the adjusting the at least one parameter of an image from the at least one camera system adjusts at least one of a focus, a depth of field, a crop, an exposure, and a white balance of the captured one or more images.

3. The method according to claim 1, further comprising:
   determining a depth of the target;
   sending depth information to the at least one physical camera system; and
   initiating an automatic focus of the at least one physical camera system, the automatic focus searching at an initial depth and mapped target, based on the depth information.

4. The method according to claim 1, further comprising:
   receiving a second input trigger from the user;
   determining a second target of the gaze of the user via the one or more physical eye-tracking cameras and the physical forward-facing reference camera, the second target determined from a gaze in a different direction from the target;
   mapping the second target to the first dynamic field of view of the at least one physical camera system; and
   tracking both the target and the second target via the at least one physical camera system, wherein the capturing one or more images is optimized for both the target and the second target in a same captured image.

5. The method according to claim 1, further comprising: continuing to track the target after the target is outside of the second dynamic field of view of the physical reference camera.

6. The method according to claim 4, further comprising: re-focusing the at least one physical camera system from the target to the second target.

7. The method according to claim 1, further comprising: determining a direction in which the at least one physical camera system is pointing, based in part on the first dynamic field of view of the at least one camera system relative to the second dynamic field of view of the physical reference camera;
indicating to the user the direction in which the at least one physical camera system is pointing relative to the second dynamic field of view of the physical reference camera.

8. The method according to claim 1, further comprising remotely controlling the first dynamic field of view of the at least one physical camera system, via a device separate from the one or more gaze-tracking cameras.

9. The method according to claim 1, wherein the at least one camera system is a gimbal-mounted camera.

10. The method according to claim 1, wherein the determining the target of the gaze of the user is based on at least one of a single gaze point, a weighted gaze point over a period of time, and one or more objects identified by the at least one physical camera system.

11. The method according to claim 10, wherein the one or more objects identified by the at least one physical camera system are tracked independently of the target.

12. A gaze-directed photography system configured to control a camera with gaze tracking, the system comprising:
at least one camera system having a first dynamic field of view, the at least one camera system including a hand-held physical camera system;
a gaze-tracking device to track a gaze of a user, the gaze-tracking device being separate from the hand-held physical camera system, and the gaze-tracking device further comprising:
at least one physical eye-tracking camera configured to track movement of at least one eye of the user; and
a physical reference camera having a second dynamic field of view independent of the first dynamic field of view, the physical reference camera being physically attached to the gaze-tracking device, and the physical reference camera facing outwards from the user in a direction of the gaze of the user;
a processor; and
a memory coupled to the processor, the memory storing instructions which are executable by the processor to perform a method comprising:
determining a target of the gaze of the user on the second dynamic field of view via the gaze-tracking device, the first dynamic field of view and the second dynamic field of view each being independent of a dynamic position of the target;
geometrically mapping the target and a plurality of pixels surrounding the target from the second dynamic field of view of the physical reference camera to a plurality of pixels within the first dynamic field of view of the at least one camera system, wherein the geometrically mapping uses an approximation of an epipolar geometry relationship between the first dynamic field of view and the second dynamic field of view;
adjusting at least one parameter of an image from the at least one camera system based on the mapped target and the plurality of pixels surrounding the target to include the dynamic position of the target into the first dynamic field of view; and
capturing one or more images via the at least one camera system, the one or more captured images optimized for the target and framed in a manner that is substantially independent of a head position of the user.

13. The gaze-directed photography system according to claim 12, wherein the gaze-tracking device is wearable by the user.

14. The gaze-directed photography system according to claim 12, wherein the gaze-tracking device further comprises at least one infrared LED.

15. The gaze-directed photography system according to claim 12, wherein the gaze-tracking device comprises a direction indicator, the direction indicator displaying a direction in which the at least one physical camera system is pointed to relative to the gaze-tracking device.

16. The gaze-directed photography system according to claim 12, wherein the gaze-tracking device is disposed on the at least one physical camera system.

17. The gaze-directed photography system according to claim 12, further comprising receiving an input trigger from a user regarding the target, wherein the input trigger is received from a user interface that recognizes at least one of an eye gesture, a button press, a voice command, and a nerve signal, the user interface in communication with the processor.

18. A non-transitory computer readable medium storing computer-executable instructions that, when executed, cause a processor to:
communicate, by the processor, with at least one physical camera system having a first field of view, a physical reference camera having a second field of view, and an eye-tracking camera, wherein the first field of view is independent from the second field of view, and the first and the second fields of view are dynamic;
receive, by the processor, gaze data from the eye-tracking camera, the gaze data representing a gaze point;
receive, by the processor, at least one of an image and a video from the at least one physical camera system and at least one of an image and a video from the physical reference camera;
identify, by the processor, a target on the second dynamic field of view within the at least one of an image and a video from the physical reference camera, a dynamic position of the target being independent of the first dynamic field of view and the second field of view;
map, by the processor, the target and a plurality of pixels surrounding the target from the second dynamic field of view from the at least one of an image and a video from the physical reference camera to a plurality of pixels within the at least one of an image and a video from the at least one physical camera system, wherein the mapping uses an approximation of an epipolar geometry relationship between the first dynamic field of view and the second dynamic field of view;
track, by the processor, the identified target;
adjust at least one parameter of an image from the at least one camera system based on the tracking of the identified target and the mapping to include the dynamic position of the target into the first dynamic field of view; and capture one or more images optimized for the identified target via the at least one physical camera system, the one or more captured images optimized for the identified target and framed in a manner that is substantially independent of a head position of a user.

19. The non-transitory computer readable medium according to claim 18, further comprising:

receive, by the processor, depth information from the eye-tracking camera or a combination of signals from the eye-tracking camera and the physical reference camera;

determine, by the processor, a depth of the target;

send, by the processor, instructions to initiate an automatic focus searching at an initial depth, the tracking of the target being based on the depth of the target to the at least one physical camera system.

20. The non-transitory computer readable medium according to claim 18, further comprising:

map, by the processor, a second gaze point to the at least one of an image and a video from the physical reference camera, the gaze data also representing the second gaze point;

identify, by the processor, a second target based on the mapping; and track, by the processor, the second target.

21. The non-transitory computer readable medium according to claim 20, wherein the one or more images are optimized for both the target and the second target.

22. The non-transitory computer readable medium according to claim 20, wherein the at least one camera system parameter adjusts a focus of the at least one camera system an image from the target to the second target.

* * * * *